April 16, 1968 S. J. GARTNER 3,377,679
ASSEMBLING MACHINE AND METHOD
Filed Dec. 9, 1947 29 Sheets-Sheet 2
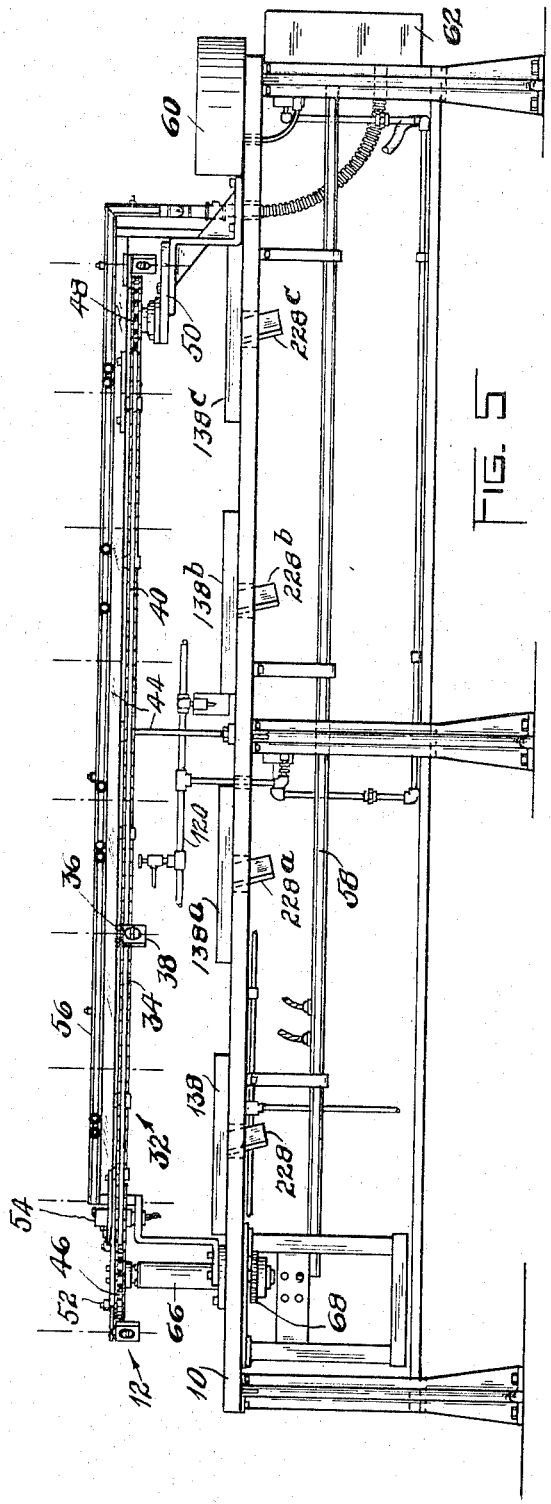
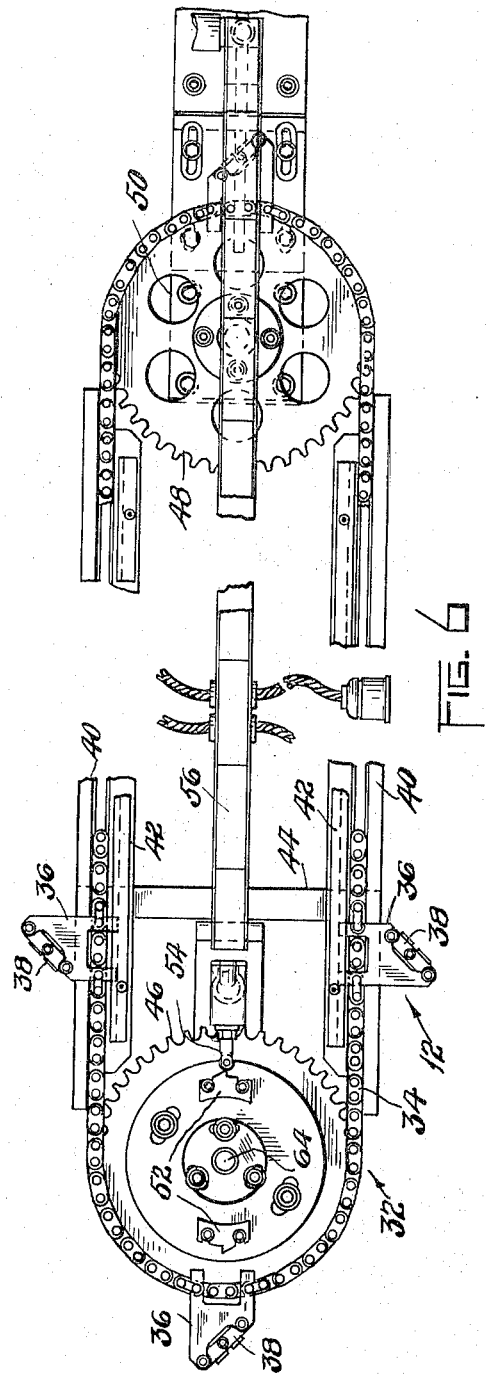
INVENTOR.
Stanley J. Gartner
BY
Attorney

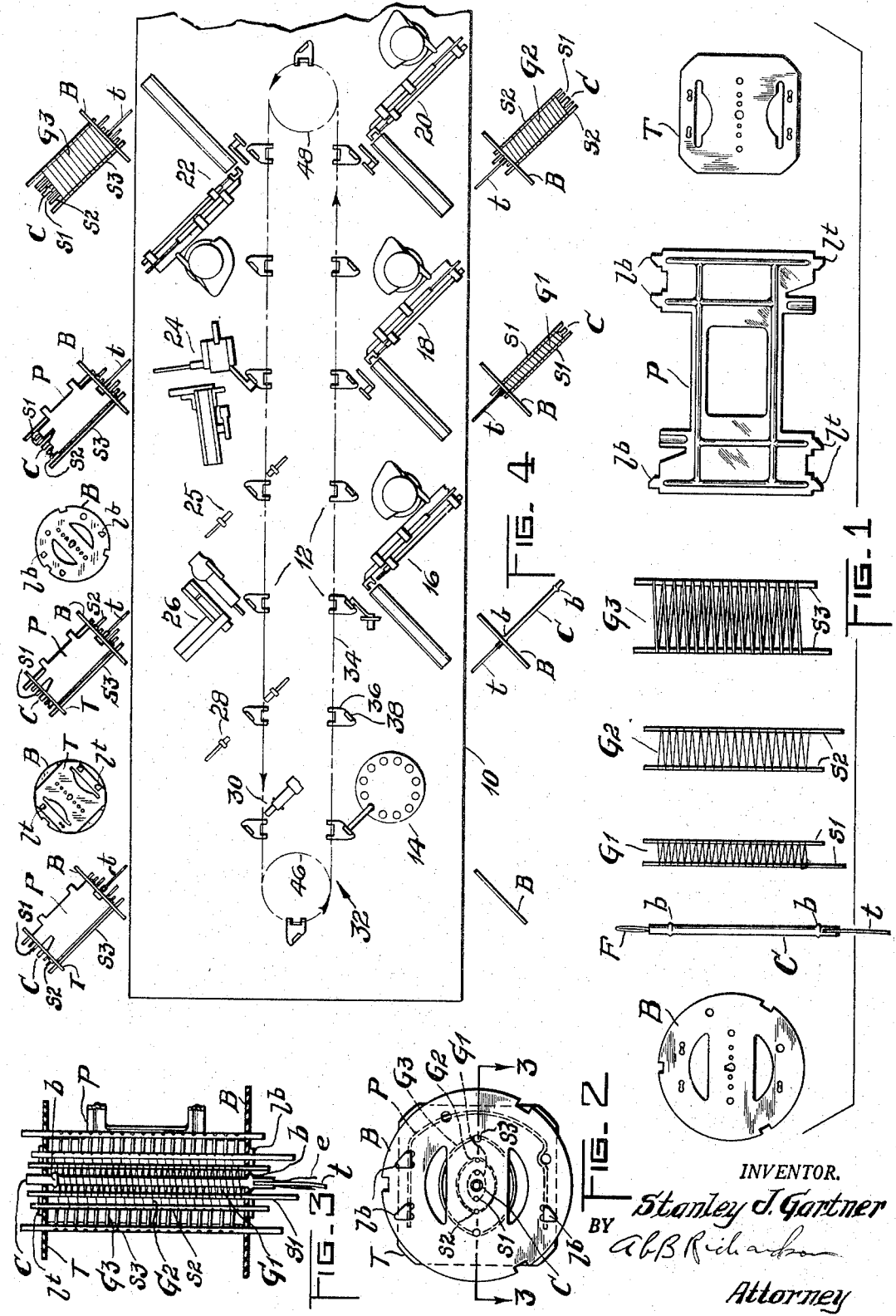

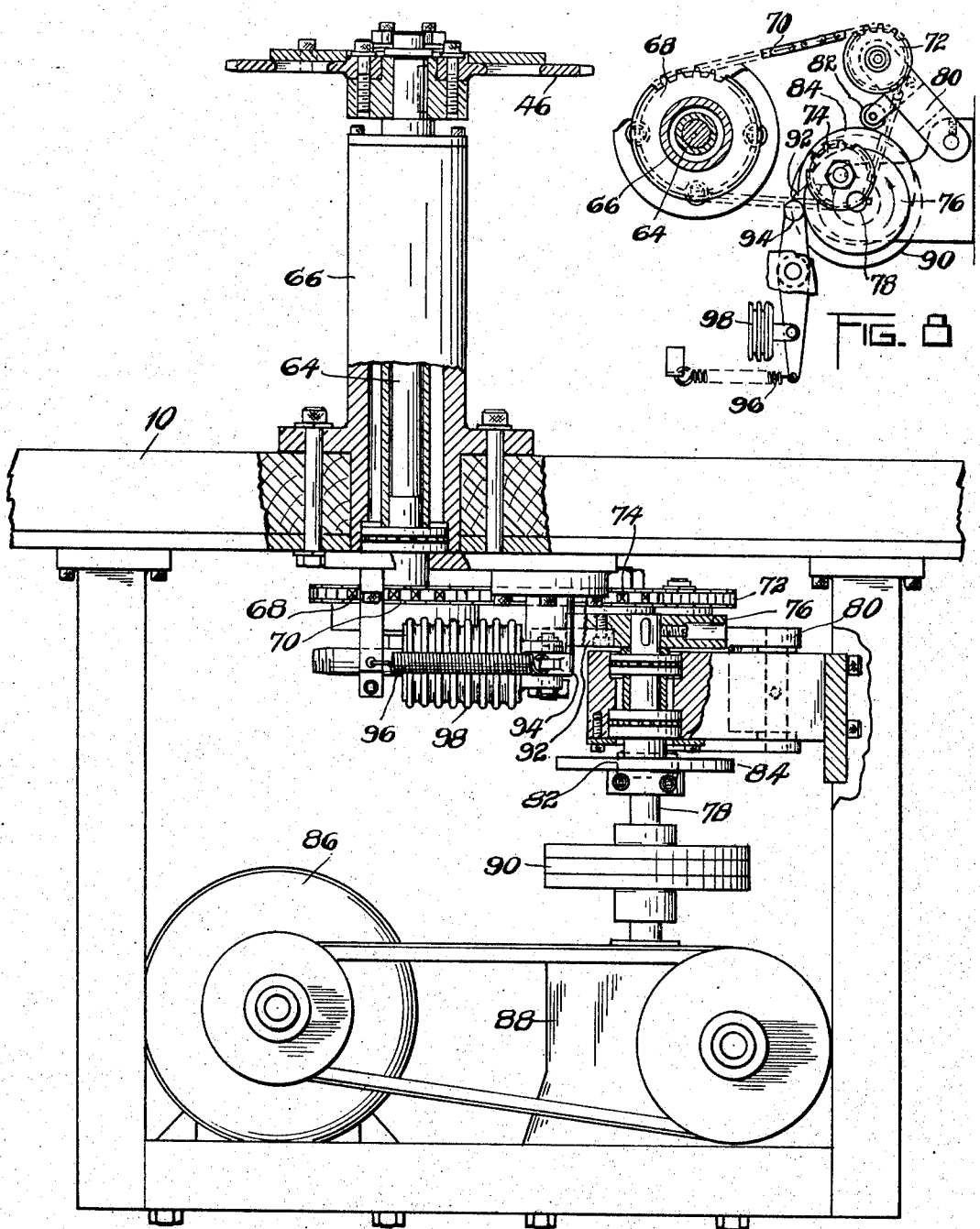

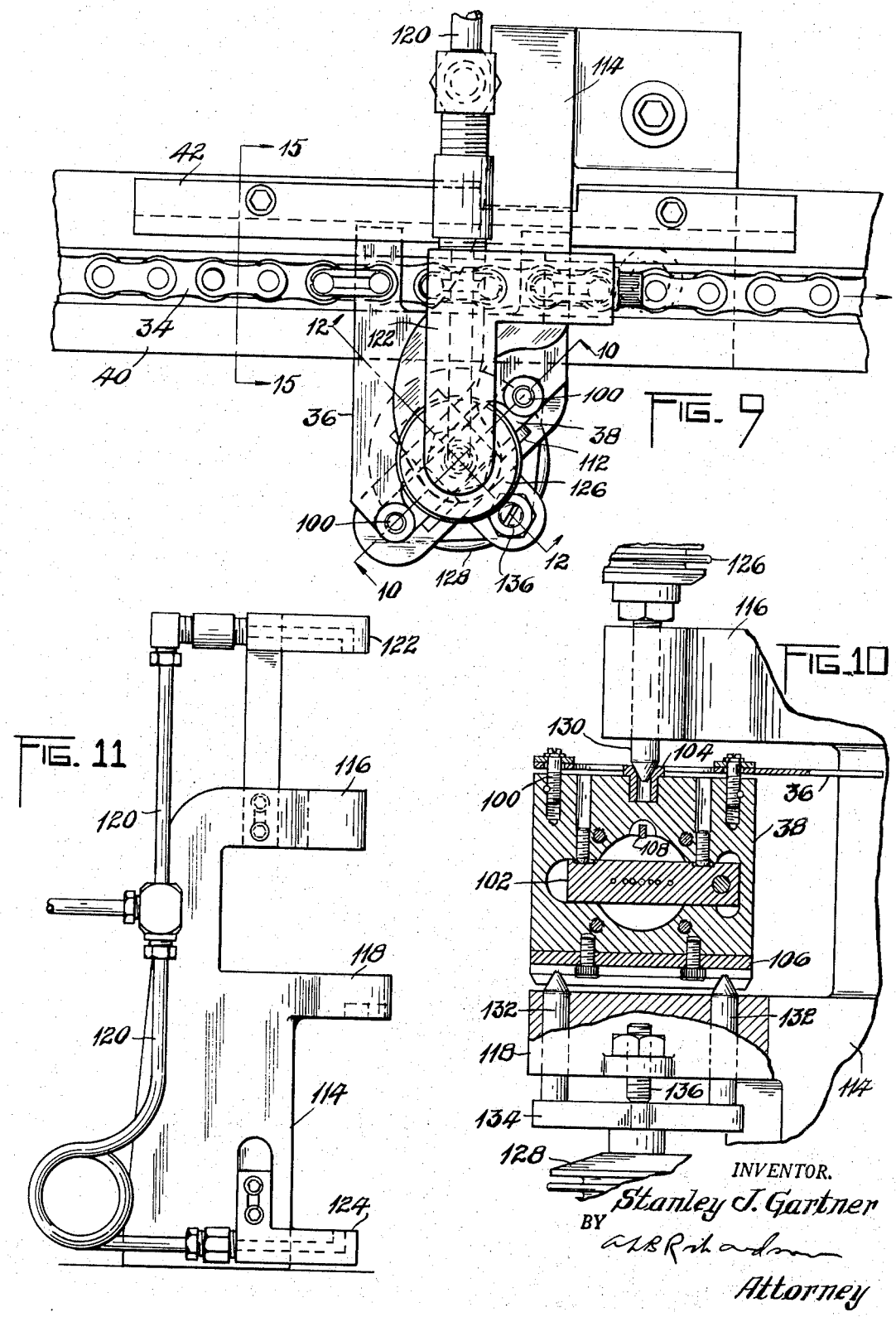

April 16, 1968 S. J. GARTNER 3,377,679
ASSEMBLING MACHINE AND METHOD
Filed Dec. 9, 1947 29 Sheets-Sheet 5
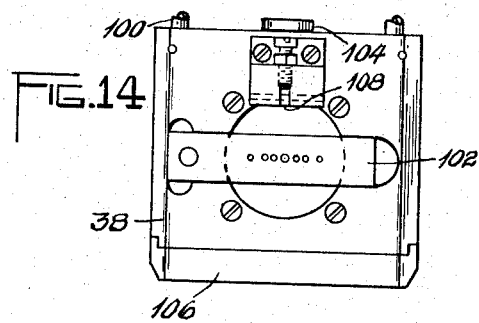
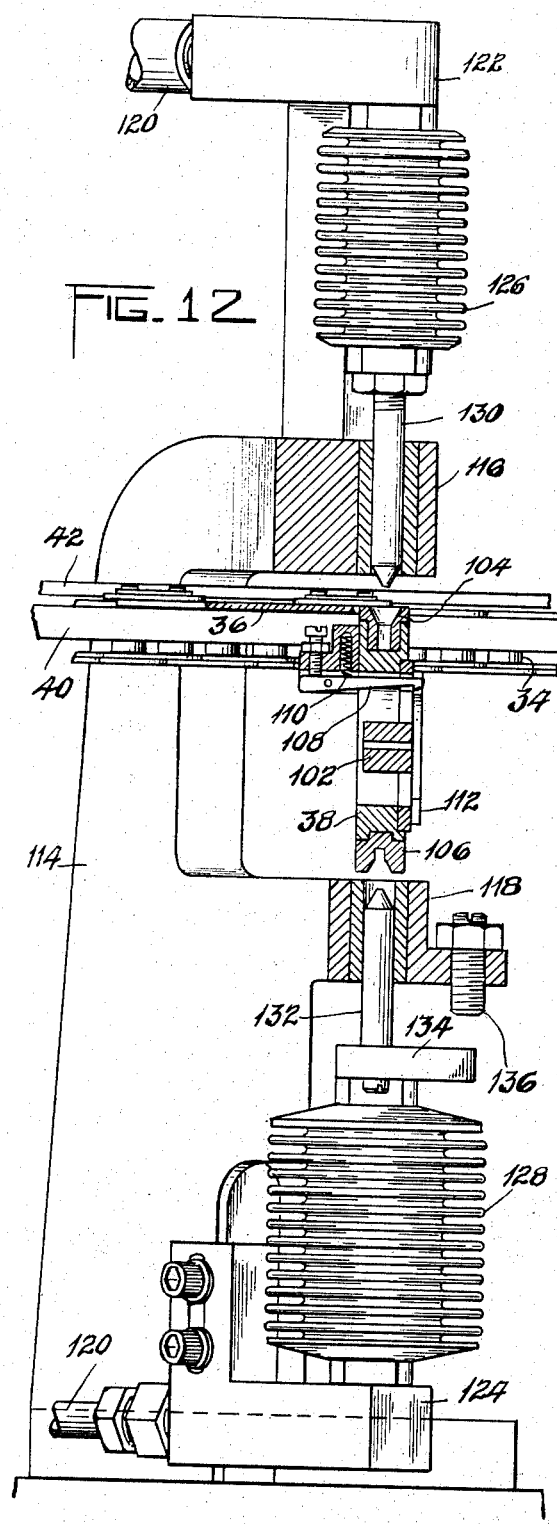
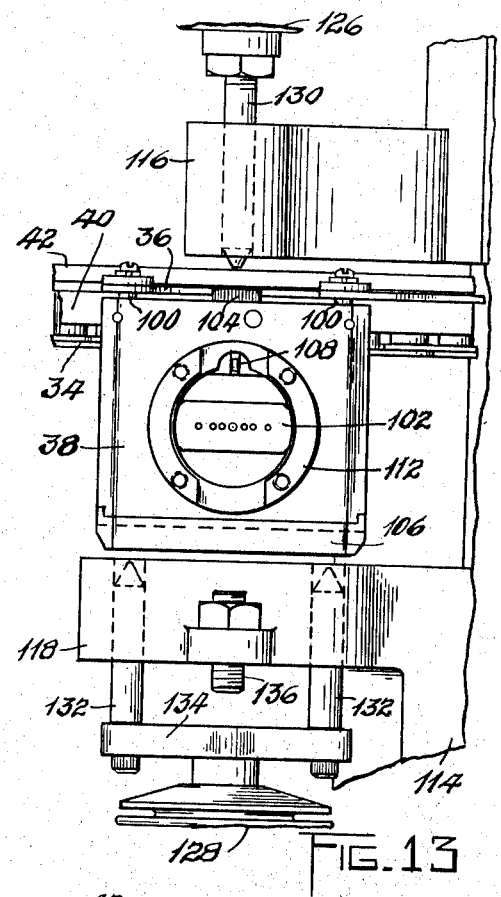
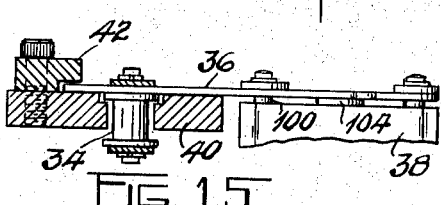
INVENTOR.
Stanley J. Gartner
BY
Attorney

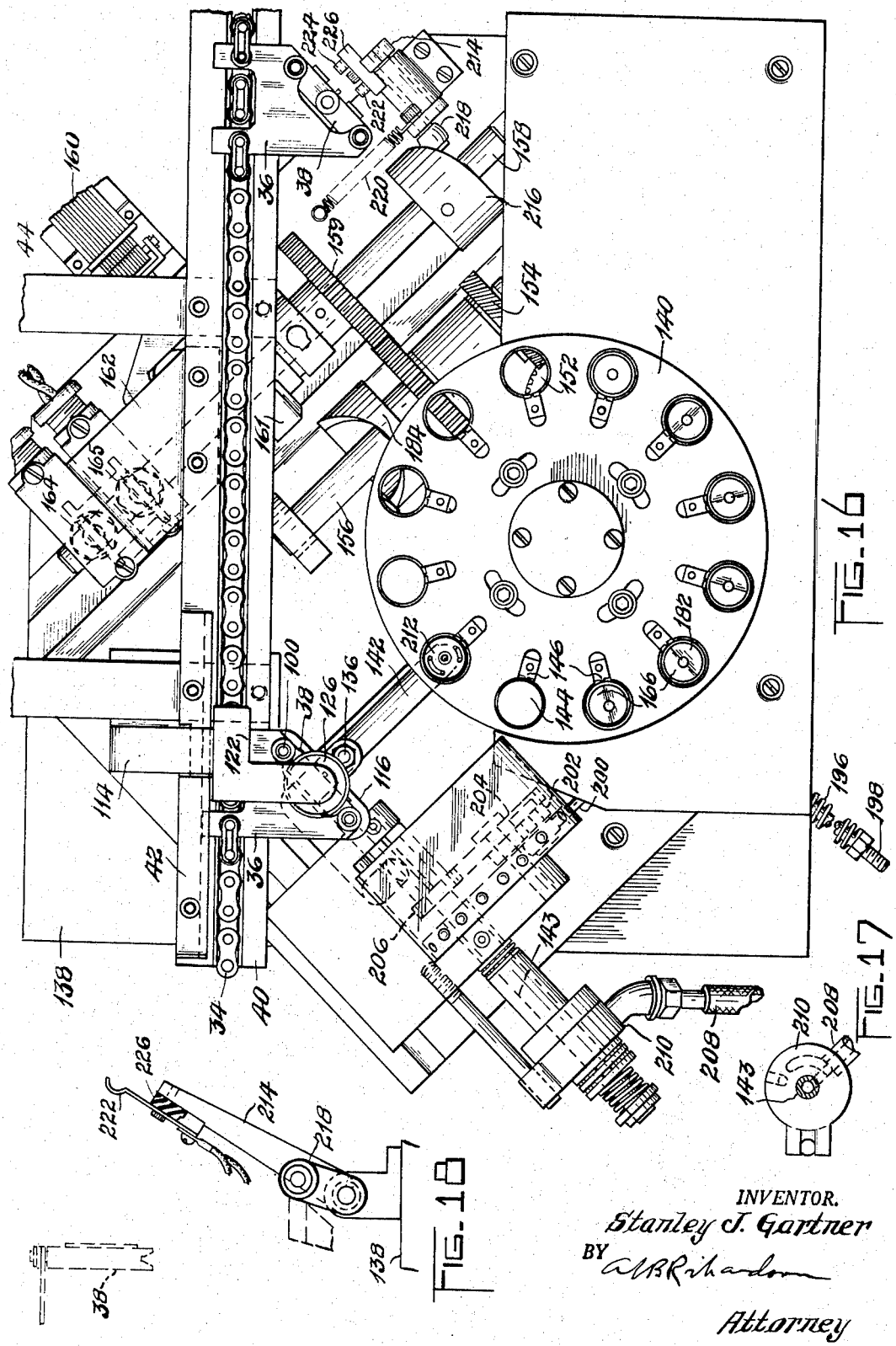

April 16, 1968 S. J. GARTNER 3,377,679
ASSEMBLING MACHINE AND METHOD
Filed Dec. 9, 1947 29 Sheets-Sheet 7
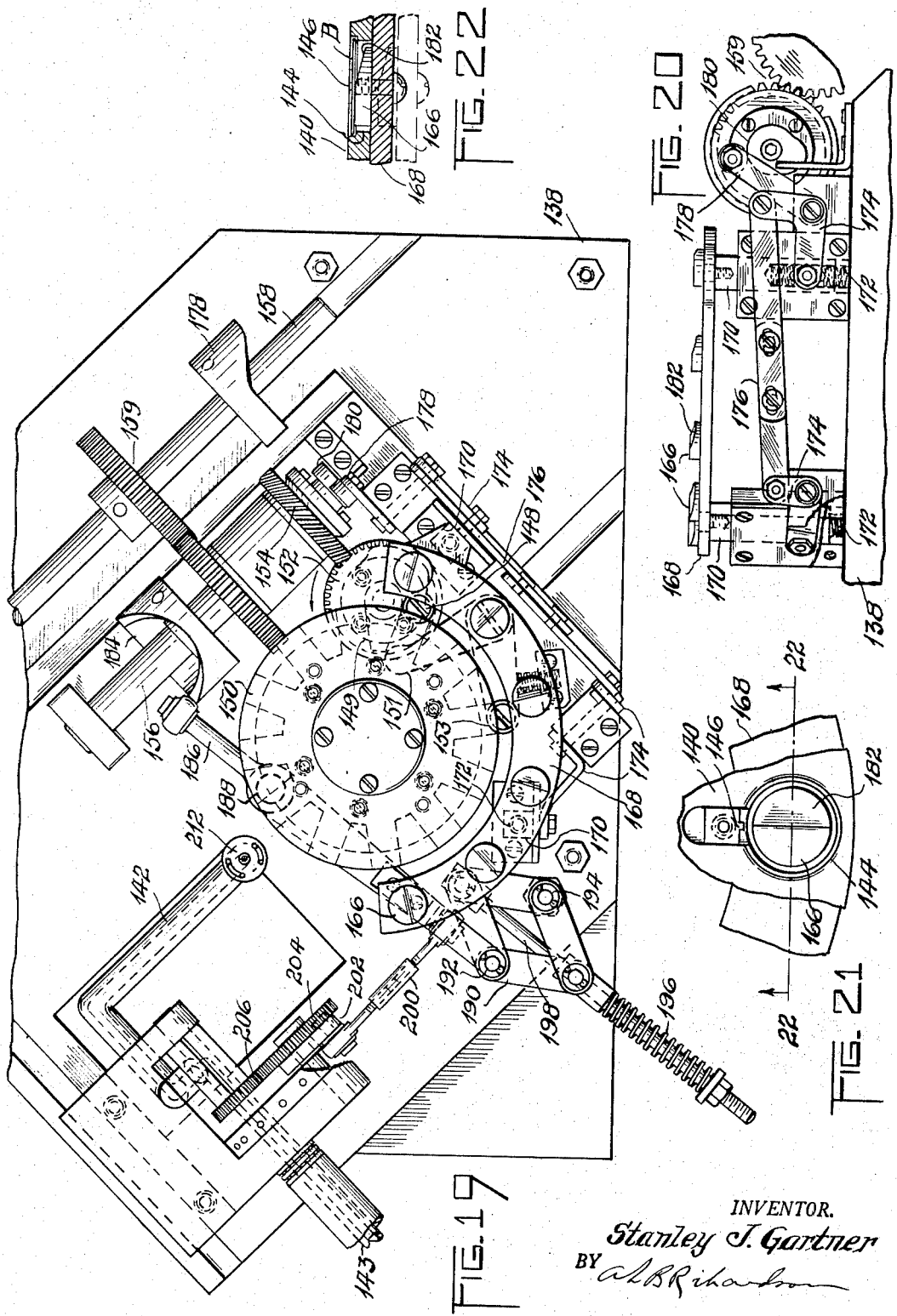
INVENTOR.
Stanley J. Gartner
BY
Attorney

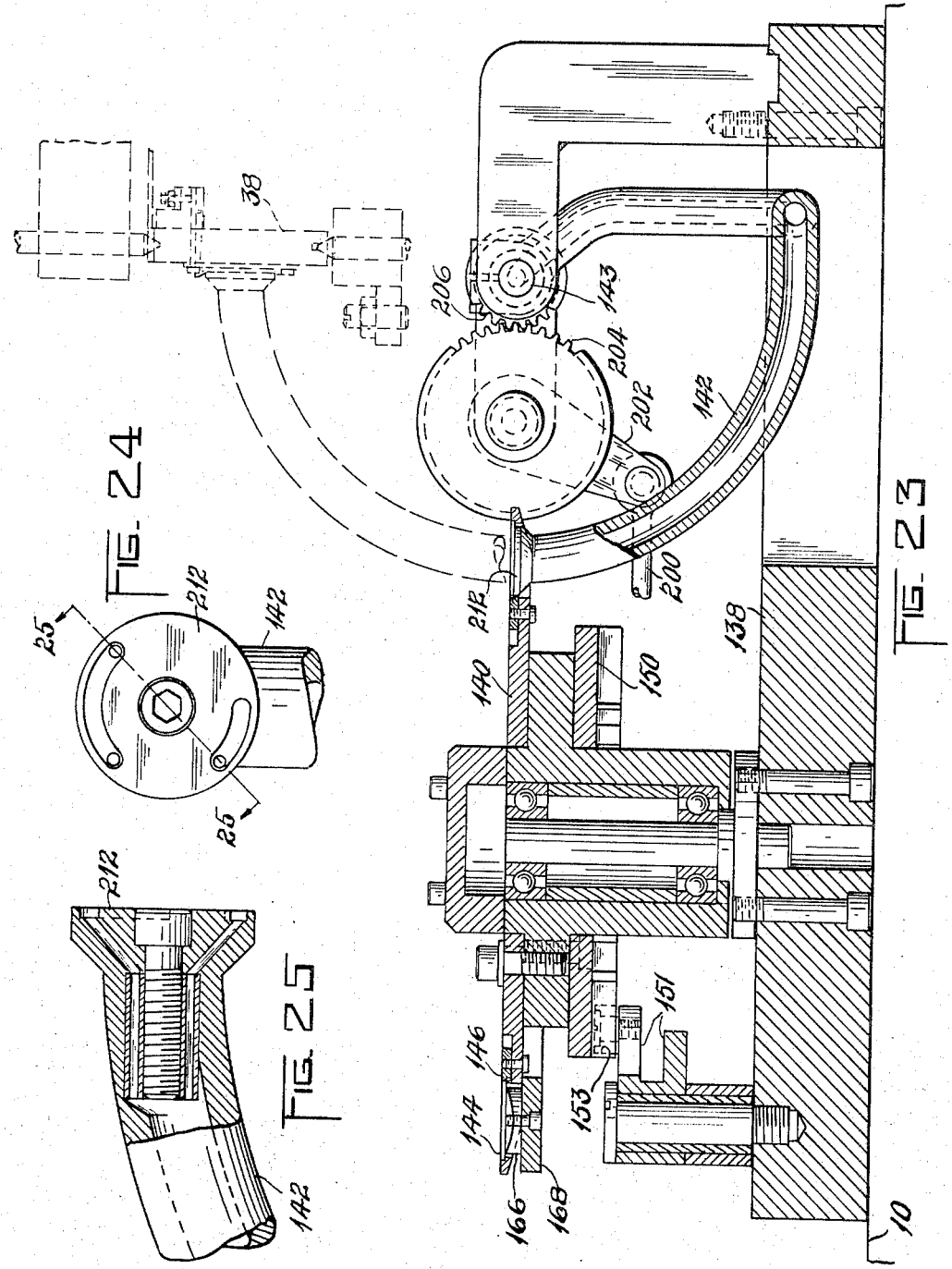

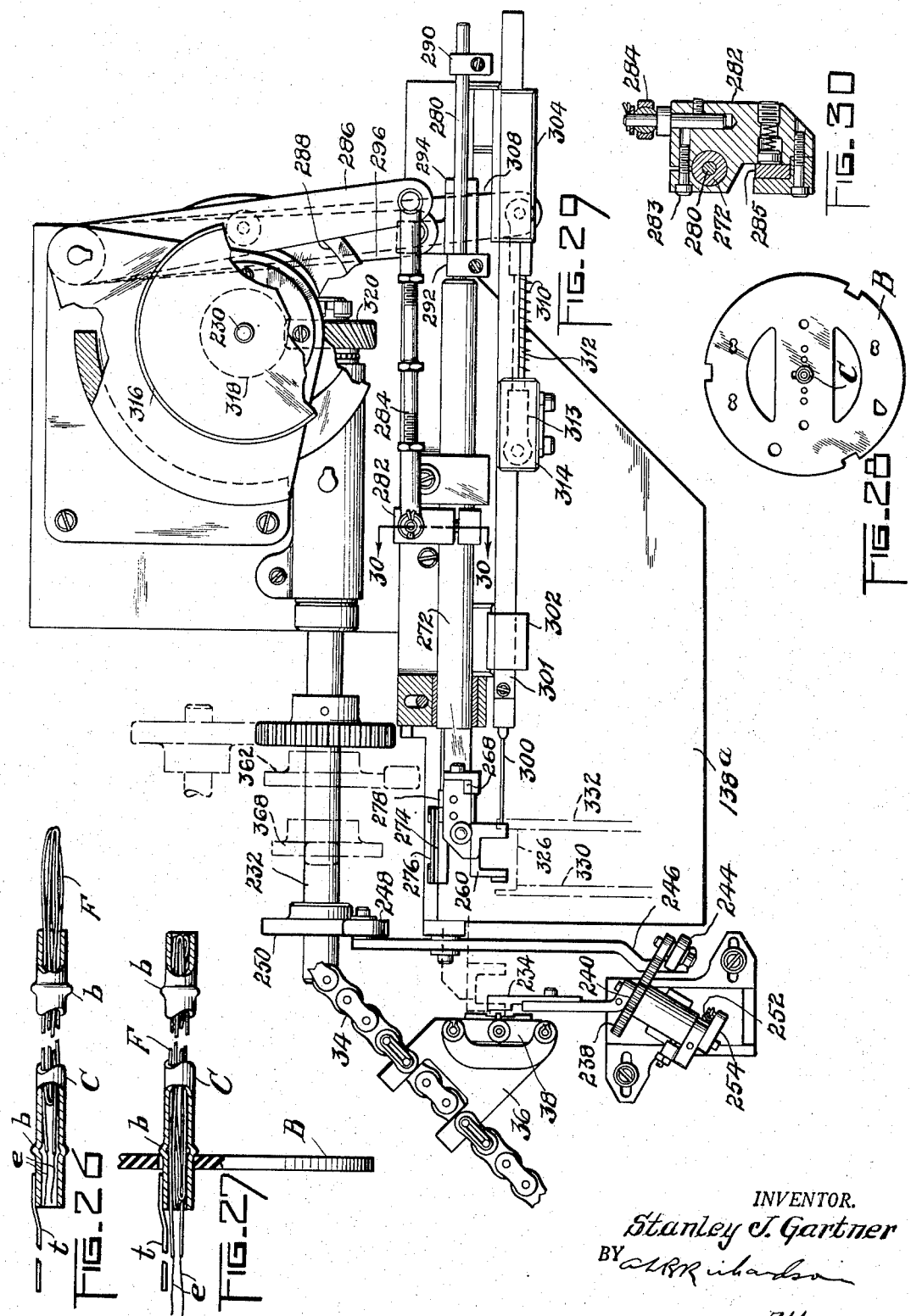

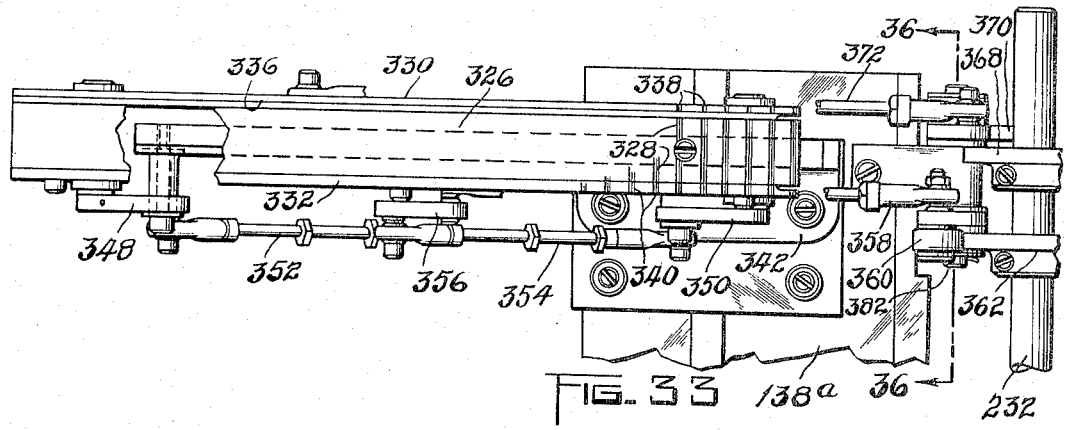
FIG. 33
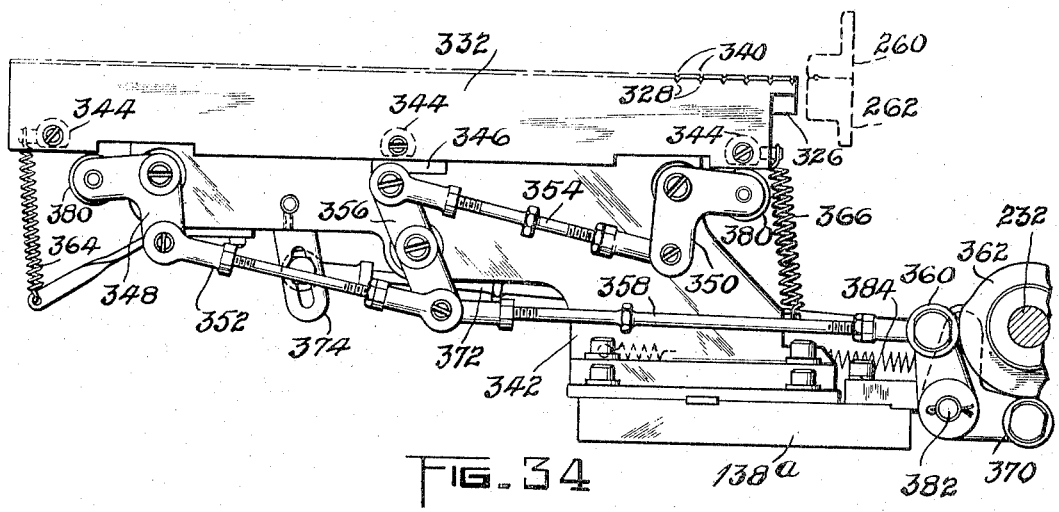
FIG. 34
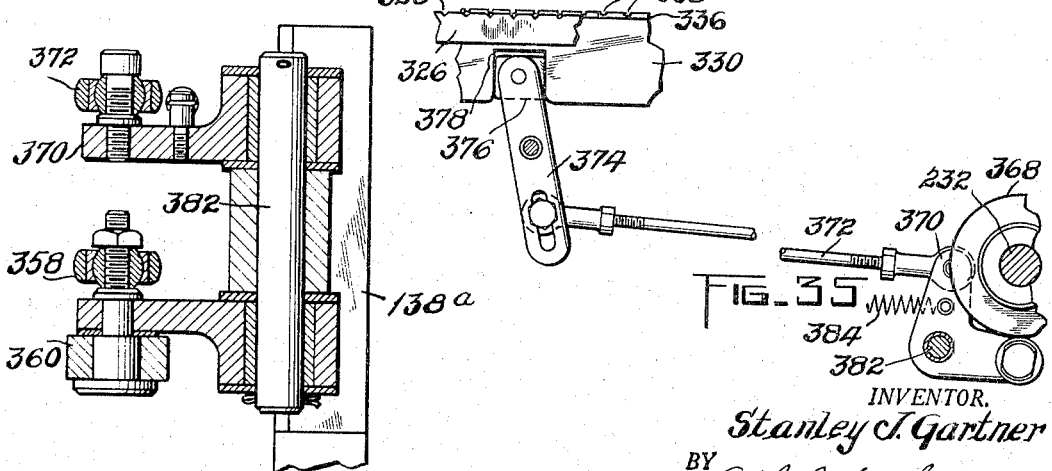
FIG. 35
FIG. 36
INVENTOR.
Stanley J. Gartner
BY
Attorney

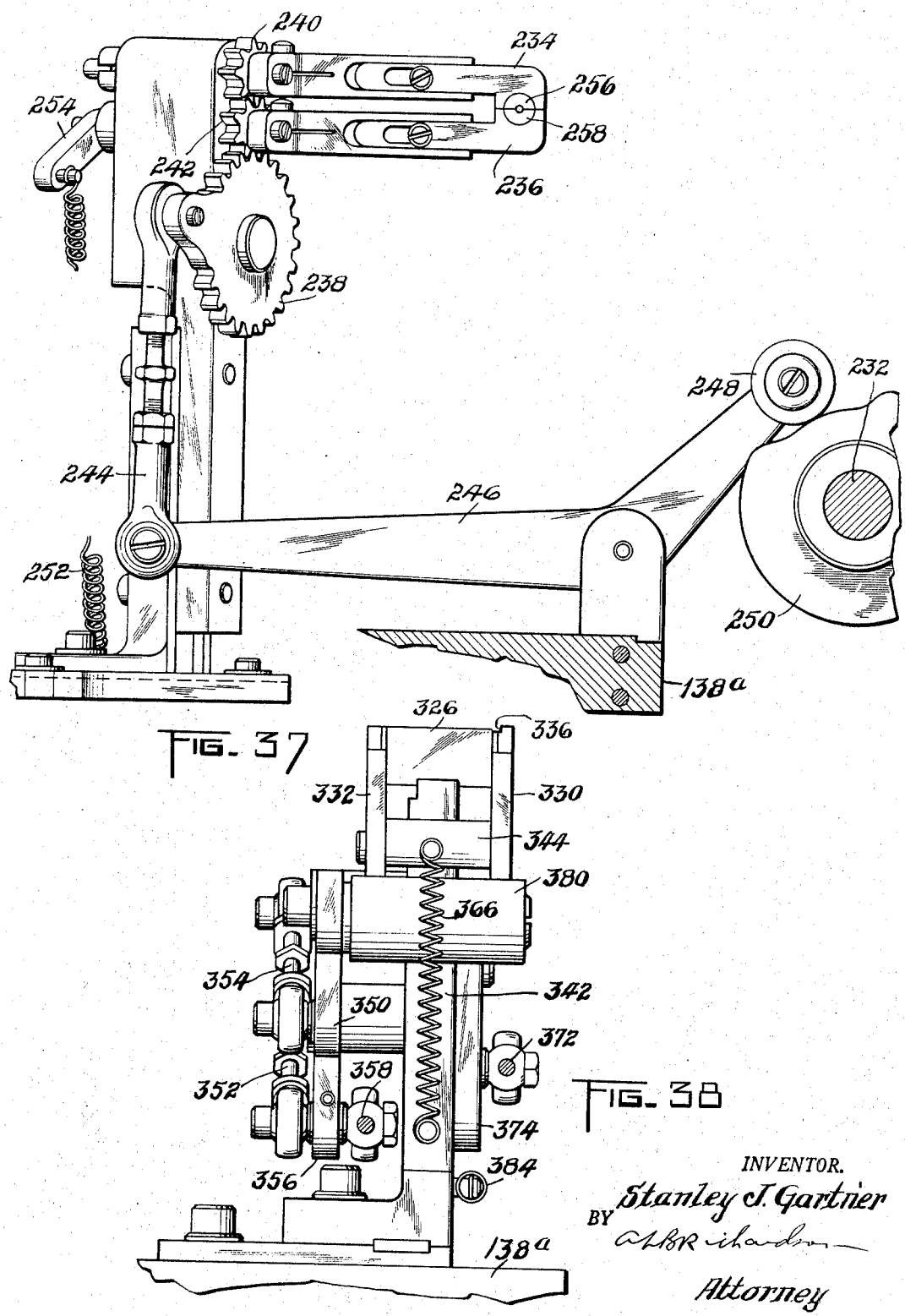

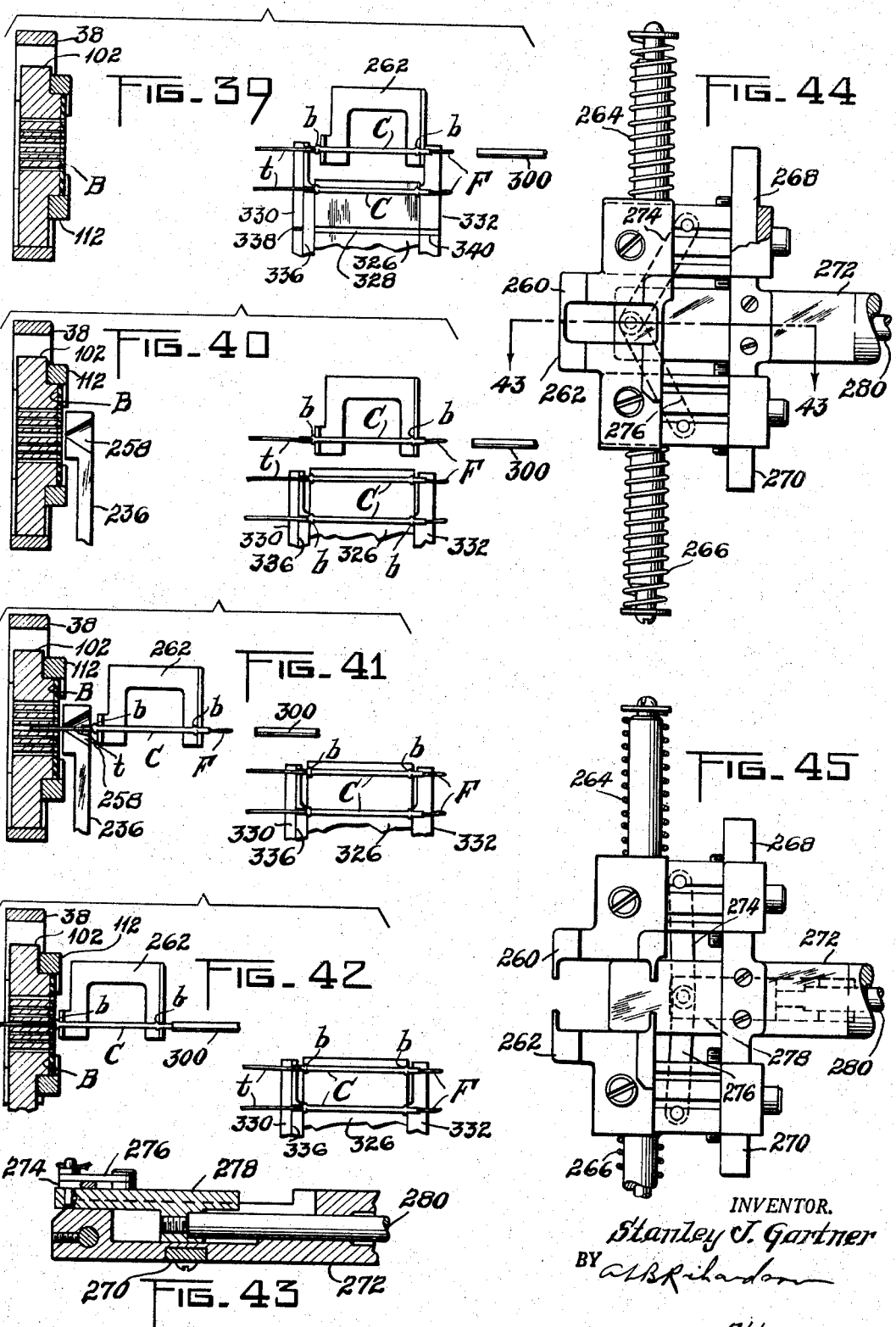

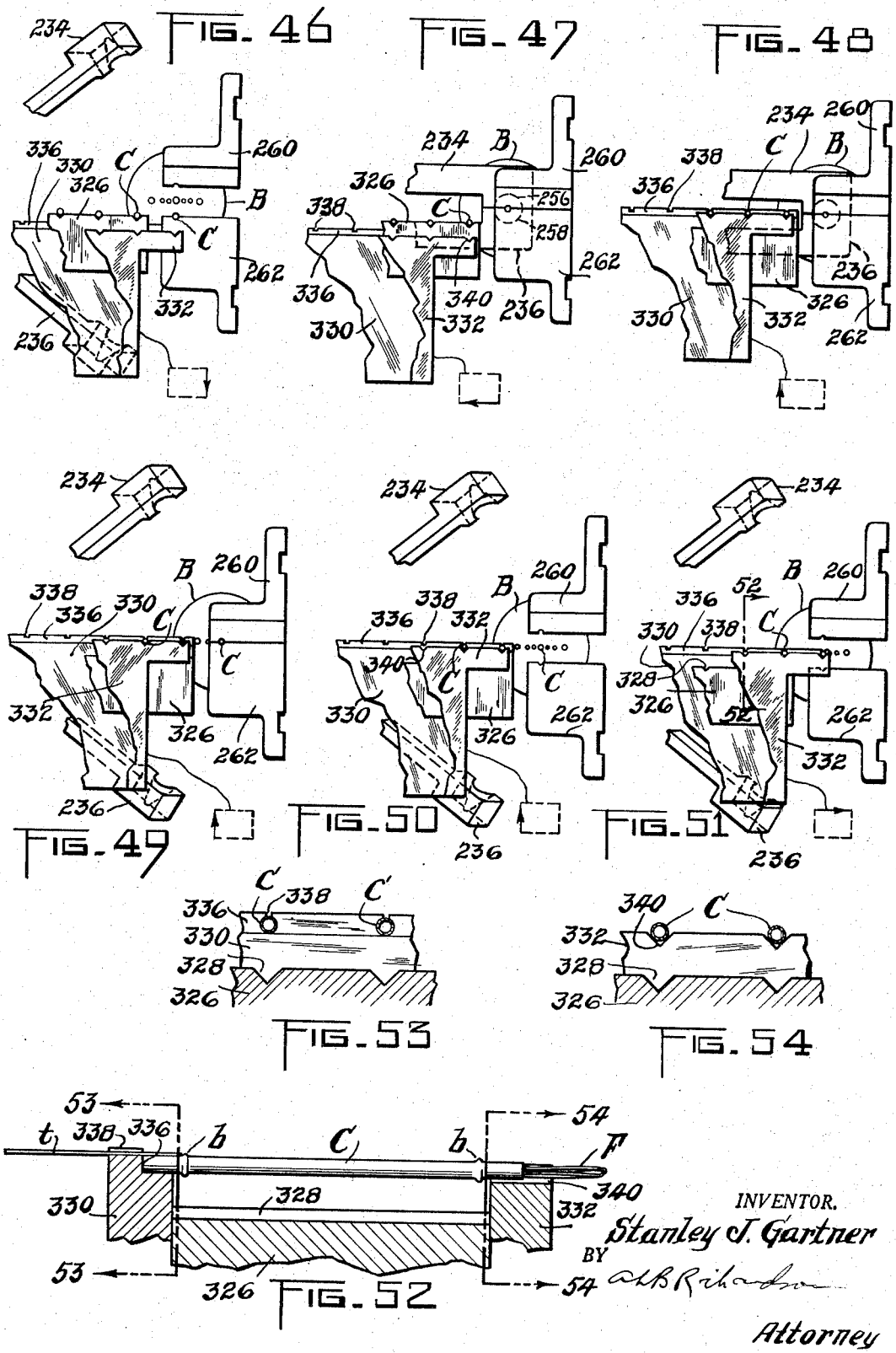

April 16, 1968  S. J. GARTNER  3,377,679
ASSEMBLING MACHINE AND METHOD
Filed Dec. 9, 1947  29 Sheets-Sheet 16
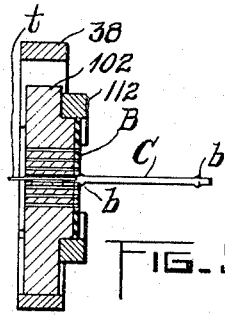
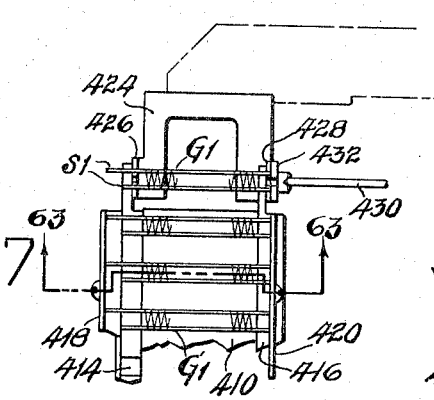
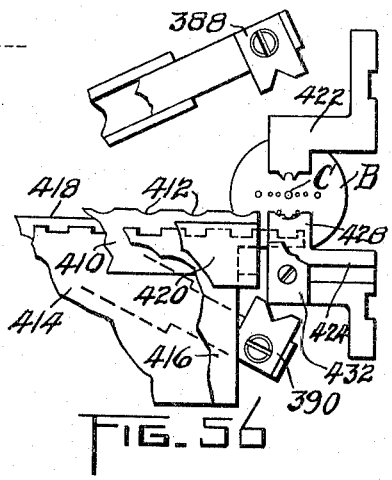
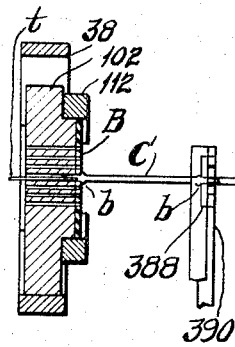
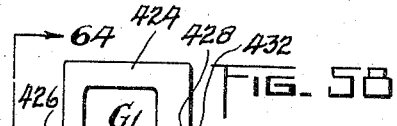
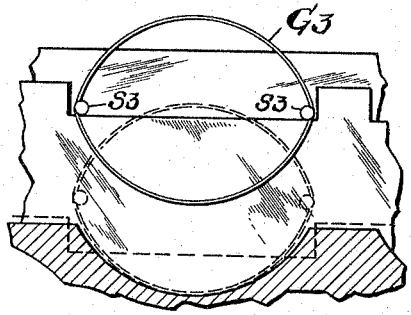
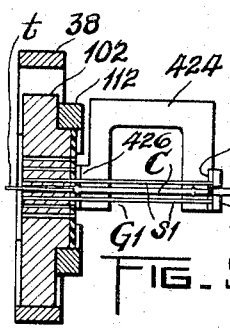
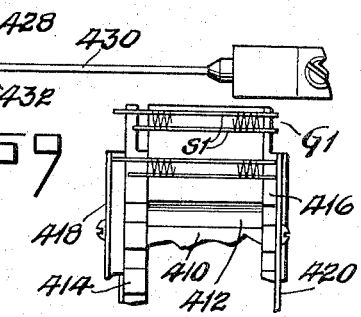
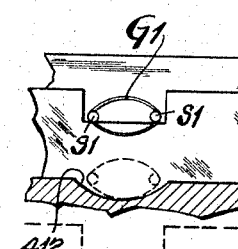
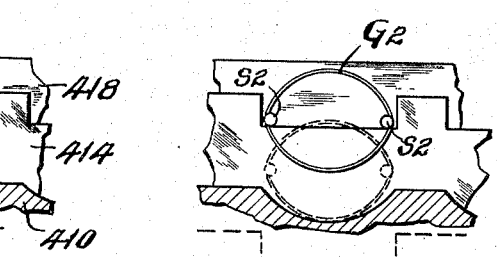
INVENTOR.
Stanley J. Gartner
BY
Attorney April 16, 1968  S. J. GARTNER  3,377,679
ASSEMBLING MACHINE AND METHOD
Filed Dec. 9, 1947  29 Sheets-Sheet 17
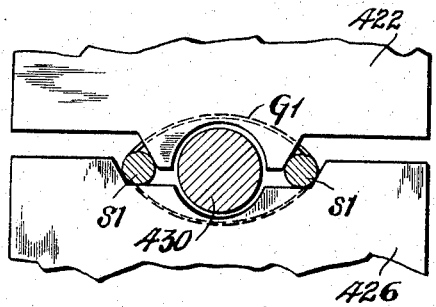
FIG. 64
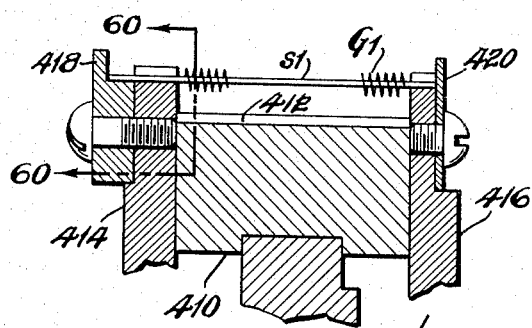
FIG. 63
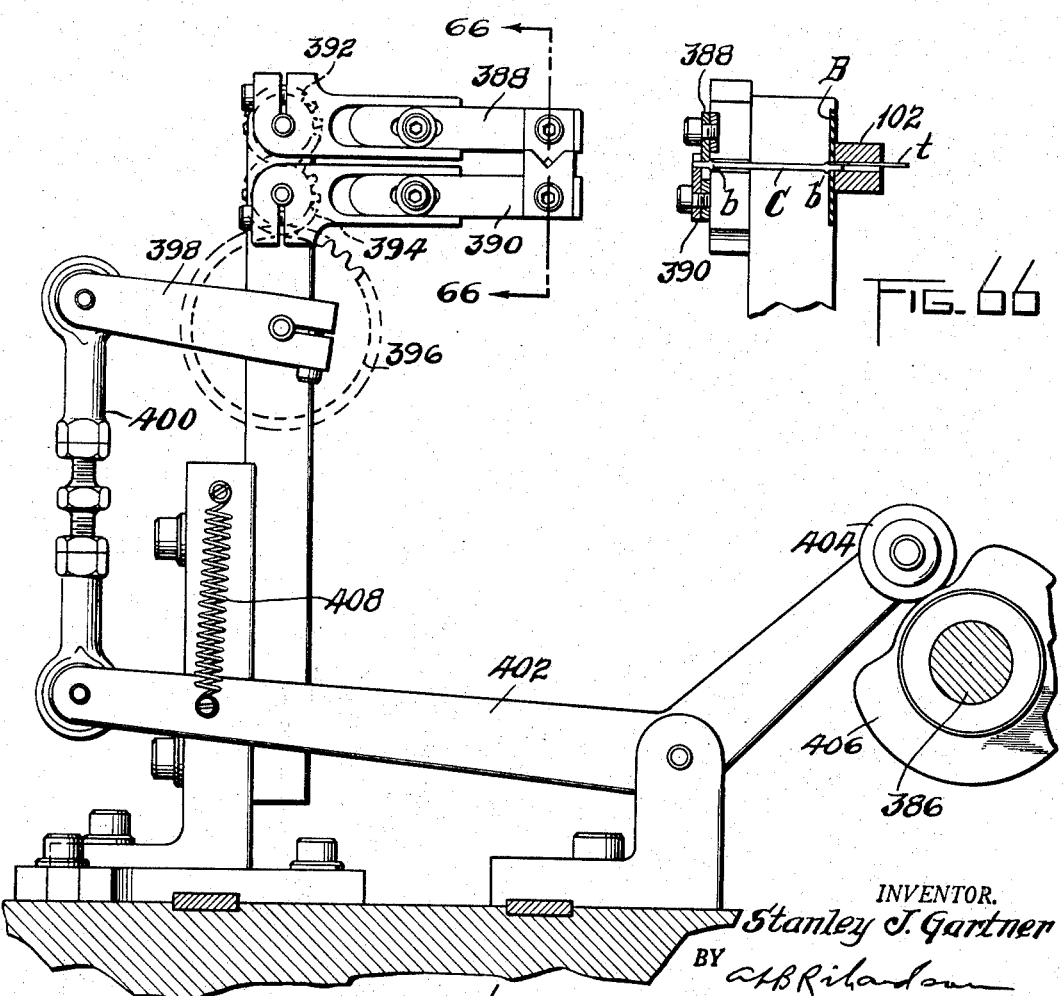
FIG. 66
FIG. 65
INVENTOR.
Stanley J. Gartner
BY
A. B. Richardson
Attorney

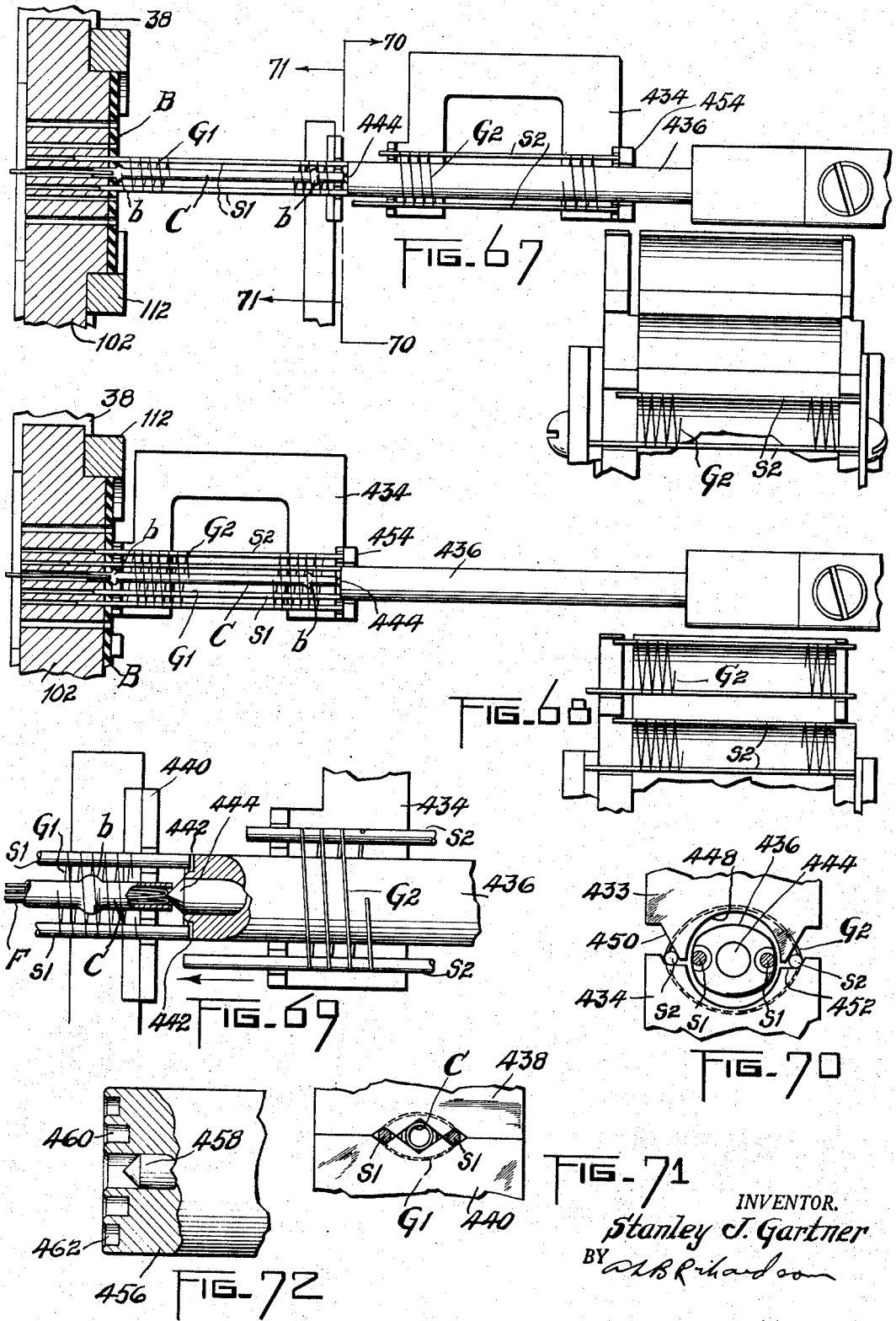

April 16, 1968  S. J. GARTNER  3,377,679
ASSEMBLING MACHINE AND METHOD
Filed Dec. 9, 1947  29 Sheets-Sheet 19

INVENTOR.
Stanley J. Gartner
BY A. B. Richardson
Attorney

April 16, 1968  S. J. GARTNER  3,377,679
ASSEMBLING MACHINE AND METHOD
Filed Dec. 9, 1947  29 Sheets-Sheet 20

INVENTOR.
Stanley J. Gartner
BY A.B.Richardson
Attorney

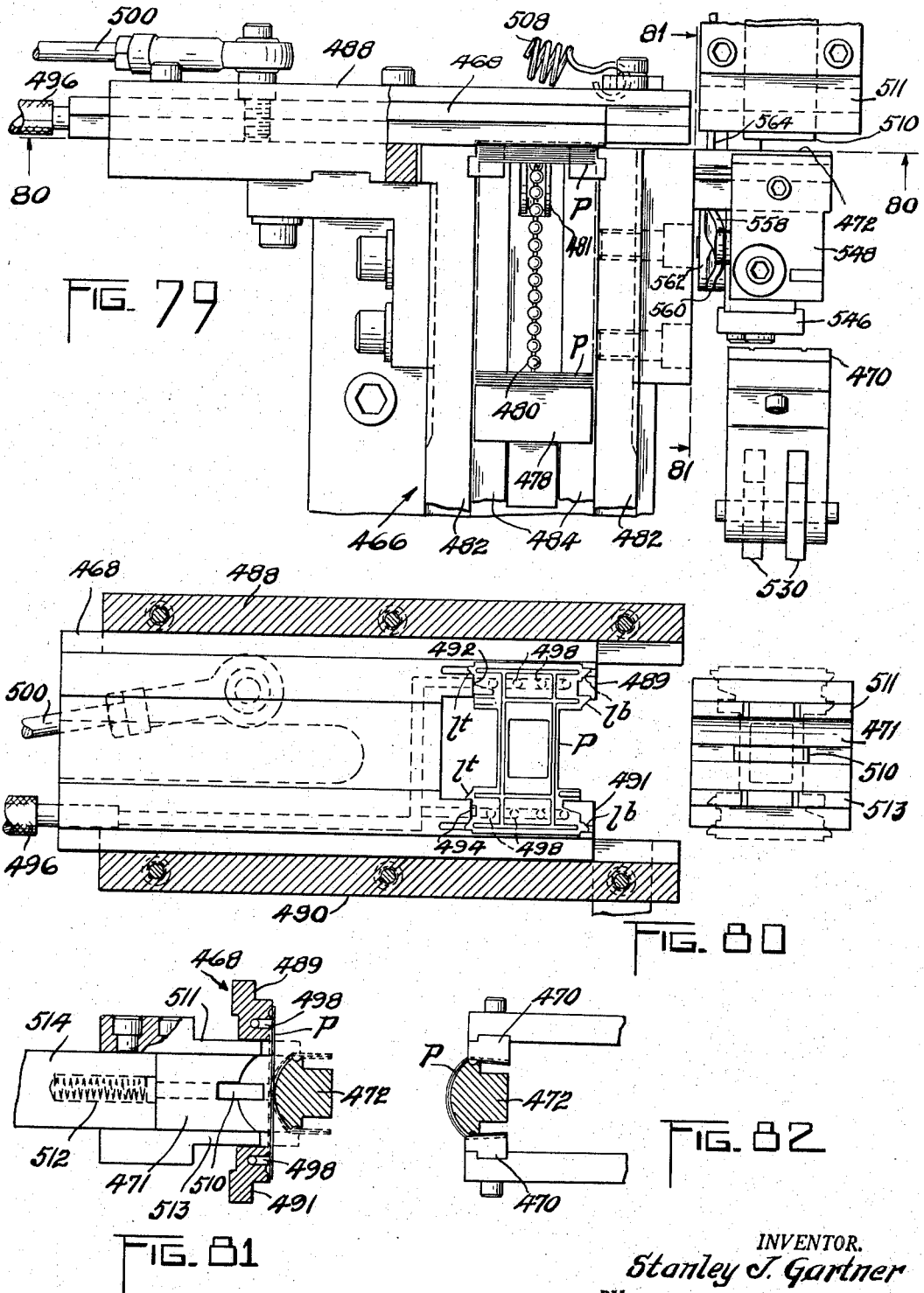

April 16, 1968  S. J. GARTNER  3,377,679
ASSEMBLING MACHINE AND METHOD
Filed Dec. 9, 1947  29 Sheets-Sheet 22

INVENTOR.
Stanley J. Gartner
BY A. B. Richardson
Attorney

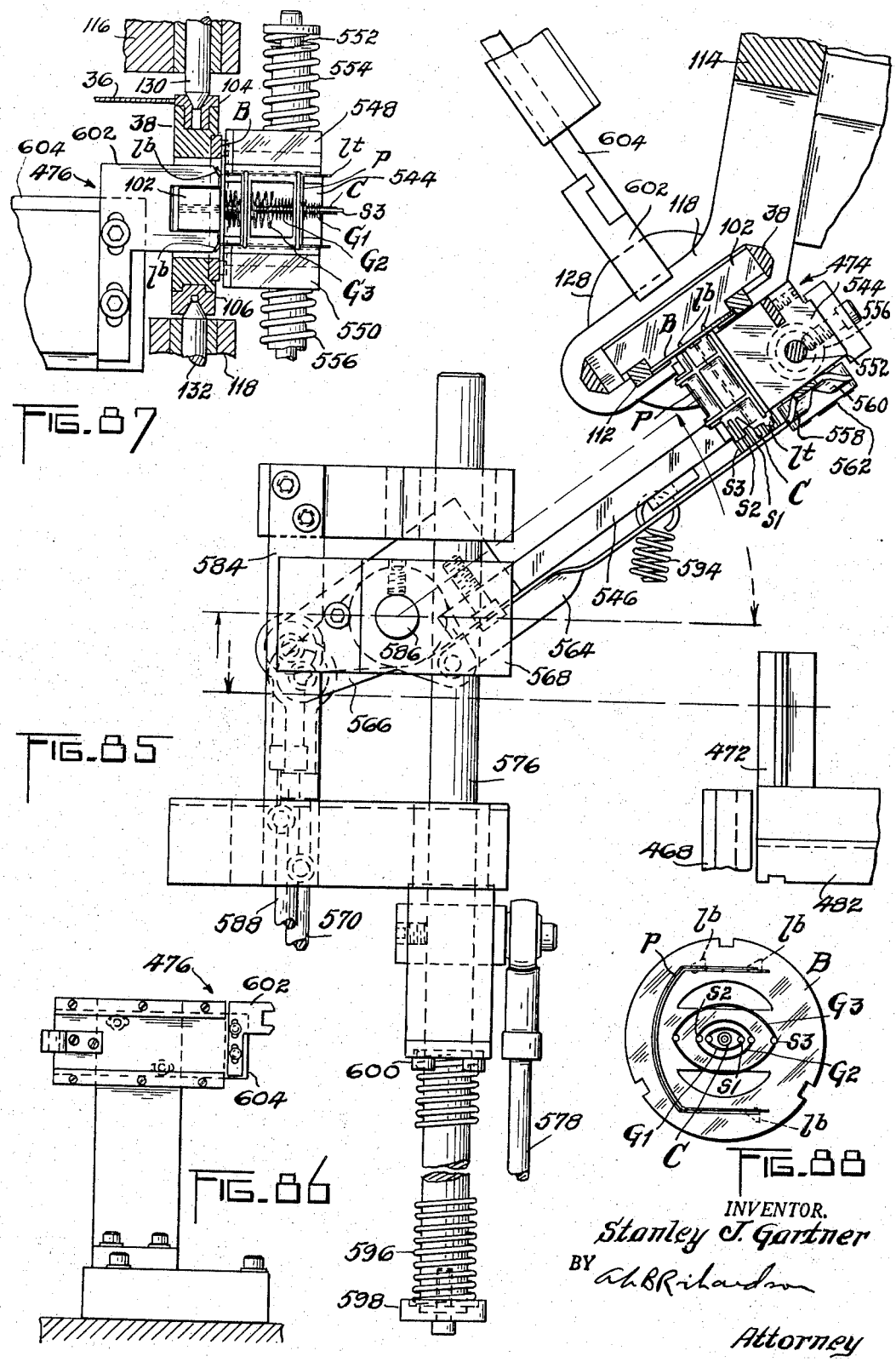

INVENTOR.
Stanley J. Gartner
BY
Attorney

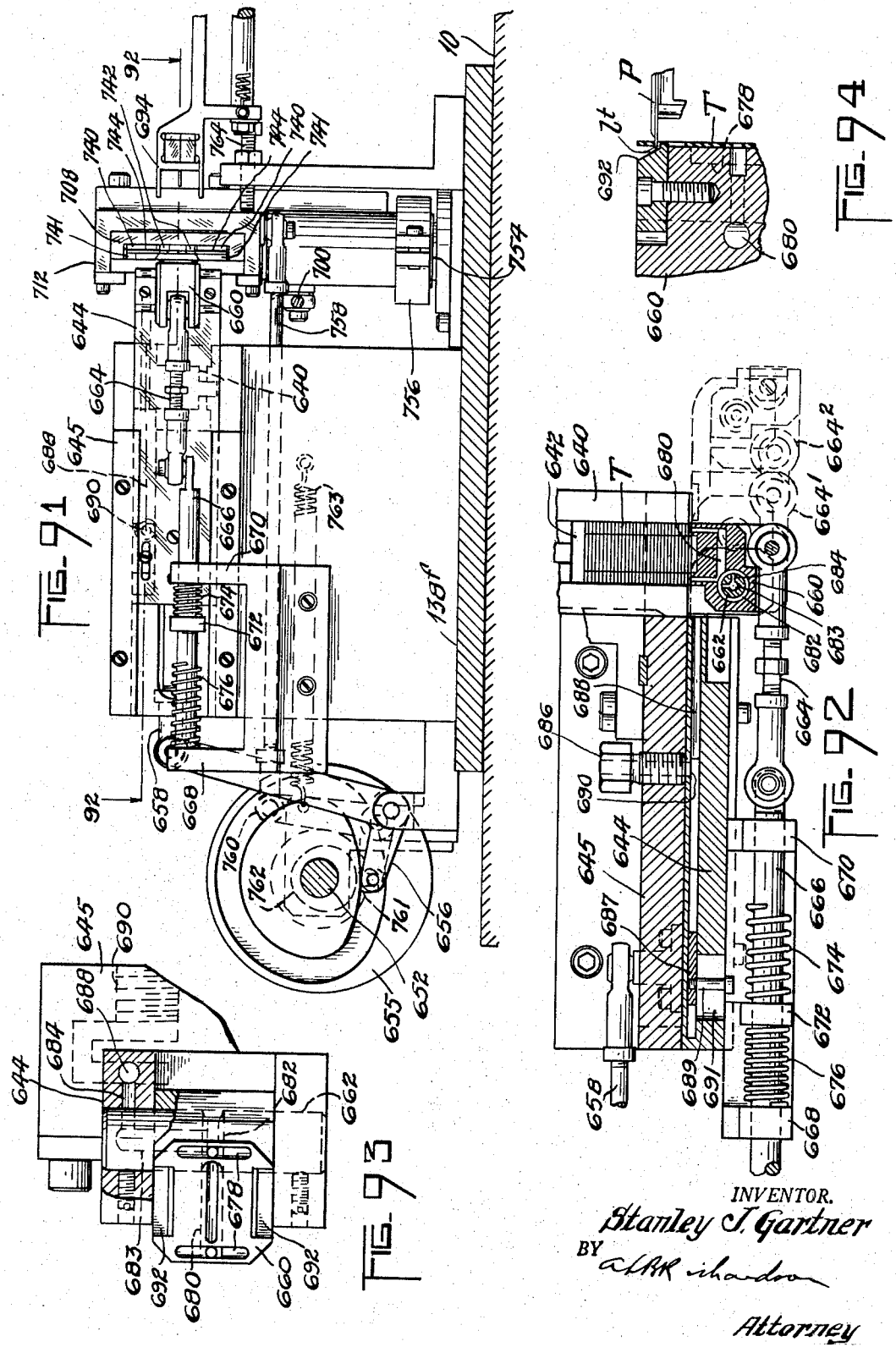

April 16, 1968 S. J. GARTNER 3,377,679
ASSEMBLING MACHINE AND METHOD
Filed Dec. 9, 1947 29 Sheets-Sheet 26

INVENTOR.
Stanley J. Gartner
BY
Attorney

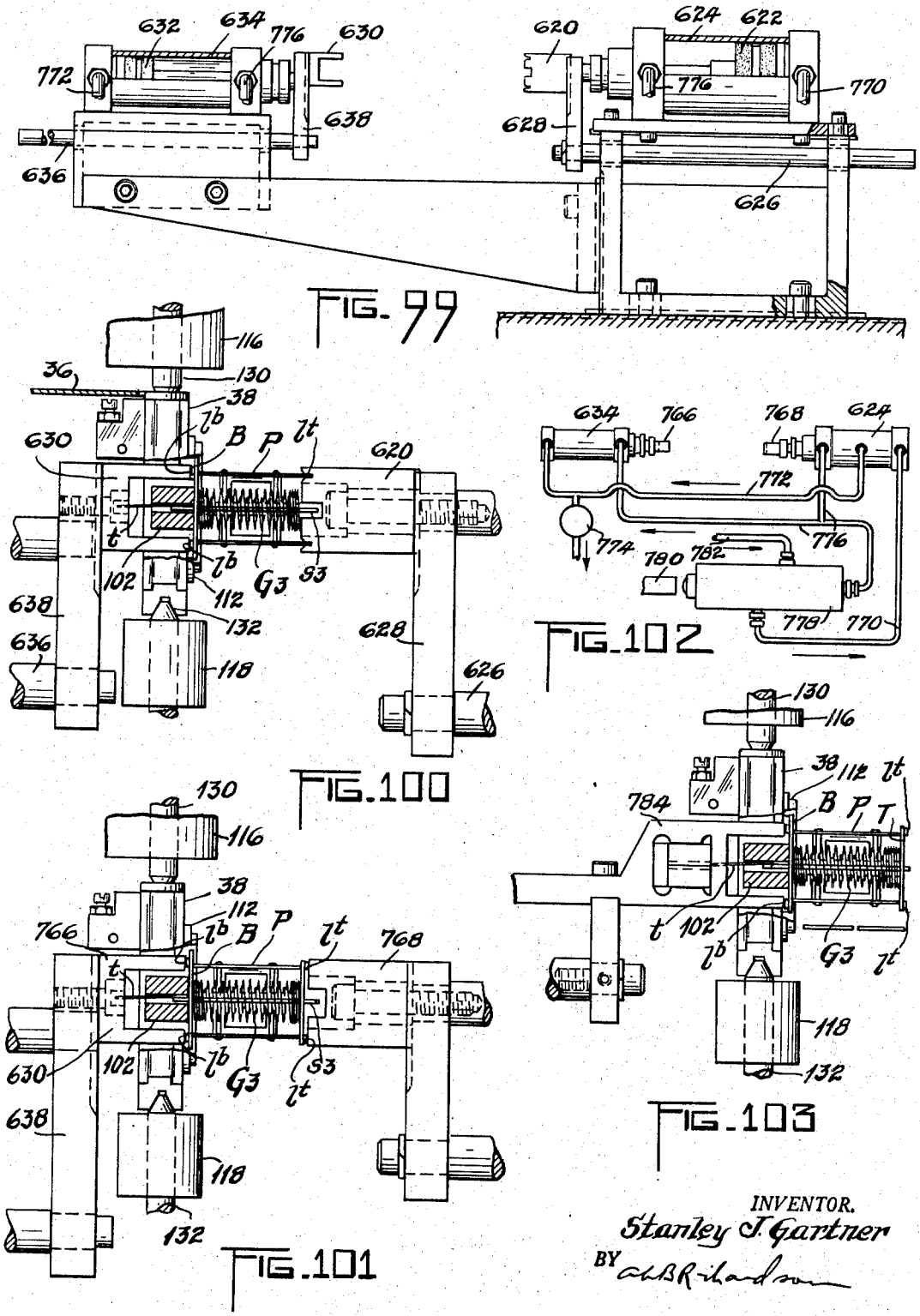

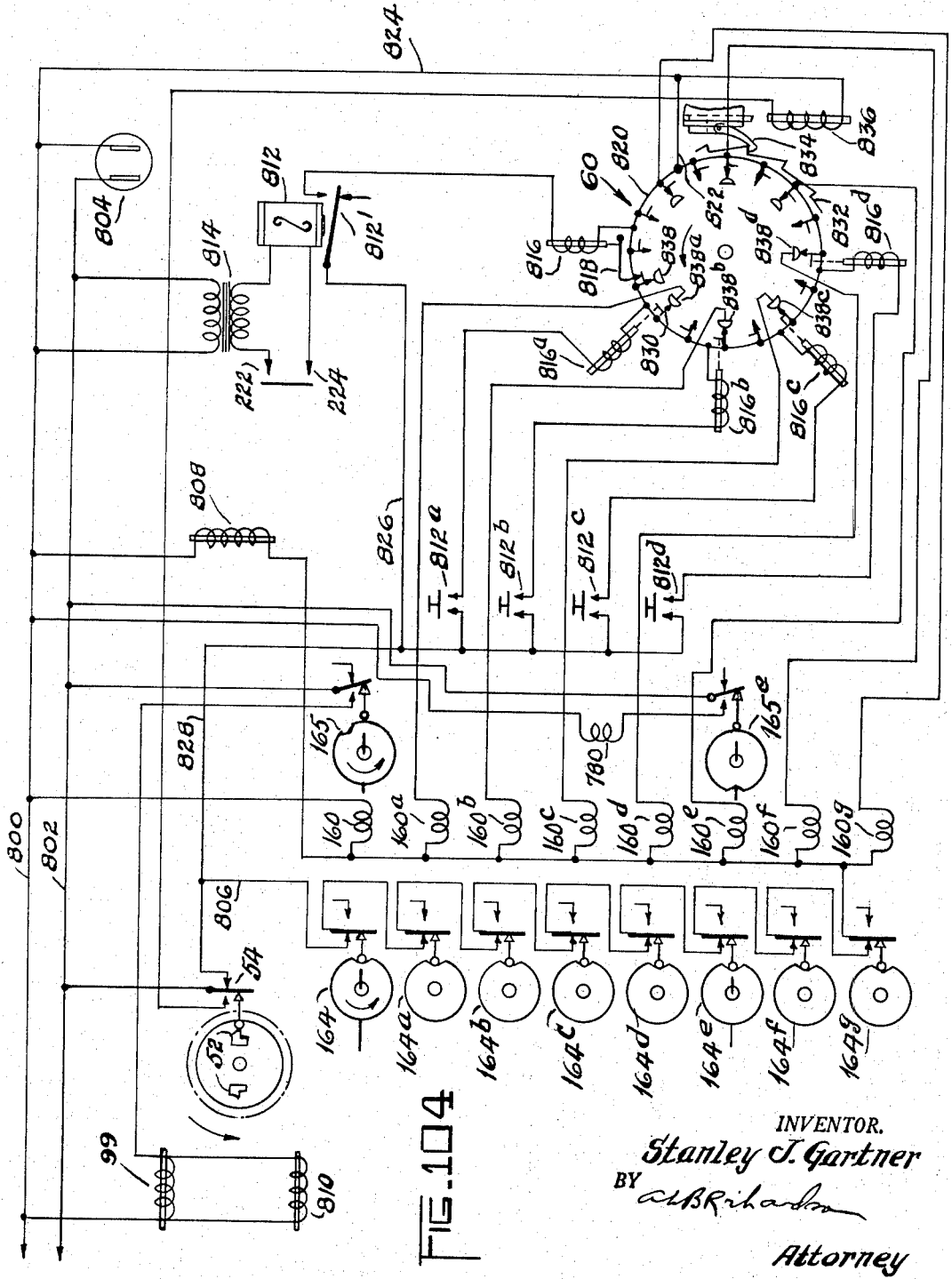

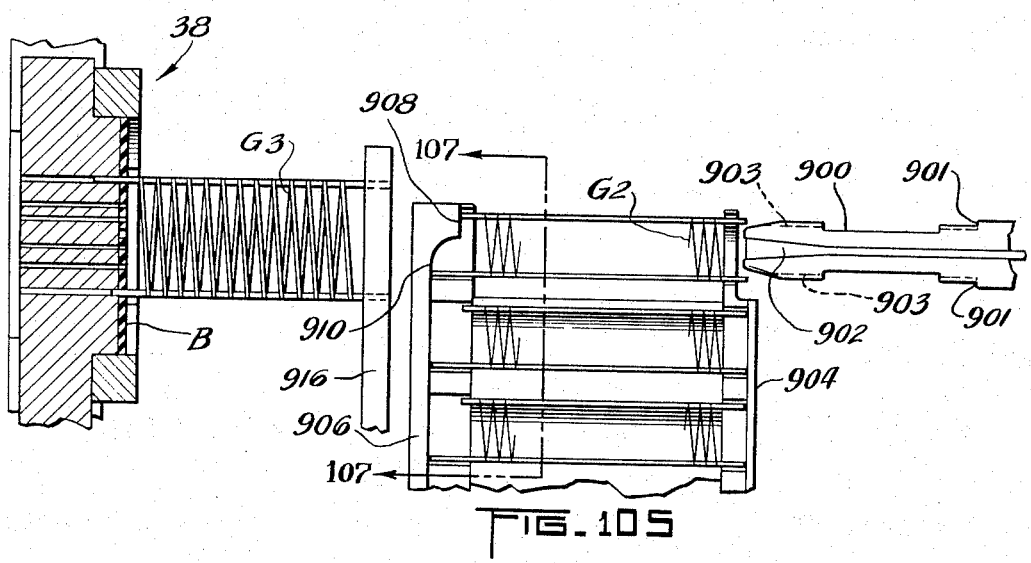
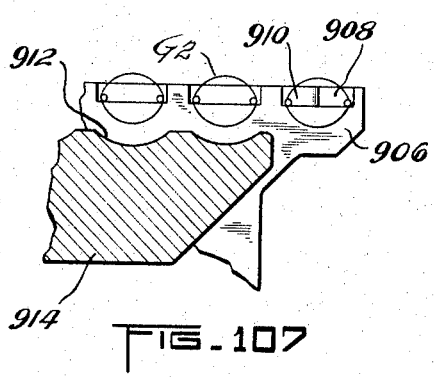
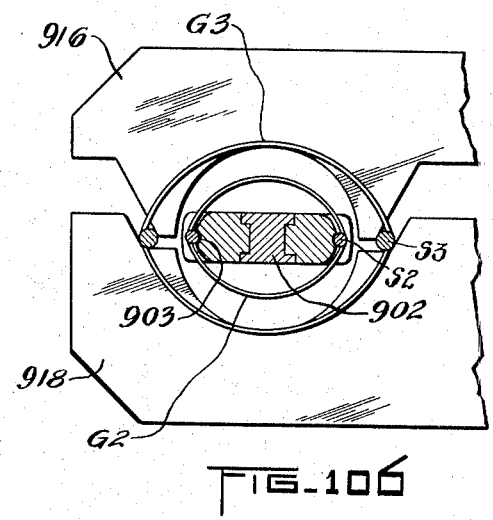

United States Patent Office 3,377,679
Patented Apr. 16, 1968

3,377,679
ASSEMBLING MACHINE AND METHOD
Stanley J. Gartner, Emporium, Pa., assignor, by mesne assignments, to Sylvania Electric Products, Inc., Wilmington, Del., a corporation of Delaware
Filed Dec. 9, 1947, Ser. No. 790,570
96 Claims. (Cl. 29—25.16)

The present invention relates to methods and apparatus for assembling small parts such as those constituting the electrode assembly or mount of an electron-discharge device.

Electron-discharge tubes of widest application at the present time, in the radio-tube field particularly, include multiple more or less tubular, nested electrodes. These are assembled in succession and welded to terminals and supports by manual methods. The operator delicately assists each electrode in a haphazard path toward its ultimate assembly with other electrodes. There is a possibility of damage to each electrode handled and to the previous subassembly, and the procedure is slow.

In the most common type of mount, the nested electrodes are mutually spaced by apertured insulating wafers penetrated by the ends of the electrodes. It is this form of mount which is of greatest present commercial importance.

An object of the present invention is to provide novel assembling methods for expediting the manufacture of electron tubes having nested electrodes and, more particularly, the manufacture of tubes having multiple apertured insulating wafers. A further object of the invention is to provide apparatus for expeditiously and reliably assembling electron tubes of the foregoing types and for assembling like articles of manufacture. An additional object is to provide novel ancillary mechanisms forming useful subcombinations contributing to the success of the assembling apparatus.

In the following portion of this specification an illustrative embodiment of my improved machine is described which utilizes novel assembling procedures and which incorporates novel mechanisms and combinations of mechanisms for achieving the foregoing objects. In this machine a conveyor carries a fixture stepwise to multiple assembling units in succession, so that a subassembly progressively becomes the completed mount.

In a novel assembling unit of this machine and its method of operation, each electrode is carried endwise along a definite path into assembly with another part which is at that time accurately held in a predetermined related position. This firm handling promotes rapid assembly operations and forestalls mutual deformation and destruction of the parts. The free end of an electrode extending from a support is first gripped by jaws which converge laterally, and then this end is supported by a rodlike locator that is moved endwise into contact with the electrode. (Each form of locator, lateral or end-engaging, will be found to have its own use separately under different circumstances.) The jaws pick up and center the electrode end in the illustrative machine. The rod maintains the orientation while enabling removal of the jaws. Before the locator rod engages the electrode subassembly it is threaded lengthwise through a hollow electrode that is next to be inserted. When the rod engages the previously assembled electrode, the locating jaws are separated to clear a path for the hollow electrode, and this is then projected along the rod and into nested relation with the previously assembled electrode or electrodes.

This mechanism and procedure will be found to have application where the electrodes are immediately to be welded to terminals sealed through a glass press, wafer, or the like, and where no apertured mica is used. The method and mechanism are also useful where pairs of apertured insulating wafers or "spacers" as of mica are relied on for the mutual spacing of the electrodes. Without departing from certain fundamentals, the machine can be adapted to assembly of electrode mounts having tandem sets of electrodes between three apertured spacers, and to assembly of mounts having multiple groups of electrodes between a single pair of spacers.

Where the electrode ends project through spacers their fit is usually snug. In the machine herein described the projecting ends of one electrode are deformed for tight and permanent assembly of the spacers to the electrodes. In particular, lugs extending from the ends of a sheet-metal anode are bent and flattened against the outside faces of the spacers. The electrode ends may generally be secured in any suitable manner.

An electrode mount may employ a filamentary cathode or an indirectly heated cathode. The latter usually includes a frail tab projecting from one end of a tube, which tube contains a filamentary heater having terminals of fine wire. When my improved machine is used for this type of tube the machine may employ a multi-part funnel for guiding the tab of a cathode as it is projected toward an apertured support with the tab foremost, and the funnel is withdrawn after the tab enters the aperture so that the cathode-carrying device can approach very close to the face of the support. This support is the apertured mica spacer in the illustrative disclosure, although the thought would be similar in respect to any other mount-support were no mica spacer used. The tab is inserted without deformation, and is freely available for connection where it projects past the spacer.

The filamentary heater is enclosed within the tab end of the cathode and projects from the back end of the cathode tube. After the cathode has entered the aperture, a mechanism is effective to push the filamentary heater forward, thereby to make the filament terminals just as available for connection beyond the insulating wafer as is the cathode tab.

Most of the electrodes to be assembled are completed in other machines before they are supplied to the assembling machine described below. In order to facilitate the handling of certain of the electrodes, as for example the anode, an essentially flat blank may be supplied to the machine which may be bent into the desired shape by the apparatus which transfers it from a magazine to the electrode subassembly. The anode may be formed in this manner into a U-shaped member from a flat, ribbed blank. It will be evident that other electrodes of sheet metal and anodes of other than U-shaped cross-section can similarly be supplied as flat blanks and bent into the desired cross-section.

When mechanically assembling relatively small parts such as are employed in radio tubes, comparatively accurately spacing or positioning the parts before relative movement thereof into the assembled position is an important consideration. Where a fixture is used as in the illustrative machine, and it is conveyed past multiple assembling units in succession, it is desirable to include a fixture-orienting mechanism adjacent each unit.

The novel features of the machine some of which are emphasized above are instrumental in producing mounts of the particular type for which the illustrative machine is adapted; but it should be understood that many of the features are also susceptible to application alone and in other combinations. The accompanying drawings, forming part of the disclosure of this invention, illustrate the specific embodiment of the invention in its various aspects as applied to the assembly of a particular mount having a pair of mica spacers, and are in such detail as will enable those skilled in the art to practice the invention as applied to the assembly of other mounts and similar assemblies.

FIG. 1 is a showing in detail of the several elements of the mount assembly, these parts being arranged from left to right in the order of handling by the machine.

FIG. 2 is an end view of the completed mount assembly.

FIG. 3 is a sectional view on line 3—3 of FIG. 2.

FIG. 4 is a schematic plan view of the machine in which the several operating units are shown at their respective stations along the work conveyor, and adjacent each unit there is a representation of the mount subassembly in the condition in which it leaves that particular unit.

FIG. 5 is a view in side elevation of the machine with the assembling mechanisms and their individual driving mechanisms omitted.

FIG. 6 is an enlarged plan view of the conveyor and its supporting frame as seen in FIG. 5, the central portion being broken away.

FIG. 7 is an end view of the machine showing the indexing mechanism, parts being shown in section.

FIG. 8 is a plan view, partly in section, of the indexing drive seen in FIG. 7.

FIG. 9 is a fragmentary plan view of the conveyor and associated parts at one of the operating stations.

FIG. 10 is a sectional viw on line 10-10 of FIG. 9.

FIG. 11 is a reduced-scale detail in side elevation of the standard seen in FIG. 9 for supporting a mica block locating and retaining clamp.

FIG. 12 is a sectional view on line 12—12 of FIG. 9, the bellows and locating pins carried thereby being shown in full.

FIG. 13 is a view, from the right, of parts shown in FIG. 12.

FIG. 14 is a rear view of the mica block shown in FIGS. 12 and 13.

FIG. 15 is a sectional detail on line 15—15 of FIG. 9.

FIG. 16 is a plan view of the bottom mica loading mechanism and that portion of the conveyor adjacent thereto.

FIG. 17 is a detail in end view of the air valve of FIG. 16.

FIG. 18 is a side elevation of the detector for testing the mica blocks for presence of a bottom mica therein.

FIG. 19 is a view similar to FIG. 16 but with the conveyor omitted and the cover plate and top of the turret removed to show certain mechanisms underneath.

FIG. 20 is a view in elevation of the plate carrying the mica-supporting buttons and its operating mechanism.

FIG. 21 shows in plan view one of the supporting buttons and the associated mica locating means.

FIG. 22 is a section on line 22—22 of FIG. 21.

FIG. 23 is a cross section through the mechanism of FIG. 16 taken in the plane of the mica-transferring arm.

FIG. 24 is a face view of the mica-holding end of such arm.

FIG. 25 is a sectional view on line 25—25 of FIG. 24.

FIGS. 26 and 27 are greatly enlarged views, with portions broken away, of the cathode before and after insertion in a bottom mica.

FIG. 28 is a face view of a bottom mica with an inserted cathode.

FIG. 29 is a plan view of the inserting mechanism of the cathode unit.

FIG. 30 is a sectional detail on line 30—30 of FIG. 29.

FIGS. 33 and 34 are plan view and side elevation, respectively, of the four-motion feeding mechanism of the cathode unit.

FIG. 35 is a side view of the upper link seen in FIG. 33 and parts connected thereby.

FIG. 36 is a cross sectional view in the plane 36—36 of FIG. 33.

FIG. 37 is a face view of the centering and guiding jaws for the cathode tab and its operating mechanism.

FIG. 38 is an end view from the right of the mechanism shown in FIGS. 33 and 34, the plane of such view being just to the left of the bell-crank cam followers.

FIGS. 39, 40, 41 and 42 show a mica block in horizontal central section and illustrate the successive step of inserting a cathode into a bottom mica.

FIG. 43 is a section on line 43—43 of FIG. 44.

FIGS. 44 and 45 are side views showing the cathode feed jaws in closed and open positions, respectively, and parts associated therewith.

FIGS. 46 through 51 are schematic views showing the relative positions of cathode feeding and inserting mechanisms during their cycle of operation.

FIG. 52 is a section on line 52—52 of FIG. 51.

FIGS. 53 and 54 are cross sections on lines 53—53 and 54—54, respectively, of FIG. 52.

Figure 31:
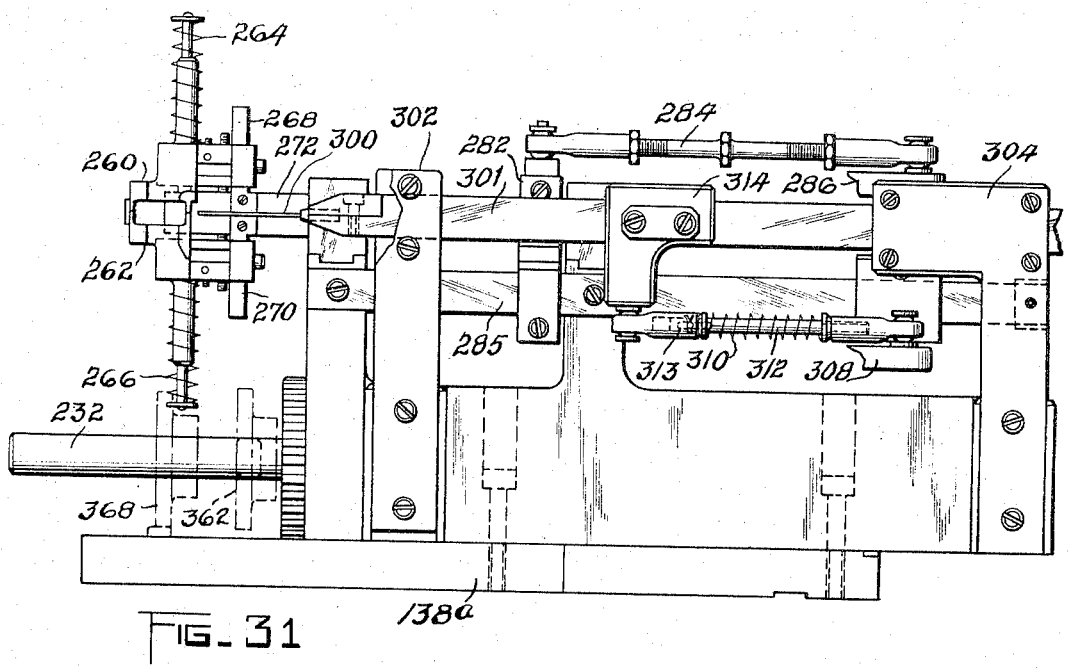
FIG. 31 is a view in elevation of parts seen in FIG. 29.
Figure 32:
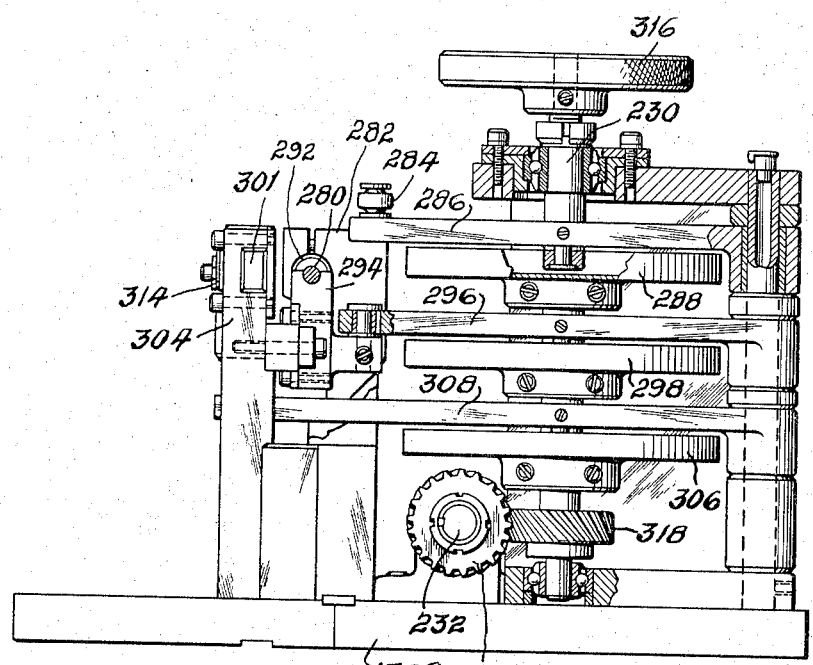
FIG. 32 is an elevation, looking to the left in FIG. 29, with certain portions being shown partly in section.
Figure 55:
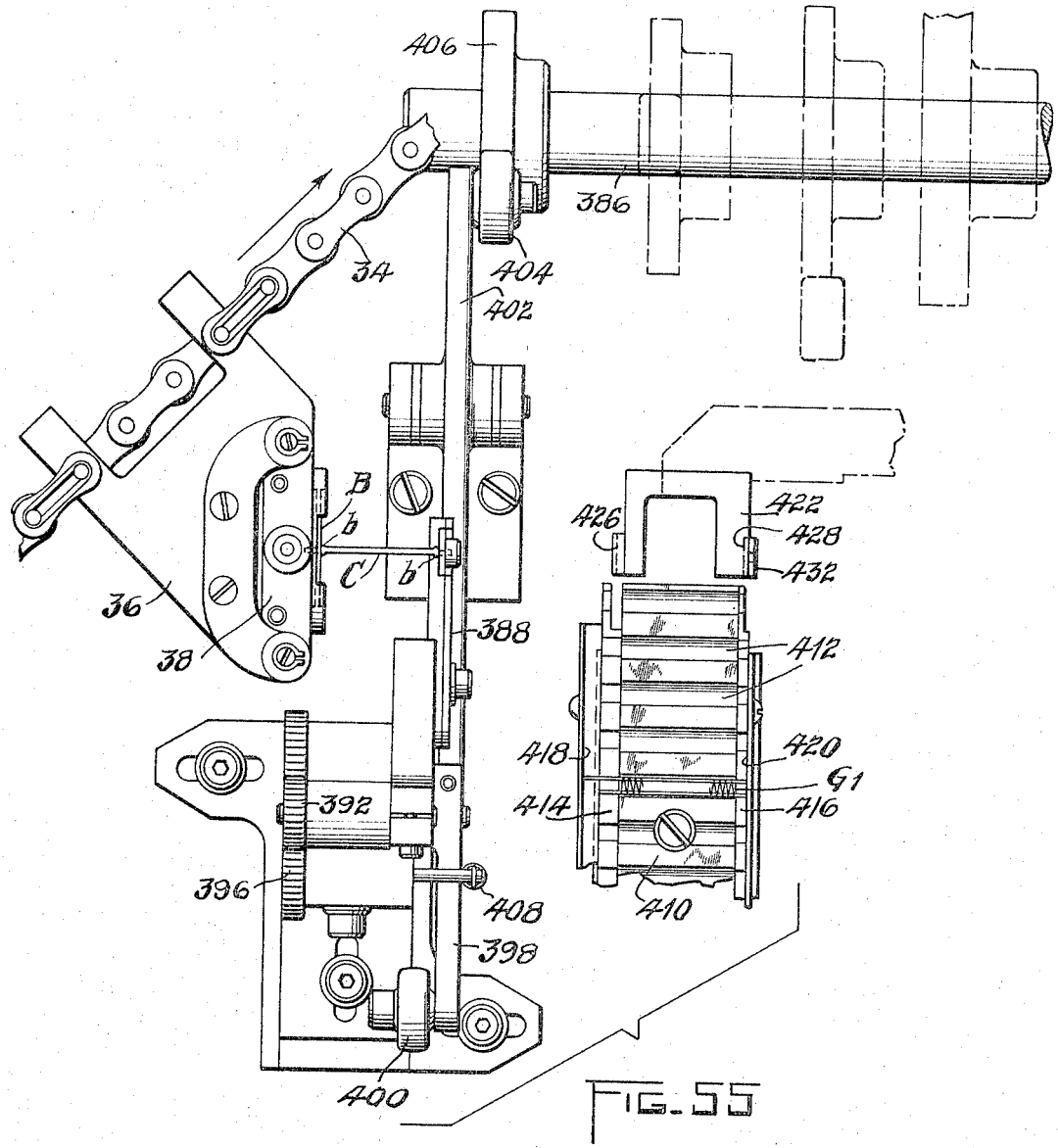

FIG. 55 shows in plan view part of the No. 1 grid assembling unit which aligns an inserted cathode for receiving a grid thereover.

FIG. 56 shows the relative positions of parts of the No. 1 grid unit at the start of its cycle.

FIGS. 57, 58 and 59 are views similar to FIGS. 39, 40 and 41 but illustrating successive steps in the No. 1 grid cycle.

FIG. 60 is a section on line 60—60 of FIG. 63.

FIGS. 61 and 62 are views similar to FIG. 60 but relating to the No. 2 and No. 3 grid units, respectively.

FIG. 63 is a section on line 63—63 of FIG. 57.

FIG. 64 is a section on line 64—64 of FIG. 58.

FIG. 65 is a view similar to FIG. 37 but of centering mechanism in the first grid inserting unit for adjusting the free end of the cathode.

FIG. 66 is a section on line 66—66 of FIG. 65, and showing the relation of the jaws to the mica block.

FIGS. 67 and 68 are views similar to FIGS. 58 and 59 but relating to the No. 2 mica unit.

FIG. 69 is a fragmentary detail featuring the supporting means for the free ends of the cathode and the No. 1 grid, with the No. 2 grid carrier.

FIGS. 70 and 71 are sections on lines 70—70 and 71—71, respectively, of FIG. 67.

FIG. 72 is a detail of the holding rod corresponding to that shown in FIG. 69 but as used with the No. 3 grid unit.

Figure 73:
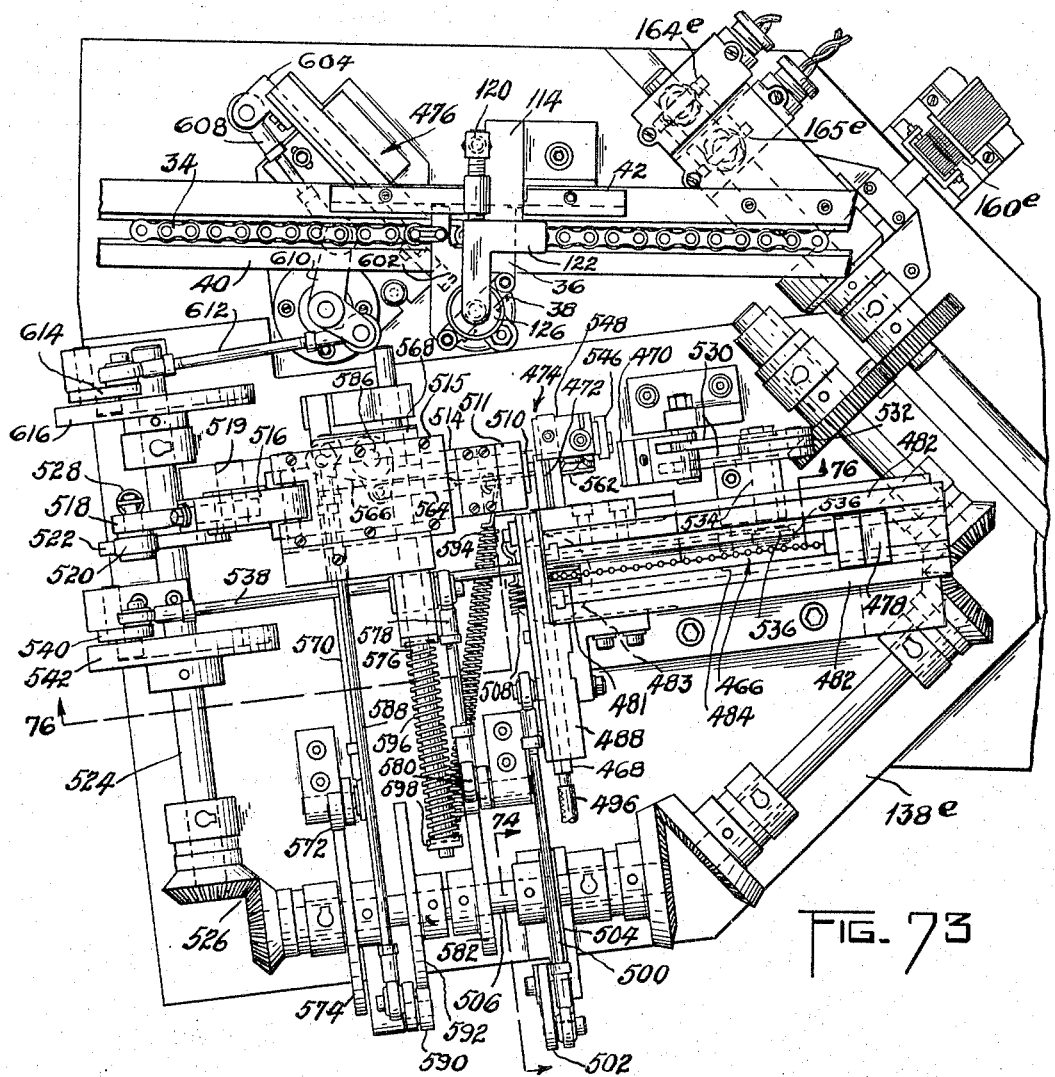

FIG. 73 is a plan view of the plate assembling unit.

Figure 74:
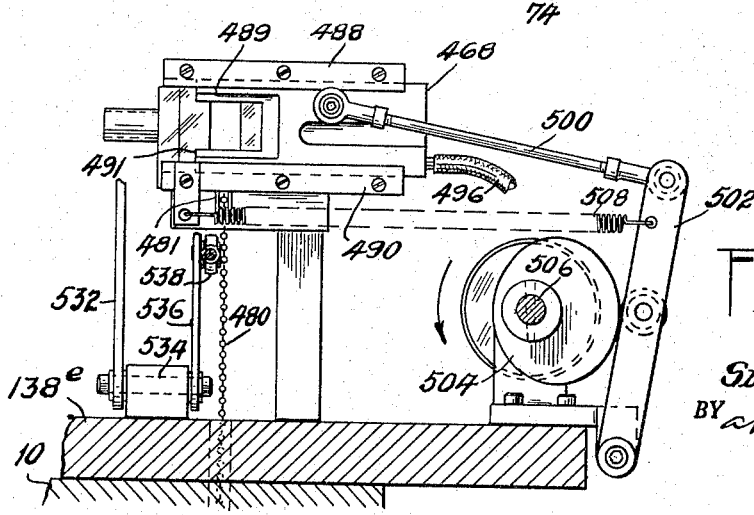
Figure 75:
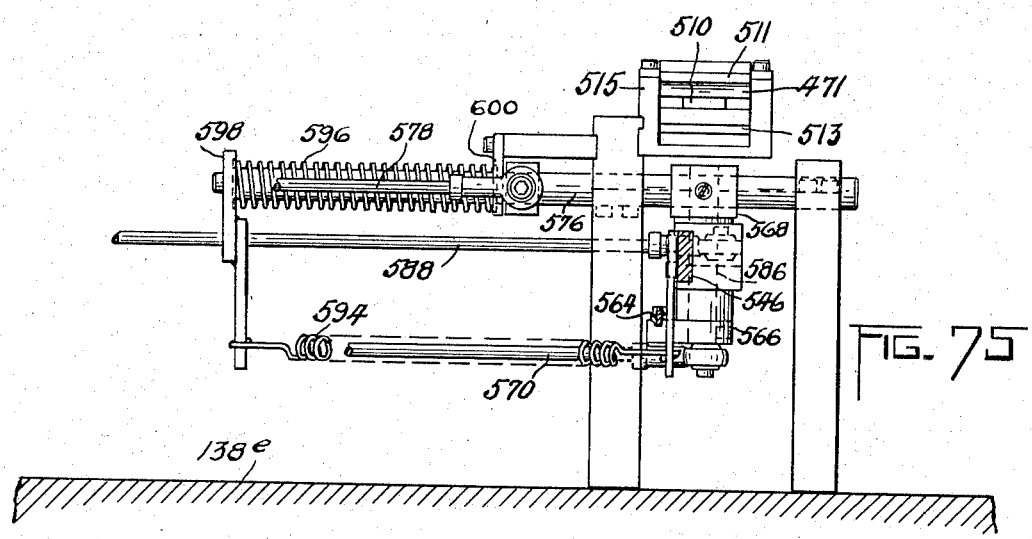

FIGS. 74 and 75 are views in elevation of parts to the right and left, respectively, on line 74—74 of FIG. 73.

Figure 76:
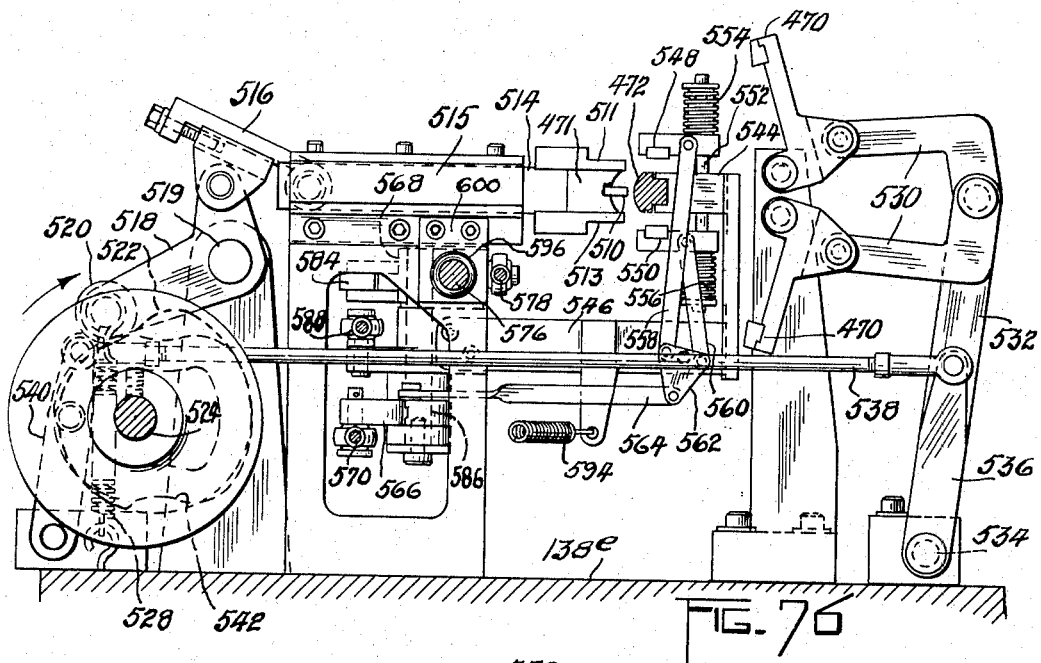

FIG. 76 is a sectional view on line 76—76 of FIG. 73.

Figures 77, 78:
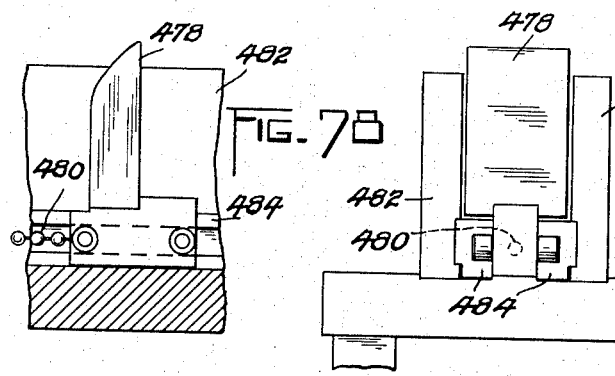

FIGS. 77 and 78 are details in end and side elevation of the plate magazine follower block.

FIG. 79 is a top plan, drawn to actual size, of associated parts including fragmentary portions of the plate forming dies, gripping jaws and the slide for moving the plates from a supply point to the forming dies.

FIG. 80 is a section on line 80—80 of FIG. 79.

FIGS. 81 and 82 are sectional details through the mandrel on line 81—81 of FIG. 79, showing in side view associated parts in different stages of the forming operation.

Figure 83:
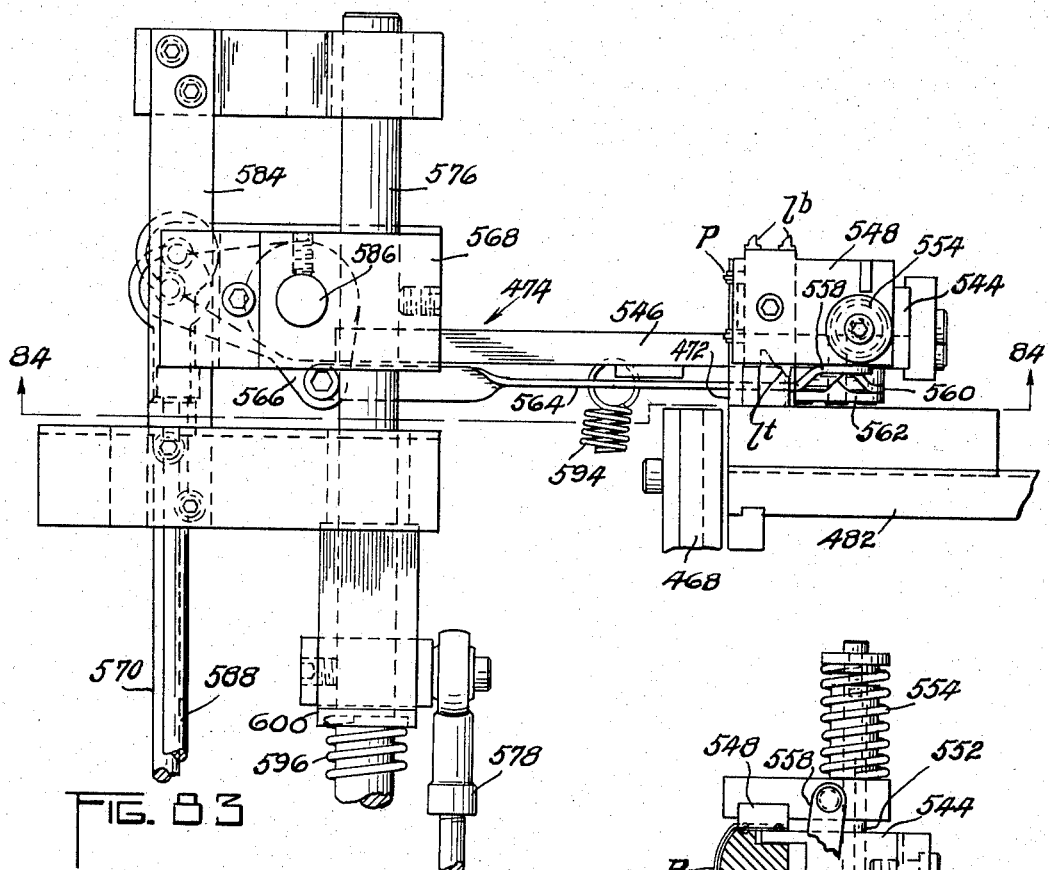

FIG. 83 is a plan view of the mechanism for carrying the formed plate from the arbor to a mica block on which a cathode and grids have been assembled.

Figure 84:
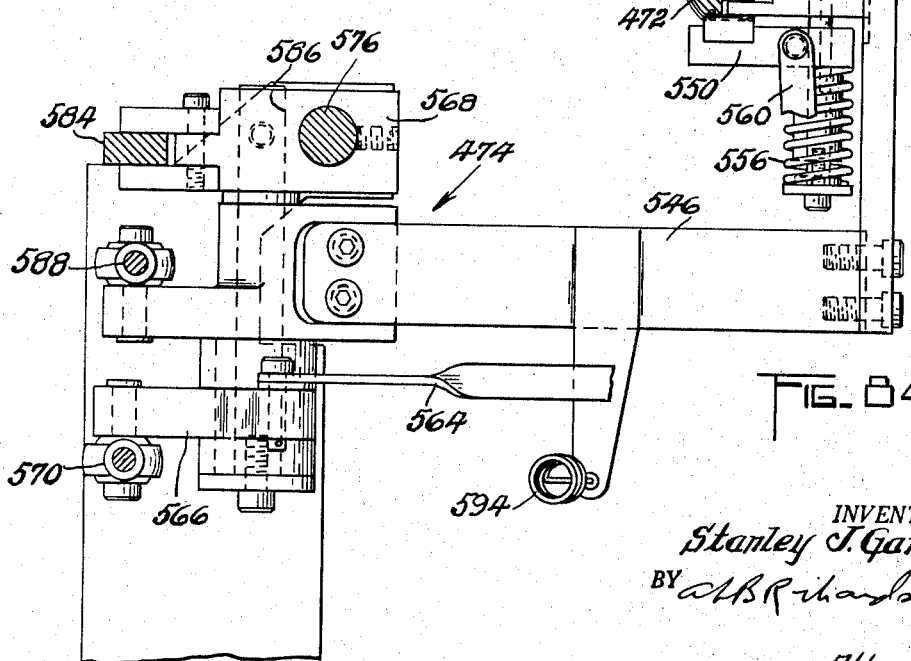

FIG. 84 is a section on line 84—84 of FIG. 83.

FIG. 85 is a view similar to FIG. 83 but with the work carrying arm moved forward and then angularly into cooperating position with a mica block which is also shown.

FIG. 86 is a side elevation of the lug-crimping head used in the plate unit.

FIG. 87 is a fragmentary view partly in elevation and partly in vertical central section through the mica block with the several parts in the respective positions shown in FIG. 13 with the exception of the staker or tab setting slide, which is moved forward into operative position.

FIG. 88 is an end view of the assembled parts emerging from the plate unit.

Figures 89, 90:
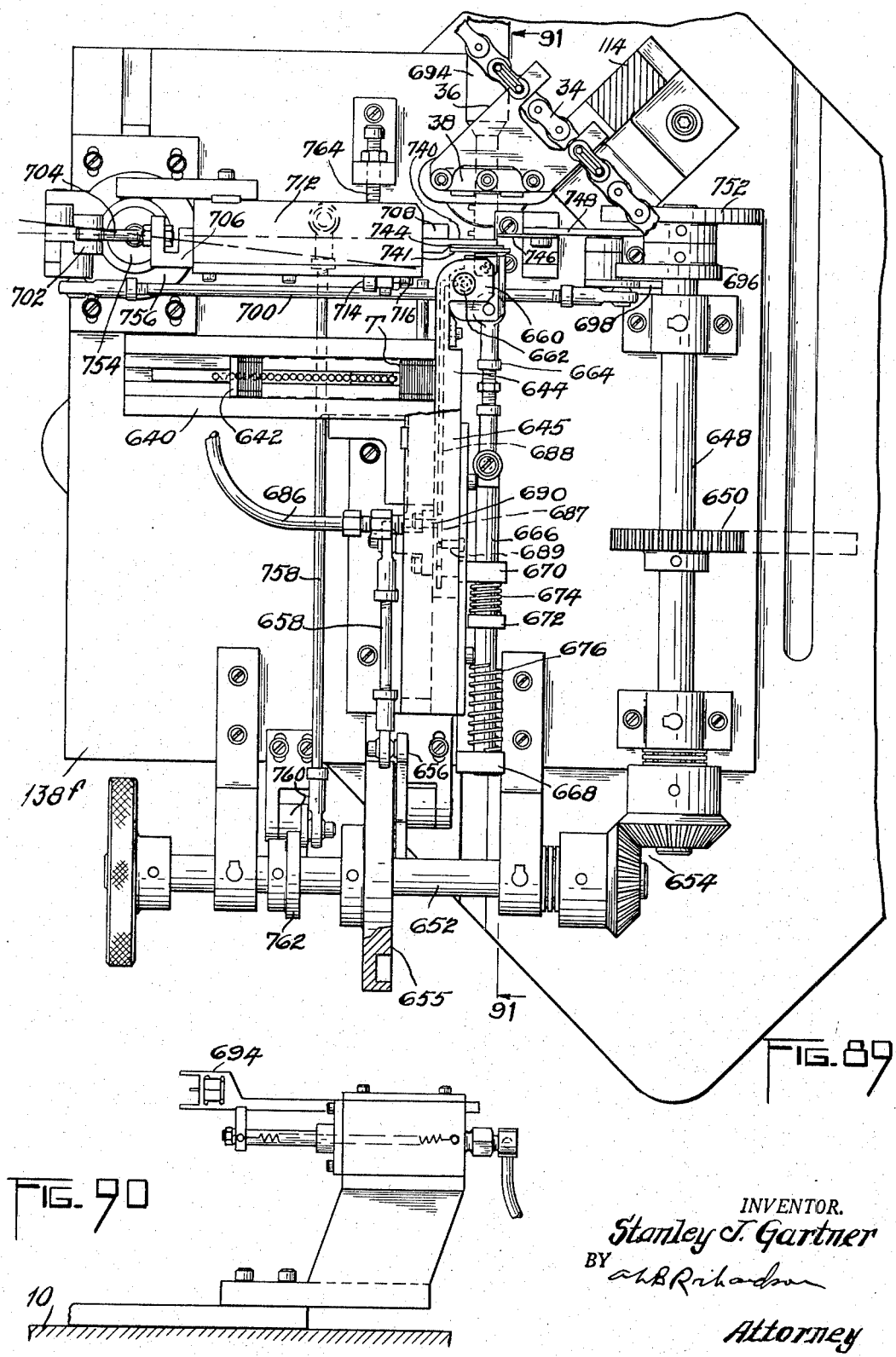

FIG. 89 is a plan view of the top mica unit.

FIG. 90 is a side elevation of the back-up device employed with the top mica unit.

FIG. 91 is a sectional view on line 91—91 of FIG. 89.

FIG. 92 is a sectional view on line 92—92 of FIG. 91.

FIG. 93 is a fragmentary detail showing the mica-carrying head in end view.

FIG. 94 is a fragmentary sectional detail of the head shown in FIG. 93 and its pre-crimping tool.

Figure 95:
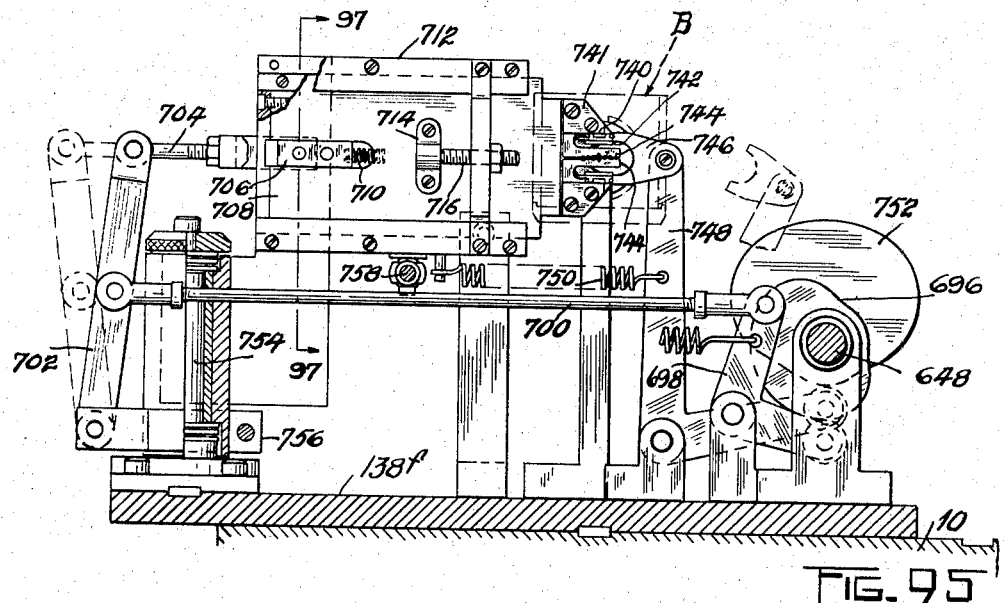

FIG. 95 is a view in front elevation of the transverse slide, shown in FIG. 89, and parts associated therewith.

Figure 96:
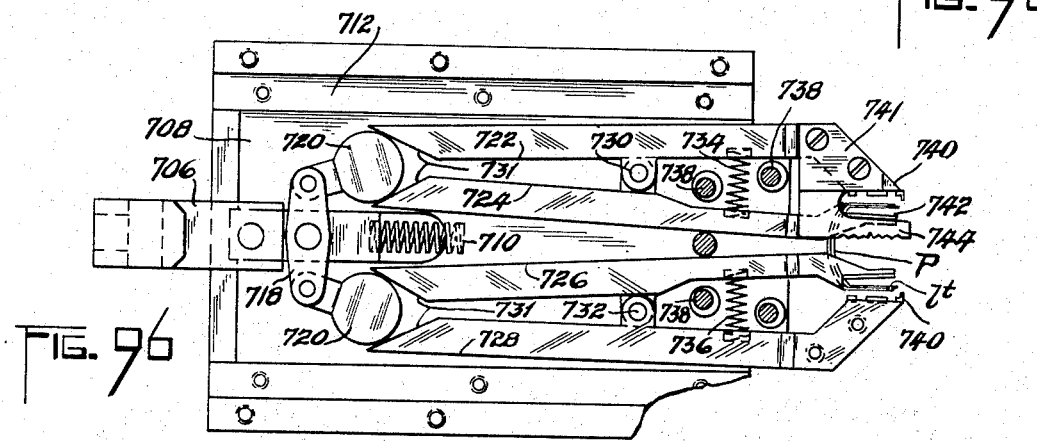

FIG. 96 is a face view of the transverse slide with its cover plate removed.

Figures 97, 98:
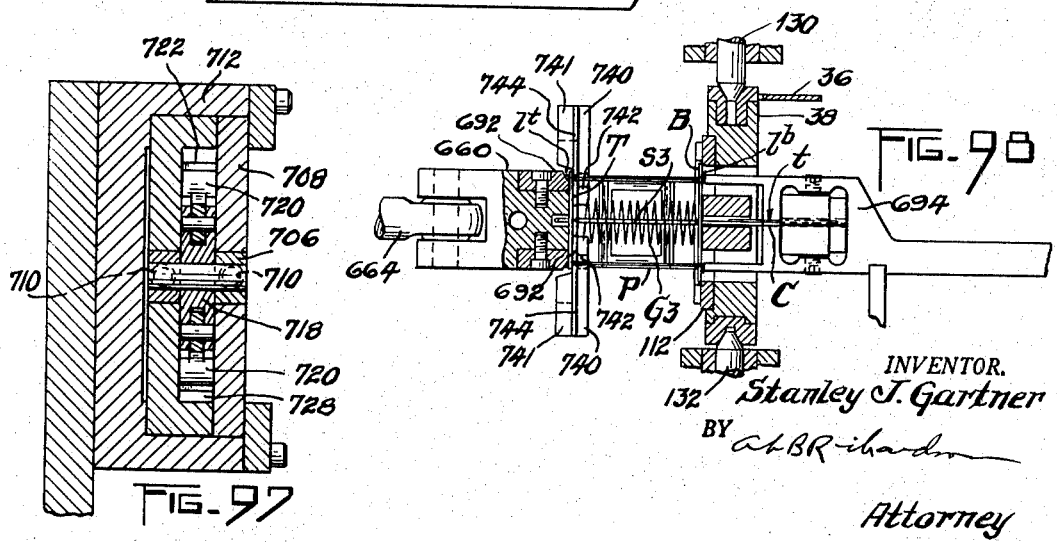

FIG. 97 is a cross section on line 97—97 of FIG. 95.

FIG. 98 is an illustration partly in side elevation and partly in central vertical section through a mica block and showing application of the top mica to the mount subassembly.

FIG. 99 is a view in side elevation of the means for effecting a final crimping or setting of the mica-retaining plate lugs.

FIG. 100 shows the device of FIG. 99 in operation for setting the lugs against the bottom mica. FIG. 101 is a similar view of the tools for crimping the plate lugs against the top mica.

FIG. 102 shows the air line connections for the device of FIG. 99.

FIG. 103 shows the mount ejector in position of operation.

FIG. 104 is a diagram of the electrical connections.

FIG. 105 is an illustration of a modification of the illustrative machine.

FIG. 106 is a transverse sectional view through the grid in FIG. 105, later in the assembly cycle, showing a smaller grid and its supporting mandrel inserted therein.

FIG. 107 is a sectional view on line 107—107 of FIG. 105.

General

The specific machine to be described is equipped with assembling tools for arranging the parts in FIG. 1 into the assembly in FIGS. 2 and 3. That assembly is subsequently to be connected to terminals sealed through glass and then enclosed in an envelope, with conventional additional steps to produce a completed electron tube of the type having plural nested electrodes between a pair of mica spacers. This particular machine is readily susceptible to changeover by adjustment, and by substitution of other working faces, so as to assemble mounts of other design. The number of electrodes assembled can be readily varied.

The several parts are arranged in FIG. 1 in the order of their handling by the machine, including the bottom mica B, the cathode C (containing heating filament F), first, second and third grids G1, G2 and G3, anode or plate P and top mica T. Micas B and T are different in outline but have aligned apertures for receiving the ends of the cathode, the side rods $s^1$, $s^2$, and $s^3$ of grids G1, G2 and G3 and the lugs $l^b$ and $l^t$ of Plate P which are bent over the micas after penetrating the holes provided. This assembly is shown in FIGS. 2 and 3.

Plate P in FIG. 2 is the same part as in FIG. 1 but is formed by the machine to assume the contour shown rather than the flat ribbed blank as at the start. The cathode and multiple grids are nested one within the others as well as within the plate, as shown. It will become clear that a plate of such form as to surround the other electrodes entirely (as cylindrical or rectangular) can be handled by a plate-assembling unit suitably modified but constructed in accordance with the teachings of this specification. Correspondingly, multiple-section tubes such as duo triodes can also be assembled with appropriate modification of the illustrative specific embodiment to be described.

FIG. 4 is a schematic plan view showing the complete machine in somewhat diagrammatic form. The several assembling units of the machine are supported on a bed 10 above which an evenly spaced series of carriers 12 are arranged which convey bottom mica B and the growing mount subassembly to the several assembling units in succession. Those assembling units are: bottom mica inserter 14, cathode inserter 16, first grid inserter 18, second grid inserter 20, third grid inserter 22, plate forming and inserting unit 24, bottom crimper 25, top mica-applying unit 26, and top crimper 28. The crimpers finally set or bend lugs $l^t$ and $l^b$ of the plate over both top and bottom micas. Thereafter the completed electrode assembly passes an ejector 30 where the product is removed and the carriers successively made ready for renewed assembly cycles.

Conveyor

Carriers 12 are transported in a step-by-step motion by a conveyor (generally designated 32) to which they are locked. Conveyor 32 is shown in FIGS. 5, 6, 9, 12 and 16 as well as in other figures incidentally. The conveyor comprises a chain 34 to the links of which there are secured a plurality of plates 36 for loosely suspending mica blocks 38. These mica blocks firmly retain bottom micas B and the electrodes successively inserted therein. Plates 36 extend outwardly from the loop of endless chain 34, overlying conveyor guide bar 40, and extend into the groove (FIG. 15) of the composite guide bar 42. Bars 40 and 42 are at opposite sides of each straight length of chain and are carried by a suitable frame 44 on bed 10. Those guide bars are shouldered (FIG. 15) to support the chain.

A pair of sprockets 46 and 48 are spaced to tension chain 34, sprocket 48 being adjustably secured to bracket 50 on bed 10 for this purpose. A pair of cams 52 are adjustably carried by sprocket 46 for controlling switch 54. The wiring for this switch and for the necessary control and power lines are accommodated in channels 56 and 58 above and below bed 10 respectively. At the right extreme are a programming device 60 and an electric control box 62. The assembling units and the conveyor are so synchronized that the conveyor indexing drive will complete its cycle to initiate the several cycles of the various assembling units; and when those units have completed their cycles the operation of the conveyor indexing drive will be initiated. This is more fully described in connection with FIG. 104. Bed 10 also supports a system of air pressure lines, having electromagnetic valves for sveral functions to be described.

The indexing drive for the conveyor is shown in FIGS. 7 and 8. This drive is of particular merit in that it is of simple construction and of such design that the conveyor is operated with uniform acceleration in intermittent simple harmonic motion.

Sprocket 46 is carried by shaft 64 mounted in appropriate anti-friction bearings housed in an upright 66 secured to bed 10. Below the bed, sprocket 68 is arranged to drive shaft 64 and is itself driven by chain 70. An idler sprocket 72 and a planetary sprocket 74 are spaced within the loop of chain 70 in such manner as to maintain the chain taut. Sprocket 74 is eccentrically mounted and locked to a disc 76 on drive shaft 78. Sprocket 72 is rotatably carried by pivoted arm 80 having cam follower 82 in engagement with cam 84 that rotates with shaft 78. The contour of cam 84 is such as to maintain chain 70 tensioned irrespective of the position assumed by sprocket 74. When shaft 78 rotates, the three-sprocket-and-chain arrangement will drive shaft 64 in simple harmonic motion.

Shaft 78 is discontinuously rotated by motor 86 and a speed-reduction unit 88 through friction clutch 90. Disc 76 is relieved to provide a shoulder 92 that may be engaged by pawl 94 for arresting the conveyor drive. Pawl 94 is maintained in locking engagement with shoulder 92 by spring 96 and is lifted out of engagement with that shoulder by pneumatic bellows 98 under control of an electromagnet 99 (see FIG. 104) and air valve (not shown) operated thereby. This electromagnet is energized to initiate the stepwise advance of the conveyor when assembling unit 14 completes its cycle of operation.

Mica blocks

The conveyor transports the several carriers to positions opposite the various units, but is of limited efficacy in accurately orienting the mica blocks 38. The mechanism for locating the mica blocks and the construction of the blocks themselves is illustrated in detail in FIGS. 9 to 15 inclusive. Each mica block 38 comprises several rigidly assembled portions including studs 100 by means of which the block is suspended from its carrying plate 36, and a removable back-up piece 102 having holes to be accurately aligned with corresponding apertures in the bottom mica. The apertured piece 102 receives the ends of the cathode and the grid side-rods, and functions with the bottom mica as a cantilever support for the cathode and the several grids during their transit through the machine; and it also protects the cathode tab and filament terminals. Hardened inserts 104 and 106 are also provided in block 38, the first having a bore and the latter having a groove for engagement by locating pins that are projected against the block at the end of each conveyor indexing operation. Each mica block also includes a detent 108 that is pressed by spring 110 toward the center of the mica block, and a ring 112 conforming to the outline of the bottom mica. The spring detent and ring act together to retain and position each bottom mica that is inserted.

A frame 114, of the form in FIG. 11, is secured to the bed of each unit that is to cooperate with the mica block and has spaced arms 116 and 118 between which the mica blocks are conveyed. Air lines 120 are connected to bored parts 122 and 124 carried by frame 114. Pneumatic bellows 126 and 128 are anchored on parts 122 and 124. It is through lines 120 and parts 122 and 124 that the pneumatic bellows are inflated and thus extended, and they are resiliently self-restoring. Upper bellows 126 acts to project conical-ended locating pin 130 toward insert 104 in the mica block. Lower bellows 128 acts to project a pair of conical-ended locating pins 132 upward toward grooved locating insert 106. Pins 130 and 132 slide in accurate bearings in the arms 116 and 118, respectively, of frame 114, functioning as the jaws of a clamp for locating the mica block.

It will be observed that the diameters of the bellows are unequal. An extension 134 is provided on the movable end of the larger bellows, in this instance on lower bellows 128, for engagement with adjustable stop 136 in frame 114. By virtue of this arrangement the mica block opposite pins 130 and 132 will be accurately centered by those pins and the level to which the mica block is finally driven by the opposing pair of pneumatic bellows is determined coaction of extensions 134 and 136. The pneumatic actuating means may evidently be replaced by other suitable operating mechanism, and mica blocks 38 are representative of any work-supporting fixtures suitable to the assembly being made.

Bottom mica insertion

The manner of inserting a bottom mica B into each mica block 38 and the noteworthy details of bottom mica inserter 14 will be understood by examining FIG. 16 to 25 inclusive. The bottom mica unit comprises a bed plate 138, a conveyor or feed-plate 140 that is indexed stepwise, and an oscillatory transfer arm 142 for lifting bottom micas from feed plate 140 and transferring them to mica block 38. The mica block is at this time accurately located by the pneumatic clamp, as described above, while conveyor 32 is at rest, the mica to be retained in the block by spring-pressed detent 108. The bottom micas are peripherally notched and are inserted manually or otherwise into the circular shouldered apertures 144 in feed plate 140. Each aperture 144 includes a locating projection 146 to align the proper peripheral recess of the bottom mica, so that the apertures in the mica will be aligned with the apertures in back-up piece 102 of the mica block.

Feed plate 140 is intermittently indexed and locked accurately in the desired stationary positions by means of a form of Geneva drive including a roller 148 offset on the face of spiral gear 152, and a radially grooved plate 150 secured to the feed plate. Cam follower 151 engages cam 149 on gear 152, and projects anti-friction lock 153 into the radial grooves in plate 150 between the times that the plate is being indexed by roller 148.

Roller 148 is swept through 360° once for each indexing operation of conveyor or plate 140 by spiral gear 152 and meshing spiral gear 154 on drive shaft 156. This shaft is rotated once for each mica-inserting cycle through gearing 159 on shaft 156 and parallel shaft 158, and an electromagnetically controlled single-revolution clutch which couples shaft 158 to the outer casing of the clutch through a chain drive not shown) to reduction gearing and a continuously operated electric motor below bed plate 138 and bed 10. Shaft 158 rotates one revolution for each time that the electromagnetic clutch is operated. The electromagnet 160 is shown in part in FIG. 16 opposite housing 162 of the single-revolution clutch. A pair of cam switches 164 and 165 are provided on shaft 158, one of which controls the conveyor indexing electromagnet as the mica inserter completes its cycle, and the other of which is in series with like switches in the other assembling units to prevent operation of all units whenever any one of them fails to complete its previous cycle.

Bottom micas B are manually loaded into recesses 144 with the proper peripheral notch in position to receive locating projection 146. This arrangement prepares the mica for its intended engagement by latch 108 of the mica block after it is transferred. To facilitate proper manual loading of feed plate 140, a series of buttons 166 is provided on plate 168, and the buttons are projected into shouldered apertures 144 in the feed plate when it is at rest. Plate 168 is supported on slides 170 that are pressed upward by spring 172 and lowered by a pair of bell cranks 174 joined by adjustable link 176. Bell cranks 174 are concurrently operated by cam follower 178 that is pressed by springs 172 against cam 180 on shaft 156.

When buttons 166 are projected into apertures 144 (FIG. 22) a bottom mica that has been slid manually into aperture inaccurately can be pressed against its button and tilted by virtue of the sloping portion 182 of that support for removal or rotation so as to orient the bottom mica B properly in the aperture and with projection 146 in the peripheral recess of the mica. Before the next indexing operation of feed plate 140 buttons 166 are withdrawn from apertures 144; and they are not returned to those apertures until the feed plate again comes to rest. The provision of multiple buttons 166 allows the attendant to accumulate a supply of bottom micas in proper position in feed plate 140.

Transfer arm 142 is oscillated, during the times when plate 140 and mica block 38 are properly locked, to enter the adjacent aperture 144 and transport the mica therein to the mica block. The drive for this oscillatory motion is derived from cam 184 on shaft 156 and cam follower 186 pivoted at 188. A four-bar linkage 190 is connected at pivot 192 to cam follower 186, and is pivoted at 194 to bed plate 138. The other two pivots of the four-bar linkage are urged toward each other by spring 196 surrounding rod 198 that is secured to one of those remaining pivots and is slidable relative to the other. Cam follower 186 is connected by adjustable link 200 to arm 202 secured to gear 204 which is enmeshed with pinion 206 attached to the oscillatory mica transfer arm 142. Spring 196 acts resiliently to urge cam follower 186 against the cam and thus to urge arm 142 yieldably against the mica block.

Arm 142 is tubular as is its supporting shaft 143 and is connected to vacuum line 208 through a valve 210 (FIGS. 16 and 17) that is effective to couple the vacuum line through a fixed arcuate slot to the oscillatory arm during its upward arcuate travel above plate 140, but to cut that connection and relieve the vacuum in the arm 142 (by virtue of a fixed bleeder port) as the arm comes into contact with the mica block. Detent 108 is effective to grip the mica on the transfer arm. The vacuum line may advantageously include a valve that is closed during the return stroke of arm 142.

Because of the fact that the bottom mica is provided with numerous apertures the working end or vacuum chuck 212 of arm 142 is apertured in only those areas covered by the bottom mica that is used.

In FIGS. 16 and 18 there is shown an electrical detector for controlling the operation of the subsequent assembling units with respect to a given mica block automatically in dependence on the presence or absence of a bottom mica in that mica block. If no mica is present, the grids, the cathode and the plate might be inserted into a mica block from which they could only with difficulty be extracted, thus causing the machine to jam; and the electrodes and the top mica would be wasted. This detector comprises an arm 214 oscillated by cam follower 218 and cam 216 on single-revolution shaft 158 of the mica-inserting unit. Spring 220 maintains the cam and cam follower in mutual engagement. A pair of contact bars 222 and 224 with appropriate leads to the control circuit (FIG. 104) are carried on insulating block 226; and these are moved against the mica block. In the event that the mica-inserter failed during the previous cycle, the mica block completes a circuit for suppressing operation of the unit drives in following cycles of the several inserters with respect to that block. This sequentially delayed control is effected by the program device 60, as will appear.

*Cathode inserter*

The cathode to be inserted is prepared as shown in FIG. 26 and includes a cathode tab *t*, a filament F of the spade would variety projecting from the end of the cathode opposite the tab *t*, so as to protect and support the fine ends *e* of the filament. The cathode is beaded at two points *b* for confining it between the top and bottom micas. The seating of bead *b* against bottom mica B is shown in FIG. 27. Ends *e* of filament F project beyond the cathode tube as shown upon completion of the cycle of operation of the cathode inserter. An end view of the subassembly of cathode C and bottom mica B appears in FIG. 28.

The mechanism for supplying cathodes and for inserting them into the bottom micas that are carried by mica blocks 38 to the cathode inserting unit is shown in FIGS. 29 through 54, several of the views showing the mechanisms as they appear at different times during the cycle.

The cathode inserter is provided with a unit drive, including an individual electric motor, reduction gearing, and a single-revolution clutch. As in the bottom-mica unit, a chain drive (not shown) couples the outside casing of the clutch to the motor carried below bed 10. A cam switch 164a (FIG. 104) is also included to signal the completion of the cathode inserter cycle. The cathode inserter includes a bed plate 138a (like bed plate 138 of the bottom-mica unit) for supporting the bearings of cam shaft 230 and of shaft 232 both of which are rotated once per cathode-insertion cycle. Each of the assembling units includes a bed plate 138, 138a, etc. and its own electric motor, supported by a bracket 228, 228a etc. (FIG. 5) depending from the respective bed plates.

Mica block 38 is conveyed into position and locked to receive a cathode just as it is locked during insertion of the bottom mica. The cathode is, however, to be projected not merely into the mica block but through the proper aperture of bottom mica B as well.

The cathode inserter includes a conveyor for delivering cathodes one at a time into a pair of carrier jaws; the carrier which projects the cathode toward and into the mica; a rod for pushing the filament into the cathode and for driving the cathode "home" with a cathode bead against the mica; and a form of multi-jaw guide for directing tab *t* into the mica and mica block, which then is retracted before the cathode carrier advances too close to the mica block. The continued protection of tab *t* and filament ends *e* afforded by the mica block during the subsequent assembly operations is an advantage flowing from the insertion of the cathode with its tab at the leading end. These various mechanisms comprising the cathode inserter will be considered individually but not necessarily in the order of their operation, after which their coordination will be described.

The multi-jaw guide for tab *t* is shown in FIG. 29 and other views, and appears in FIG. 37 on a larger scale. A pair of arms 234 and 236, adjustable in length, are pivotally carried for rotation by gear 238 for mutual separation and approach, being provided with pinions 240 and 242 for this purpose. Gear 238 is rocked by adjustable link 244 and by bell crank 246 having a cam follower 248 on cam 250. Arms 234 and 236 are urged toward each other by their gears 240 and 242 in combination with spring 252 which is hooked to arm 254 fixed to the pivot shaft of arm 236. Cam 250 on shaft 232 allows arms 234 and 236 to be moved into mutual contact for that small portion of the cycle when the cathode tab is approaching the mica block; but the arms are otherwise separated. These arms are shaped at 256, 258 to provide a through passage for the cathode tab and a conical guide for correcting any misdirection of the tab.

From FIG. 29 it will be apparent that arms 234 and 236 extend at an angle to their pivotal axes and that therefore, when moved apart, they also move away from the face of the mica block. This arcuate sweep toward the mica block promotes a close approach of the two-part guide to the aperture where the cathode tab is to be inserted, and thus provides reliable guiding action where it is needed most.

For the purpose of receiving the cathodes from a conveyor, to be described, and projecting them individually toward and into the mica and mica block, the following mechanism is provided. A pair of jaws 260, 262 are urged toward each other by springs 264 and 266 (FIG. 31), respectively, and are slidable on oppositely extending vertical gibs 268 and 270 on a horizontal longitudinally reciprocated bar 272. A pair of toggle links 274, 276 are pivoted to each other and to a slide 278 (FIG. 43) also carried by bar 272. A rod 280, slidable lengthwise along bearings in bar 272, is arranged for straightening links 274 and 276 as in FIG. 45 to open jaws 260 and 262 or for "breaking" them as in FIG. 44 to allow springs 264 and 266 to close the jaws on a cathode.

The jaws are operated in a four-motion cycle to close on a cathode, advance toward the mica block, then separate, and finally withdraw for a renewed cycle. The motions to and from the mica block are effected by reciprocating bar 272 longitudinally whereas the gripping and separating motions of the jaws are effected by shifting rod 280 to the left or the right with respect to bar 272. In FIGS. 29 to 32 inclusive the mechanisms for operating bar 272 and rod 280 are shown. Bar 272 is gripped by block 282 (FIGS. 29 and 30) and tightened in place by screw 283. Below bar 272 is a stationary square bar 285 that is embraced by a portion of composite block 282 to prevent bar 272 and the cathode-carrying jaws from rocking. Such rocking would shift the line of travel of the jaws that are laterally off-set from bar 272 (FIG. 29). Block 282 is reciprocated by link 284, cam-following lever 286 and grooved cam 288.

Rod 280 is carried with bar 272 during most of the stroke of the latter, but is retracted at opposite ends of that stroke to operate the cathode-gripping jaws. A pair of stops 290 and 292 are secured to rod 280, and the rod is slidable through block 294 carried in a pin-and-slot connection on the end of cam follower 296 that is operated by grooved cam 298 on shaft 230. The space between stops 290 and 292 allows rod 280 to reciprocate along with bar 272 carrying the cathode jaws. At extremes of the reciprocation of these jaws, cam 298 and cam follower 296 shift block 294 to straighten or "break" the jaw controlling links 274 and 276.

For the purpose of shifting filament F from the starting position in FIG. 26 to the end position of FIG. 27 and firmly seating bead $b$ against mica B, a pusher-rod 300 at the end of squared bar 301 is longitudinally reciprocated along bearings 302 and 304 by a grooved cam 306 and cam-following lever 308. A lost-motion connection is interposed between cam-following lever 308 and bar 301. This connection includes spring 310 surrounding rod 312, rod 312 being pivoted to lever 308 and having a pin-and-slot connection within hollowed member 313 that is pivoted to block 314 that frictionally grips bar 301. This resilient lost-motion connection between pusher 300 and its cam actuator provides for yielding pressure against filament F and the end of cathode C, and insures full positive retraction of the pusher after insertion of the cathode in preparation for a renewed cycle.

Shaft 230 can be manually rotated to operate cams 288, 298 and 306 by means of knob 316 secured to its upper end; but this shaft is normally rotated by single-revolution power shaft 232, through spiral gears 318 and 320. Shaft 232, it will be recalled, also rotates cam 250 for operating the tab-guiding arms 234 and 236, and in addition shaft 232 rotates an additional pair of cams 362 and 368 which operate the conveyor mechanism for delivering cathodes individually to the cathode jaws. It is thus apparent that the entire mechanism on bed plate 228 of the cathode unit is synchronized by connection to a single one-revolution drive shaft. The single revolutions of this shaft alternate with single-step advances of the mica block conveyor, as previously described.

Referring now to FIGS. 29, 33 to 36, 38 and 52 to 54 inclusive, the details of the mechanism for feeding cathodes individually to jaws 260 and 262 will now be described. It should be understood that other forms of cathode conveyor can be substituted for the specifically meritorious form here illustrated. This cathode feeder includes a stationary plate 326 having transverse grooves 328 spaced at regular intervals from end to end, plate 326 being flanked by four-motion feeding rails 330 and 332. As shown in FIGS. 52, 53 and 54 rail 330 has a shoulder 336 formed by relieving its upper edge, which edge is notched at 338 to receive tabs $t$ of cathode C. Rail 332 is similarly provided with notches 340 to receive the opposite ends of the cathode tubes or sleeves. Rails 330 and 332 are spaced in relation to beads $b$ so as to narrowly restrict the endwise shifting of the cathodes during transit. During the four-motion operation of the rails the cathodes are successively raised out of grooves 328, moved forward to the next groove 328 and simultaneously the several cathodes are deposited while the rails are lowered further for a return stroke and a renewed elevation and further forward feeding stroke. In the course of this sequence the cathodes tend to settle with tabs $t$ uppermost, improving the uniform action of the cathode-inserting mechanism described above.

Stationary plate 326, grooved on its top surface, is secured to bracket 342 on bed plate 228. Rods 344 connect rails 330 and 332 for motion as a unit, the center rod 344 passing through aperture 346 in bracket 342. Bell cranks 348 and 350 are pivoted to bracket 342 adjacent the ends of the feed rails and are rocked by adjustable links 352 and 354 connected by lever 356 which is pivoted at its center and which is rocked clockwise (FIG. 34) by adjustable link 358, cam follower 360 and cam 362 on shaft 232. The rail assembly is urged toward its lowermost position, and the linkage and cam follower are biased to maintain operative connection with cam 362, by springs 364 and 366 attached to the outer pair of rail-connecting rods 344. During rotation of cam 362 bell cranks 348 and 350 are rocked to raise the feed rails and to lower them. Another cam 368, cam follower 370, adjustable link 372 and lever 374 having an intermediate stationary pivot is provided for longitudinally reciprocating the feed rails. At its top lever 374 pivotally carries a square block 376 that works in slot 378 in feed rail 330. Lever 374 is slotted for providing adjustable connection to link 372 in order that the length of horizontal stroke of the feed rails may be adjusted. Bell cranks 348 and 350 carry anti-friction rollers 380 for contacting the feed rail unit and elevating it while it is being horizontally shifted by lever 374. Cam followers 360 and 370 conveniently are provided with a common pintle 382. Cam follower 370 is urged against its cam by tension spring 384.

With particular reference to FIGS. 39 to 42 and 46 to 51 both inclusive, the cycle of operation of the cathode inserter will be described, it being understood that this cycle is initiated after the conveyor has come to rest following an indexing operation, and advantageously under control of the automatic mica detector in FIGS. 16 and 18. Mica block 38 at this time will be locked accurately in the desired position by the pneumatic clamp (FIG. 12). At the start of the cycle (FIG. 39) a pusher 300 and feed jaws 260 and 262 are fully retracted while feed rails 330 and 332 are in their most advanced and elevated position. Rails 330 and 332 engage the cathode outside beads $b$ whereas the jaws engage the cathode to the rear of those beads in respect to the direction of insertion. At the outset of the cycle the feed rails are lowered to deposit a cathode on lower jaw 262. Arms 234 and 236 quickly close adjacent bottom mica B in the mica block to provide a guide for cathode tab $t$ and jaws 260 and 262 close on the cathode. In descending, the rails deposit all the cathodes into the grooves in plate 326, and they then withdraw for advancing the cathodes once more (FIGS. 40, 47 and 48). The cathode-gripping jaws and pusher 300 are concurrently advanced to project the cathode with its tab foremost through the conical guide formed by arms 234 and 236, through the bottom mica and partly into the mica block. The cathode insertion is completed (FIGS. 42 and 49) after arms 234 and 236 are removed. Pusher 300 continues the advance with yielding drive, to project ends $e$ of filament F through mica B, and to set bead $b$ of cathode C against the mica. The feed rails are raised at this time to lift the cathodes away from grooved plate 326. Thereafter jaws 260 and 262 separate and are retracted into position in advance of the feed rails, and these are projected to deliver the next cathode above lower jaw 262. Rod 300 is also restored to its retracted starting position. The cycle is then interrupted while the mica-block conveyor advances to the next bottom mica into position opposite the cathode-inserting unit.

Referring now to FIG. 4 it will be noted that the mica blocks are arranged at approximately 45° with respect to their direction of travel by carriers 12 and that the stroke of the cathode inserter is perpendicular to the mica block and therefore also at a 45° angle with respect to the direction of travel of the mica block. Considering straight-line travel of the conveyor and the nature of the cathode unit as well as the other assembling units, the importance of this arrangement will be readily appreciated. The cathode supply conveyor extends at right angles to the cathode-inserting bar, in a horizontal plane. The angular positioning of the mica block on the conveyor provides the mica block with a clear path, free of both the cathode supply conveyor and the cathode-inserting carried, and in addition causes the cathode feed rails to extend well away from the conveyor where cathodes can be manually loaded without undue hazard to the attendant. Similar arrangements of mutually perpendicular electrode-supply conveyors and reciprocatory electrode-inserting mechanisms also characterize other assembling units of this machine, emphasizing the desirability of the angled position of the mica blocks in relation to their path.

Grid insertion units

Many of the mechanisms of the grid-insertion units such as the unit drive, base plate, the coordination with the other units and with the conveyor, and the operating linkages and cams of the feeding and inserting portions closely resemble corresponding portions of the cathode-inserting unit and of the bottom mica-inserting unit, and for this reason their detailed description appears unnecessary. Certain features, however, are distinctive.

Referring to FIGS. 55 to 60 and 63 to 66, both inclusive, the features peculiar to the first grid-inserting unit will be described. In FIG. 55 chain 34 moves mica block 38 on plate 36 opposite the first grid-inserting unit, where it is located by a pneumatic clamp as in FIG. 12. The first grid-inserting unit includes a single-revolution drive shaft 386, operable in alternation with the indexing drive of the mica-block conveyor, for operating its several constituent mechanisms. Mica block 38 at this time grips a bottom mica B in which there is inserted a cathode C. A pair of arms or jaws 388, 390 having V-shaped notches are swept toward each other to grip and center the free end of cathode C which is otherwise supported in cantilever fashion only by the bottom mica and the mica block. Arms 388 and 390 are oscillated by meshing pinions 392 and 394 to provide preliminary support for the free end of the cathode during the insertion of the first grid, and are separated by reverse rotation of those pinions soon after the start of the cycle. Pinions 392 and 394 are oscillated by gear 396 which is driven by lever 398, adjustable link 400, lever 402, cam follower 404 and cam 406 on shaft 386. Spring 408 maintains engagement of cam follower 404 with its cam and in addition provides for yielding engagement of arms 388 and 390.

The grids are conveyed to a pair of grid-inserting jaws in a manner very similar to that for delivering cathodes to the cathode-inserting jaws, with the exception that the contours of the grid-engaging jaws are appropriately different. Stationary plate 410 has a series of equally spaced, transverse troughs 412 for receiving grids G1, and a pair of four-motion feed rails 414 and 416 at opposite sides of plate 410. These rails have flanges 418 and 420 for accurately locating the grids and for depositing them between upper and lower grid-inserting jaws 422 and 424, the feed rails being projected in front of the leading gripping portion 426 and the rear gripping portion 428 of jaw 424. The four-motion feed rails and supporting plates of the first grid unit are identical, except in dimensions, with the corresponding feeding mechanisms of the second and third grid units; and the proportions will be gathered from comparison of FIGS. 61 and 62 for the supply conveyors of those units with FIG. 60 showing the same detail of the first grid supply conveyor. At the start of each cycle a grid has been deposited on lower jaw 424 and the grid feeding rails are lowered to commence their four-motion cycle. The several parts are in the configuration of FIG. 56.

Corresponding to pusher 300 of the cathode inserter, in structure and operating mechanism, but notably different in function, is a rod 430 that is reciprocated in the same direction but with different timing when compared with grid inserting jaws 422, 424. As may be seen from FIGS. 57, 58 and 59, rod 430 is projected through the hollow interior of the grid gripped by the carrier jaws, much as an arm may be pushed down a coat sleeve. The relation of the jaws and this rod are perhaps better shown in FIG. 46. Rod 430 is projected against cathode C, the conical end of rod 430 entering and centering the cathode at a time when that end of the cathode is being held by jaws 388, 390. Immediately thereafter those arms are retracted and the grid-carrying jaws are projected forward to drive "home" the grid with its side rods $s^1$ projecting through the bottom mica and into the mica block. The action is more or less positive, jaw portion 428 being provided with a backup plate 432 rearward of the grid side rods. The grid-inserting jaws are then separated by four-motion mechanism like that of the cathode-inserting jaws, and the grid jaws and centering rod are retracted to their starting positions.

The specific method of handling the first grid and the cathode as described above is notable in several respects, and at this point warrants further consideration because it is a procedure which is duplicated (with slight changes in detail) in the subsequent operations and is applicable in the assembling of the electrodes in other electron-discharge devices and to similar articles having nested parts. At the start of the operation the first electrode, the cathode in this instance, is supported at one end only. The grid or comparable hollow electrode is supported in readiness for axial thrust about the cathode and into the cathode support. Conical-ended rod 430 is projected down the hollow of the grid and into the free end of the cathode so that it is accurately centered and firmly supported. The grid-carrying jaws are then thrust along rod 430 and cathode C to effect the assembly.

Preliminary to the contact of the rod 430 with the cathode, arms 388 and 390 are constructed to progressively embrace and center the free end of the cathode in preparation for its more accurate centering and support by rod 430. Thus the free end of the cathode is rough-centered by coacting jaws and the accurate-centering rod 430 is projected down the hollow of the grid. After the rod contacts the cathode the rough-centering jaws are retracted, and the path of the grid carrier toward the mount subassembly is thus cleared for the inserting stroke of that carrier. The timing of the rough-centering jaws and the stroke of the centering rod is not critical; but the jaws should engage the cathtode (or other previously inserted element) before the rod.

The end of rod 430 which contacts the free end of the cathode is convexly conical so as to enter and center the end of the cathode. As will be seen from the consequence of operations following the insertion of the first grid, rods similar to 430 but having end-faces shaped otherwise as required by the ends of the parts to be centered are to be used as indicated by circumstances. Rods with conical cavities are simple and effective.

While it is desirable that jaws 388 and 390 should sustain the cathode until its end is actually engaged by rod 430, it could be withdrawn earlier after having adjusted the free end of the electrode which would thereafter be sustained from one end. This adjustment may in some uses be found sufficient preparation for telescoping an additional part over one previously inserted without a rod like 430; but, especially where the spacing between the elements to be assembled is close, an end-engaging support rod is of great value.

The sequence of operations in inserting the second grid about the subassembly of the cathode and first grid in mica B carrier by mica block 38 is shown in FIGS. 67 to 71 inclusive. The electrodes and machine parts are shown in an intermediate portion of the cycle in FIG. 67, the four-motion supply conveyor previously having advanced grid G2 onto the lower jaw 434 of the pair of inserting jaws, and rod 436 having then been projected through the hollow of grid G2 to reach the subassembly of electrodes G1 and C in advance of grid G2. A pair of jaws 438 and 440 are effective to properly locate the free ends of cathode C and grid G1 prior to their engagement by the formed end of rod 436. This rod, as seen in FIG. 69, is recessed at points 442 and those recesses are bevelled at their edges. Rod 436 optionally carries a conical projection 444 for engaging the cathode. Each jaw 438 and 440 has three indentations, one for each side rod $s^1$ and a larger indentation for cathode C. These jaws are primarily effective to raise and adjust the free ends of the cathode and the first grid to the proper level for engagement by rod 436 and, by virtue of the V-shaped indentations in those jaws, the free ends of the cathode and the grid are accurately centered in the horizontal plane during the final closing of the adjusting jaws. Jaws 433 and 434 of the carrier which inserts grid G2 (see FIG. 70) are relieved at 448 to allow rod 436 to penetrate grid G2 while side rods $s^2$ are gripped in the necessary accurate position by co-action of wedge portions 450 and combined seating and wedge portions 452. Lower jaw 434 has a rearward shoulder portion 454 that abuts side rods $s^2$ in finally driving "home" grid G2 as it is supported by the carrier and as grid G1 and cathode C are supported by rod 436 (FIG. 68).

The arrangement for assembling the third grid 63 about the assembly of cathode C and grids G1 and G2 on bottom mica B is so far similar to that for assembling grid G2 about the previous parts assembly that no detailed description has been given. The locating and supporting rod 456 in the third grid inserting unit 22 is shown in FIG. 72. It is adapted to adjust the free ends of cathode C, first grid G1 and second grid G2 in proper mutual positions while grid G3 is thrust along the rod and telescoped over grid G2 as grid G3 is inserted in the mica and the mica block. For this purpose rod 456 is provided with a recessed cathode-locating tip 458 and paired recesses 460 and 462 (all of proper relative depths as required by side rods $s^1$ and $s^2$). Rod 456 has an additional pair of recesses as compared with rod 436, for the additional grid in the subassembly that reaches unit 22, and in the same way the locating jaws of unit 22, corresponding to jaws 438 and 440, require an additional pair of indentations. The adjustment of the ends of all the electrodes into the proper pattern at each inserting unit serves to maintain that pattern for simplifying the application of the top mica, as will be seen. The electrodes tend to remain in their adjusted positions because of their firm frictional support in the mica and in the bores in the mica block.

*Plate or anode unit*

In FIGS. 73 to 88, inclusive, there are shown the mechanisms and operations in forming and inserting the plate or anode P. The plates are provided in blanked-out and ribbed form as in FIG. 1. Each plate is firmly and accurately gripped during its transfer and its further shaping between the supply magazine and the mica block. Plate P is transformed from the flat shape in FIG. 1 to the bent shape in FIG. 88. The mechanical handling of the plates from supply point to assembly point is facilitated by accomplishing the forming anode of relatively flat blanks within the inserting unit. This is because flat plates are relatively simple to stack, to engage accurately and to feed individually, in comparison to three-dimensional shapes. The anode-bending mechanism (to be described) is of such design that the initially accurate engagement of the plates is maintained at all times between the magazine and the final insertion position. The preliminary shaping of the electrodes in the machine obviates special conveying mechanism that would be required for previously shaped electrodes, and greatly facilitates the loading of the parts into the machine. The anode, while U-shaped in end projection (FIG. 88) can obviously assume other shapes (as cylindrical or rectangular) consistant with the requirement that it be capable of endwise insertion.

Unlike the insertion of the several grids successively about the previous closely nested electrodes, the radial spacing between the anode and the next electrode is relatively large; and for this reason the positioning devices for the free ends of the electrodes characteristic of units 18, 20 and 22 are not necessary in assembling the anode of this particular mount. Were there a small clearance between the anode and the next inner electrode, a mechanism for adjusting the free end of the electrode last previously inserted would reasonably be required, just as in the grid-assembly units.

The cathode and the grids are inserted into the bottom mica according to the foregoing procedures with the electrode ends tightly fitting in the mica apertures, and further supported in the apertured mica block. The present form of anode or plate, on the other hand, requires definite treatment after insertion to secure it reliably in the inserted position. To this end the lugs $l^b$ are pushed through the bottom mica and then given at least a preliminary bend, or precrimped, while still in the plate-inserting unit 24. The lugs could be finish-crimped in unit 24, with less perfect results as will become apparent.

Referring now to FIGS. 73 and 79, the plates P are arranged on edge in magazine 466. They are transferred laterally one at a time by vacuum stripper 468 to the forming mechanism comprising tool 471 and stationary forming arbor 472; and the formed plates P are individually transferred from arbor 472 by carrier 474 for insertion into mica block 38. The plates are held in position by carrier 474 during the brief portion of the cycle when pre-crimping mechanism 476 is effective to give lugs $l^b$ a preliminary set behind the mica.

Supply magazine 466 comprises a pusher 478, urged by chain 480, a pulley 481 and a weight 483. The pusher is effective to press the supply of plates P forward against the plate-feeding slide, and the plates are held upright between side walls 482 which, together with in-turned bottom edges 484 of the side walls, constitute a channel. Vacuum stripper 468, seen in FIGS. 73 and 74, is best shown in FIGS. 79 and 80. Stripper block 468, reciprocated between upper and lower guides 488, 490, is bifurcated at its forward end, and the lateral flat surface of the bifurcated portions 489 and 491 are relieved at 492, 494 to provide shoulders for engaging the rearward edges of only one plate P in the supply magazine, and grooves are also formed in bifurcated portions 489 and 491 for receiving the preformed ribs in the plate blank, thus to improve the accuracy of engagement of plate P. A vacuum system 496 extends to the relieved surface to provide multiple ports 498, so as to sieze only the foremost plate P in the magazine when vacuum is developed in system 496. The vacuum is maintained in that line during the forward stroke of stripper 468, so that when the stripper block is moved forward, it carries one plate P with it to the dotted-line position in FIG. 80. At this point the plate is gripped by forming tool 471 against forming arbor 472, and as the forming operation commences stripper block 468 is withdrawn to the magazine.

The operating mechanism for stripper block 468 is best shown in FIGS. 73 and 74. This mechanism includes link 500, cam-following lever 502, and cam 504 on cam shaft 506 that is rotated once each complete plate-inserting cycle. Tension spring 508 maintains cam-follower 502 in contact with cam 504, and acts yieldably to move the stripper block 486 in transporting a plate to the plate-forming tools and positively to withdraw block 468 from the plate-forming zone.

Before stripper block 468 is withdrawn each plate is gripped against forming arbor 472 by a medial pressure pad 510 that is normally projected beyond the front face of forming tool 471 (FIG. 81) by a compression spring 512. Plate P is stripped from vacuum ports 498 in block 468 by the side portions 511 and 513 of forming tool 471, after pressure pad 510 has gripped plate P against arbor 472. After forming tool 471 has completed its forward stroke to shape the plate about arbor 472, additonal forming tools 470 approach arbor 472 from above and below so as to "set" the side portions of the formed plate on opposite sides of the arbor, the springiness of the plate stock preventing forming tool 471 and portions 511 and 513 thereof from bending the opposite plate portions into the desired parallelism.

The operating mechanism for the plate forming tools is best shown in FIGS. 73 and 76. Tool 471 is carried by a slide 514 having bearing 515. At the rear end of slide 514 is a pivotal link 516 adjustably secured to one arm of bell-crank 518. This bell-crank has a stationary pivot 519 and carries cam follower 520 on its other arm. Cam follower 520 bears on cam 522 secured to shaft 524 that is connected through bevel-gearing 526 to shaft 506, and is rotated once each machine cycle. Spring 528 maintains cam follower 520 in the lowered position so as to retract forming tool 471 resiliently, cam 522 positively thrusting the forming tool 471 forward against the plate P and forming arbor 472. Pivotally carried tools 470 are symmetrically connected by links 530 to lever 532 joined by pivotal shaft 534 to lever 536 that is actuated through link 538 by cam follower 540 and grooved face-cam 542.

At the start of each cycle, a formed plate is shaped about arbor 472, and stripper block 468 is retracted, with its vacuum ports in engagement with the foremost plate P in magazine 466. During the time that block 468 advances to deliver a plate to the forming mechanism described above, a transferring mechanism is effective to deliver the previously formed plate to the mica block which at this time supports the previously assembled cathode and control grid projecting from the bottom mica. The transfer mechanism in the illustrative machine includes a gripper for accurately picking up the formed plates as they are released by the forming mechanism. After tools 470 give the side portions of the plate the desired "set" and while the plate is still gripped between pressure pad 510 and arbor 472, the gripping device seizes the plate. It is in this condition at the start of the plate-unit cycle. The gripping jaws initially move the formed plate in a straight-line path along the face of arbor 472, and then arcuately to deliver the plate, lugs $l^b$ foremost, to the bottom mica B. It will be apparent that by arranging arbor 472 in a straight-line path with respect to the mica block, the compound rectilinear and arcuate motion of carrier 472 may be replaced by a rectilinear motion. However, the present arrangement possesses certain advantages and the alternative is mentioned only in passing. The parts are shown in FIG. 79 in their normal position at the start of the cycle of the plate forming and inserting unit.

The mechanism for operating the plate-clamping portion of carrier 474 is generally shown in FIG. 73 and is shown in greater detail in FIGS. 75 and 76, 83 and 84. Center block 544 of carrier 474 is supported by bracket 546 for straight-line sliding travel along arbor 472, block 544 being grooved for receiving the reduced rear face of arbor 472. Movable jaws 548 and 550 are slidable toward and away from the upper and lower faces of center block 544 along rod 552 which penetrates and is secured in block 544. The movable jaws are urged by compression springs 554 and 556, respectively, toward block 544 to grip the plate P as shown in FIG. 84. The movable jaws 548 and 550 are positively actuated when it is necessary to separate them and release a formed plate P after insertion into the mica block, and to maintain the jaws separated in order to receive a newly formed plate P. The active faces of jaws 548 and 550 are grooved to receive the reinforcing ribs raised from the plate P and thus retain the plate against displacement during the transfer movement. The actuating mechanism for these jaws includes links 558 and 560 pivoted to a rockable plate 562, pivoted in turn to bracket 546 at a point intermediate links 558 and 560. Plate 562 is rocked clockwise to open the jaws and is permitted to rock counter-clockwise under the influence of compression springs 554 and 556 when the jaws are to close on a plate P that is to be gripped against center block 544. Plate 562 is rocked counter-clockwise (FIG. 76) by a link 564 that is longitudinally reciprocated by bell-crank 566 pivoted to block 568 and actuated by thrust-transmitting link 570, cam follower 572 and cam 574. Block 568 to which bell-crank 566 is pivoted (FIGS. 83, 84 is longitudinally reciprocable by rod 576 that is actuated by thrust-transmitting link 578, cam follower 580 and cam 582. Block 568 embraces and is guided for rectilinear travel along stationary square gib 584. Bracket 546 is pivoted about rod 586 in block 568 and is positively actuated to swing toward the mica block by link 588, cam follower 590 and cam 592. Cam followers 572, 580 and 590 are all in the form of levers carrying anti-friction rollers like cam follower 502 in FIG. 74. Cam 574 acts through the linkage described above to swing bracket 546 counter-clockwise against the action of tension spring 594. Compression spring 596 encircling reciprocable rod 576 is confined between cup 598 at the end of rod 576 and depending stationary bracket 600 through which rod 576 reciprocates, and reacts against cam 582 through the linkage previously described to urge the plate carrier 474 resiliently toward the retracted position shown in FIG. 73.

Cam 582 is so shaped as to reciprocate block 568 through the straight-line path shown in FIG. 85, acting positively in the direction of the solid arrow and rendered effective in the restoring direction by compression spring 596. There are circular portions on cam 582 so as to cause a dwell in each of the extreme positions. The dwell is short in the retracted position shown in FIG. 73, while carrier 474 grips plate P preparatory to transfer. There is a longer dwell while bracket 546 sweeps arcuately for inserting the plate into the mica block and for arcuate return. Cam 592 is properly shaped so that bracket 546 commences its arcuate sweep in the solid-line direction (FIG. 85) when block 568 has reached its forward limit, and bracket 546 is restored along the path represented by the dotted curved arrow in FIG. 85 under the influence of spring 594. During part of the arcuate return stroke of carrier 474, spring 594 is assisted by cam 574 and the linkage controlling movable jaws 548 and 550. Cam 574 operates bell-crank 566 positively to open jaws 548 and 550, moving bell-crank 566 in the same direction that bracket 546 is urged by tension spring 594. Cam 574 is properly shaped so as to maintain jaws 548 and 550 open during the arcuate return swing of bracket 546, and inherently is effective to enforce return swing of bracket 546 if mechanical binding should develop which is not overcome by spring 594.

From FIG. 75 it will be clear that spring 594 is tensioned between bracket 546 and a depending portion of stop member 598 on shaft 476 that reciprocates with block 568. There is consequently no change in tension of spring 598 that would otherwise occur were spring 594 tensioned between bracket 546 and a fixed part of the machine. The mechanisms operated by cams 574, 582 and 592 are effective to carry a formed plate from the forming arbor toward the mica block, and are effective to insert lugs $l^b$ of plate P through apertures in bottom mica B carried by the mica block. The short lugs $l^b$ are inadequate for reliably retaining the plate in the bottom mica. Furthermore the final mount is maintained in assembly as a unit by bending the lugs over the outside faces of the bottom and top micas. When lugs $l^b$ pass through bottom mica B and while the plate P is still gripped by jaws 548 and 550 of carrier 474, a properly timed tool bends the lugs outward to give them a preliminary set (FIG. 88). It would be possible to complete the bend at this point in the mount assembling procedure, except that a superior result is obtainable by making a preliminary bend to retain the plate in position, and finish bending the lugs while the plate is more firmly pressed against the bottom mica at a later station, as will appear.

The mechanism for bending lugs $l^b$ in the plate-forming and inserting unit is generally indicated in FIG. 73 as 476 and is shown in other aspects in FIGS. 85, 86 and 87. In FIG. 87 tool 602 is shown in position for bending lugs $l^b$ of plate P while that plate is held by jaws 548 and 550 of carrier 474, pressing plate P against center block 544. The jaws are grooved for receiving the plate ribs, to make the grip accurate and firm. The construction of mica blocks 38 provides apertures for bending tool 602 and for other bending tools to be described. Tool 602, carried by slide 604 is operated through a quick stroke, while plate P is gripped with its lugs projecting through bottom mica B, by means of link 608, bell-crank 610 having a fixed intermediate pivot, link 612, cam-follower 614 and grooved face-cam 616 on shaft 524. At this time mica block 38 is accurately positioned by locating pins 130 and 132. The stroke of tool 602 is required to be sufficiently long so that it will provide clearance for the mica blocks during their travel with chain 34, yet tool 602 must reach lugs $l^b$. At the same time the stroke of tool 602 must be sufficiently accurate so as to bend lugs $l^b$ without materially flexing or displacing bottom mica B. For this reason the support and the links of the lug-bending tool are all made adjustable, as are the other operative mechanisms in the plate unit and throughout the entire machine. The plate unit as well as those other units are all susceptible of change, by substituting other mica blocks where necessary, and working tool faces of other design, where it is necessary to change from assembly of the illustrative mount to assembly of mounts of other design.

*Bottom lug crimper*

The crimper for the lugs $l^b$ which were given a preliminary set in the plate unit is identified in FIG. 4 as unit 25, and is the next unit following the plate inserter along the path travelled by the mica blocks. The so-called bottom mica crimper, that is, the crimper for the lugs $l^b$ projecting through the bottom mica, is shown in FIG. 99 and an enlarged detail thereof is shown in FIG. 100. Head 620 is projected under fluid pressure applied to piston 622 in cylinder 624, head 620 being guarded against rotation by rod 626 that is offset from the rod of piston 622 and travels parallel to that piston in stationary bearings. Rod 626 is strapped to head 620 by bar 628. The leading face of head 620 is recessed in order to accommodate the side rods of the several grids and the free end of the cathode, and to accommodate the lugs $l^t$ of plate P. Head 620 exerts pressure on the straight transverse edges of the plate to press it against bottom mica B as in FIG. 100. Approaching the partially set lugs $l^b$ of plate P from behind bottom mica B, and through the apertures on opposite sides of bar 102 of mica block 38, is a bifurcated tool 630 having flat faces for finish-crimping lubs $l^b$. Tool 630 is operated by a piston 632 in a cylinder 634, the head being held against rotation by slidably mounted rod 636 and connecting bar 638. The two fluid-operated units for head 620 and tool 630 are so arranged that head 620 contacts the plate slightly in advance of tool 630, and the pressure applied by head 620 is greater than that of tool 630 in order that the plate may be firmly pressed against the bottom mica and the bottom mica firmly retained in its block 38 at the time that the partially bent lugs $l^b$ are flattened against the bottom mica. In this way the plate and the bottom mica are tightly held together and assurance is provided that the assembly will not be disturbed in its supporting mica block.

The bottom mica crimping motions are effected during the operation of the several electrode-inserting units and while the conveyor is stationary. As a mechanism operated by fluid pressure it can be controlled simply by a valve, and this can be momentarily closed and opened to engage the adjacent electrode assembly under control of a cam switch. Switch 165$^e$ in the plate unit is provided for controlling such valve. Head 620 and tool 630 are quickly retracted in ample time to permit the mica block to advance to the next unit, which in the illustrative machine is the top mica unit.

*Top mica unit*

Referring now to FIGS. 89 to 98 inclusive, the nature and details of the top mica supplying and applying unit will be described. In FIG. 89 a magazine 640 is shown having a pressure plate 642 for urging the supply of top micas T against feed and stripping slide 644. Slide 644, with all of the other mechanisms of the top mica unit 26, is operated from a continuously running electric motor within the unit (not shown) through a single-revolution shaft. The clutch is energized under control of conveyor cam 52 and switch 54. Drive from the single-revolution shaft is applied at gear 650, so that shaft 648 may be regarded as the primary drive shaft of unit 26. A second shaft 652 is driven through bevel gearing 654. Grooved face-cam 655 on shaft 652 operates cam follower 656 and link 658 to reciprocate slide 644, in its support 646. At its forward end slide 644 carries a head 660 on pivot 662. The ends of drag link 64 are pivoted to head 660 and to rod 666 that slides in stationary bearings 668 and 670. A small block 672 is secured to shaft 666 between bearings 668 and 670, and compression springs 674 and 676 encircle rod 666 between bearing 670 and block 672, and between that block and bearing 668, respectively. As cam 655 is operated to carry head 660 from its position in front of magazine 640 (see FIG. 92) head 660 is urged by spring 676 in the counter-clockwise direction so as to move as a unit with slide 644. When head 660 reaches the position corresponding to position 664$^1$ of link 664, springs 676 and 674 are equally compressed. Thereafter the greater compression of springs 674, in fact the separation of block 672 from spring 676, is followed by a clockwise pivoting of head 660 through 90° as slide 664 continues its advance. This is represented in FIG. 92 by position 664$^2$ of link 664. By means of a vacuum system to be described, head 660 is thus effective to slide the foremost top mica T from magazine 640 and apply it broadside to the ends of the several electrodes supported in mica block 38.

Top micas T are held on the face of stripper head 660 by vacuum action. The face of head 660 is provided with two grooves 678 and communicating bores 680, coupled through a groove 682 encircling pivot 662, through passage 683 axially along pivot 662 and through radial opening 684 into slide 664. These head passages are coupled through internal passage 688 within the slide 644 (see especially FIGS. 91 and 92) and port 690 to vacuum line 686.

By virtue of the above described vacuum connections, the foremost top mica T is siezed by head 660 where it remains until its complete application to the ends of the previously assembled electrodes carried by bottom mica B and the mica block. A shoulder on the head assists in the engagement of the foremost mica for stripping and sliding it from the stack. Head 660 is formed, advantageously with inserts, to provide sloping surfaces 692 at those points where lugs $l^b$ of plate P emerge through top mica T. When the head reaches the lugs, vacuum line 686 is cut off, because plate 687 is carried by slide 644 to cut off port 690. Plate 687 is adjustable along slot 691 to control the time for cutting the vacuum in head 660 to release the top mica. Before starting its return stroke, head 660 sets lugs $l^b$ to retain mica T on the mount. In FIGS. 89, 90 and 98 an actuated bifurcated tool 694 is shown for backing up the plate P while surfaces 692 of head 660 apply pressure to give the top tabs $l^t$ a preliminary set or crimp. This avoids stressing the bottom mica.

The following mechanism is provided for accurately locating the projecting portions of the previously assembled electrodes so that the preformed apertures in top mica T will receive them as that top mica is applied. The bottom mica B and the apertures in the mica block serve to hold the cathode and grid ends quite close to the proper patterned positions. In FIG. 95 cam 696 on shaft 648 operates bell-crank 698 to drive link 700 and lever 702 to the right. Another link 704 is pivoted at its left extreme to lever 702 and to a two-part slide 706 at its right. The bearings for slide 706 is within a further slide 708, which is urged toward the right with respect to slide 706 by compression springs 710 (see FIG. 97) seated in both slides. Slide 708 moves in bearings 712 until its lateral extension 714 is engaged by an adjustable stationary stop 716. From that point on, slide 706 is operated by cam 696 to compress springs 710, and to operate the mechanism in FIG. 96 (where one wall of the slide is removed for clarity). Slide 706 pivotally carries a cross arm 718 to the ends of which are pivoted a pair of disccam arms 720. These cam arms operate a top pair of tongs 722 and 724, and a bottom pair of tongs 726 and 728. Tongs 722, 724 and 726, 728 are pivoted to slide 708 at 730 and 732, respectively. Their rear divergently inclined faces 731 are urged toward each other by compression springs 734 and 736, respectively, to embrace the cam arms. Slide 708 carries plural eccentrically mounted pins 738 which fix the end positions of the tongs in engagement with the ends of the electrodes carried by mica block 38. Thus, the reduced forward end 740 of tong 722 can descend to its lower limit under the influence of disc arms 720 as fixed by the uppermost eccentric 738. The next lower eccentric 738 determines the upper limit of the working face-portion 742 of tong 724. The exposed top lugs $l^t$ of plate P are adjusted by portions 740 and 742 for entering the apertures in top mica T as the latter is applied by head 660. Portions 740 are properly shaped as shown so as to admit top lugs $l^t$, retaining them laterally as well as adjusting them vertically. Plate P is positioned laterally by an auxiliary locator 746, just before it is gripped by portions 740 and 742. Bell-crank 748 under the influence of spring 750, urges locator 746 against the lateral edges of plate P, as controlled by cam 752 on shaft 648. Locator 746 contacts plate P at a point slightly closer to bottom mica B than that gripped by tong portions 740, 742 and 744 (FIG. 89).

Tongs 722 and 728 are also equipped with plates 744 clamped to portions 740 by outside retaining plates 741 (FIG. 95). (In FIG. 96 only one plate 744 and its retaining plate 741 are shown, those for tong 728 being omitted for more clearly showing working jaw portions 740 and 742 of tongs 724 and 728.) Plates 744 are both notched to receive the ends of the grid side rods and the end of the cathode. The notches are V-shaped so as to cam them toward an accurately predetermined pattern, matching the apertures of top mica T.

The axial dimension of the electrodes carried by mica block 38, as well as the transverse dimensions of the electrodes and of the block itself, are such that jaw portions 740, 742 and 744 might obstruct the indexing travel of the conveyor. For this reason, slide guide 712 is carried by vertical pivot 754 as is the lower support 756 of lever 702. The locating jaws and their operating slides are retracted by link 758, bell crank 760 carrying camfollowing roller 761, and cam 762 on shaft 652. This retracted position of the locating tong assembly is assumed during indexing travel of the mica-block conveyor. When the top mica unit commences its cycle, cam 762 permits a spring 763 (FIG. 91) to thrust link 758 forward to a limit determined by adjustable stop 764, thus properly shifting the tongs to travel in a straight-line path for grasping the ends of the electrodes. A compound motion could alternatively be used to close jaws or tongportions 740, 742 and 744 and to clear the path for the mica blocks, somewhat like the two-part funnel mechanism in FIG. 37 for directing the cathode tab into the bottom mica and mica block.

The three pairs of notched jaws formed at the ends of two pairs of tongs function to pick up the electrode ends and properly arrange them in a pattern matching the preformed apertures in top mica T; and the illustrative form of electrode-locating mechanism is accurate, comparatively simple and reliable.

It will be recalled that vacuum head 660 strips a single top mica from its magazine, applies it to the properly located ends of the electrodes, and partly bends the lugs $l^t$ of plate P. It would be possible, where a comparatively cruder result would be satisfactory, for head 660 to effect the entire crimping operation. However it has been found desirable to complete the crimp as started by head 660 at a separate stage.

*Top mica crimper*

The top mica crimper, shown in FIGS. 101 and 102 employs a backup tool 766, operated by a piston like 632 in FIG. 99 to support the plate P directly against the thrust of finished crimping head 768 which is also advantageously operated by a fluid unit such as cylinder 624 and piston 622 in FIG. 99. By virtue of this pressure-head and backup-tool arrangement, there is comparatively little stress imposed on the bottom mica, there is no tendency to eject the mount at this point, and the top mica is firmly secured against the straight end portions of plate P by the bent-over lugs $l^t$.

The fluid system for operating both finish crimpers for the bottom mica lugs $l^b$, and for the top mica lugs $l^t$, FIGS. 99 and 101, is shown in FIG. 102. During the operative stroke of piston 622, the rear of cylinder 624 is energized by fluid under pressure in line 770, the fluid from the opposite side of piston 622 reaching the side of piston 632 for effecting an operative stroke through line 772. Since an excess of fluid would enter line 772 as compared with that required to operate piston 632, a return line is provided with a pressure relief valve 774, connected to the fluid sump from which it is taken by a suitable pump. For reversely supplying fluid under pressure to cylinders 624 and 634, fluid is supplied by lines 776, the changeover from fluid supply to line 770 or to line 776 being effected by valve 778 under control of actuator 780. Fluid under pressure is delivered to valve 778 through line 782 by a pump not shown. Actuator 780 is operated by the armature of an electromagnet energized, as will appear, through the extra switch in plate unit designated 165$^e$.

At station 27 a bifurcated ejector (FIG. 103) 784, operated from fluid lines 770 and 776 is effective to push the completed mount out of mica blocks 38 as they reach that station in succession, and while the mica blocks are held in fixed position.

*Summary of operations*

From the foregoing it will be clear that the specific form of mount is built up by inserting electrodes endwise into a bottom mica, the electrodes previously inserted being accurately supported while each additional electrode is telescoped about the outside of the others. A top mica is applied at the conclusion of electrode assembling operations and the mount is maintained in assembly by crimping the lugs $l^b$ and $l^t$ of plate P on the outer surfaces of the micas. Evidently a fewer number of grid units can be used, as where only a triode including a cathode, a single grid and an anode is to be assembled. The two additional grid units would naturally be omitted or suppressed by de-energizing their motors. Were a pentode to be assembled of the type involving a tensioned directly heated filamentary cathode, it would be inserted manually after the mount is otherwise completed, and operation of the cathode unit would be suppressed.

In some tube designs, especially for operation at high frequencies where dielectric losses are to be avoided, the mount may be complete without one or both of the insulating wafers. The fundamental procedures described for assembling nested electrodes can still be advantageously utilized.

A mount of two sections can also be assembled with appropriate modification of the disclosed mechanisms, as where two cathodes, two grids and two anodes are to be associated between a single pair of micas in duo triodes. Similarly side-by-side parallel cathodes can be inserted endwise and tubular anodes can be simultaneously telescoped over them in forming duo diodes.

The present teachings can also be applied to assemble tandem sets of nested electrodes, as in diode-pentodes, with two or three micas as required by the mount design.

*Wiring diagram and timing*

FIG. 104 shows a wiring diagram coordinating the conveyor and the several assembling units which are equipped with unit drives, and for certain other purposes that will appear. The conveyor cams 52 and conveyor switch 54, the several cam switches 164, 164a, etc. in the unit drives, and the cam switches 165 and 165e in the bottom mica unit and the plate-inserting unit, respectively, are all shown in the position they would normally assume at the start of an insertion cycle, just following a stepwise advance of the conveyor.

Electromagnet 160 of the bottom mica unit will be seen to be energized from power line 860 through cam switches 164g, 164f . . . 164 in a series circuit, through wire 806, switch 54, and the other side of the power supply at line 802. The electric motors for constantly driving one of the clutch parts are all energized from outlets represented by outlet 804. Just after electromagnet 160 is energized, the cams of cam switches 164 and 165 commence rotation, and cam switch 164 is opened to break the series circuit. The drive of the bottom mica unit and of each of the other motor-driven units continues, however, as a characteristic of single-revolution clutches well known in the art, until one revolution is completed. Where fewer than all of the units are to operate, those not needed are rendered inoperative simply by pulling the power plug of the respective electric motor.

Near the end of the cycle of operation of the bottom mica unit its cam switch 165 is momentarily closed to energize electromagnet 99 of the conveyor unit drive. Shortly thereafter, the cycle of the bottom mica unit is completed. The circuit of its clutch electromagnet 160 to power lines 800, 802 is broken as soon as conveyor cam 52 advances slightly to throw switch 54 to the position opposite that shown. When the conveyor completes its stepwise advance, it comes to rest and at that time brings another cam portion 52 into effective position to restore switch 54. The bottom mica unit thereupon commences a renewed cycle of operation.

At the time that electromagnet 160 is energized another electromagnet 808 is also energized, for operating a valve (not shown) to admit air under pressure to the various bellows that clamp the mica blocks in position and hold them in that position. Electromagnet 808 is deenergized shortly thereafter, when cam switch 164 is opened; but the air pressure in the bellows is not permitted to decay during the assembly cycle of operation. Near the end of the cycle, conveniently at the time that electromagnet 99 is energized, another valve actuating electromagnet 810 is energized to open a bleeder valve and quickly allow the bellows to retract the locating pins that clamp the mica blocks. Electromagnet 780 for the crimping and ejecting fluid actuators is energized by cam contact 165e during the cycle of operation of the plate unit.

The mica blocks are normally cleared when the mount ejects the electrode assembly as a unit. Where the supply of bottom micas fails or where a single mica block is for any reason left bare, that mica block would thereafter be jammed should the electrodes be inserted subsequently. For this reason the bottom mica detector 22, 24 is provided, as previously described, and it is arranged in FIG. 104 to suppress the operation of the units into which the mica block is advanced in succession. Contacts 222, 224 are arranged to energize relay 812 from step-down transformer 814 for closing contacts 812'. It will be recalled that contacts 222, 224 are bridged only in the absence of a bottom mica. When contacts 812' are closed, an electromagnet 816 forming part of control unit 60 previously mentioned is energized to operate lever 818. The circuit for electromagnet 816 extends to line 860 through slip ring 820 of a program wheel to be described, wires 822 and 824; and through contact 812', wires 826 and 828, through cam switch 54 to power line 802. Lever 818 is operatively arranged opposite successive pivotal contacts 830 which are advanced by program wheel 832 as that wheel is indexed by pawl 834. An electromagnet 836 is energized through switch 54 during the conveyor-advancing intervals to index program wheel 832. Each contact 830 comes to rest in as many positions during a cycle of program wheel 832 as there are rest positions of each mica block during its cyclic travel with the endless chain conveyor. Unit 60 includes a series of stationary contacts 838, 838a, etc. one of which is positioned for engagement by contact 830 as the mica block reaches the several assembling units, there is a gap between stationary contacts 838, 838a, etc.

When electromagnet 160 of the single-revolution clutch for the bottom mica unit is energized, each of the various clutch electromagnets 160a, 160b, etc., is normally energized through its related contact 838a, etc. and pivotal contact 830 through slip ring 820 and wires 822 and 824. In the event that any circuit is breached by pivoting one of the contacts 830 out of engagement with stationary contacts 838, because a bare mica block was previously detected by contacts 222 and 224, the related clutch electromagnet 160 is not energized and the corresponding cam switch 164 remains in the initial position. The other clutch electromagnets 160 and cam switches 164 are all operated as is normal. The shifted contact 830 advances to each stationary contact 838 corresponding to the successive assembling units in time with the advance of the bare mica block through those related units. Each unit is thus rendered inoperative in succession in respect to a bare mica block. There is no interruption of operation of the preceding assembling unit and of the following assembling unit in relation to their mica blocks if they were sensed by detector 222, 224 and found properly carrying a bottom mica.

It is desirable that each assembling unit should be suppressed when a mica block reaches it carrying an incomplete subassembly, that is, where any part that previously should have been inserted is omitted. The further assembly of the defective mount is wasteful of parts, and the mount that would otherwise be completed might appear deceptively like a proper mount. This would entail further waste in subsequent manufacturing operations.

Detectors like that for the bottom mica, or photoelectric or some other form, can be arranged to check for proper insertion of the electrodes that are to be assembled in succession. A series of push buttons 812a, 812b, 812c and 812d are arranged to duplicate the function of contact 812' of the bottom mica detector in respect to the subassembly emerging from the several electrode-assembling units. These push buttons are effective when depressed by an attendant to energize electromagnets 816a, 816b, 816c and 816d (corresponding to electromagnet 816) for shifting pivotal contacts 830 to inoperative position with respect to the succeeding contacts 838a, 838b, etc. When any push button 812 is depressed, the related electromagnet 816 is energized from power line 802 through contact 54, wire 828, through its push button 812 and its electromagnet 816, to slip ring 820 through wires 822 and 824, to line 800. Push buttons 812 take the place of self-acting electrode detectors.

The flexibility of operation afforded by the separate assembling unit drives and the conveyor unit drive is a useful attribute of this machine. An assembling unit can be added or disabled at will as required by the number of electrodes to be assembled. (Cam switch 164g and clutch electromagnet 160g represent a spare unit, where an additional assembling unit is to be utilized.) Assembling units can be bodily removed from bed 10 and replaced by other units having tools fitted to handle specific electrodes used in particular mounts other than that previously being assembled. The high production rate of which the assembling machine is capable makes it economically desirable to change it at intervals for assembling mounts of various designs. The substituted unit, when screwed down and plugged in, will operate with the same intercontrols of the former unit.

Modification

Where the innermost electrode of the mount to be assembled is hollow, as the #1 grid in a filament-type mount, where the filament is manually inserted after the mount is delivered by the assembling machine, the sequence of assembling operations as described above can be somewhat modified. The outermost of a series of grids can be assembled first, rather than the innermost as previously described. Thus, the #3 grid can be assembled first, the #2 grid next, the #1 grid last; and thereafter the anode can be inserted as described above. In FIG. 105 a bifurcated mandrel 900 having a central wedge 902 is shown about to enter grid G2 which at this time is supported by the side rails 904, 906 of a four-motion grid conveyor. Mandrel 900 is provided with shoulders 901 for firmly pushing the grid forward, and is provided with lateral grooves 903 for receiving the grid side rods and accurately aligning the grid for endwise insertion into the apertures in mica B. The grid side rods abut shoulder portions 908 and 910 of the side rails until mandrel 900 has substantially penetrated the grid to be inserted. Thereafter, and preferably during a momentary pause in the stroke of mandrel 900, rails 904 and 906 are lowered and retracted, thereafter to pick up the succeeding grid. The side rails are effective, as in the four-motion conveyors previously described, to advance the grids from each pocket 912 to others in succession formed in stationary plate 914.

FIG. 105 shows grid G2 to be inserted into a bottom mica B carried by a mica block 38 into which grid G3 was previously inserted. For accurately locating the free end of grid G3, a pair of jaws 916, 918 are provided, the active faces of which resemble the grid-inserting carrier previously described.

In FIG. 106 grid G2 is shown nested within grid G3 and supported by mandrel 900. Wedge 902 is advanced after mandrel 900 reaches its forward limit to allow the mandrel to collapse, thus facilitating the removal of the mandrel without withdrawing the grid with it. The mandrel is to remain collapsed until it has fully entered the next grid to be inserted. The operating mechanism for this wedge is not shown but resembles that for opening and closing the cathode-gripping jaws of the cathode inserter. It will be evident that a #1 grid can be inserted with grid G2 using a similar mandrel and similar multijaw locator for the free ends of the inserted grids.

The assembling mechanisms and procedures specifically described above in connection with a particular mount design are evidently capable of variation, substitution, detailed modification, re-arrangement and improvement, utilizing fundamentals taught by the foregoing specification. Portions of the procedure and of the machine as described may be entirely omitted in utilizing other portions, either alone or in combination with other procedural steps and mechanisms. For these reasons I desire the appended claims to be construed broadly, consistent with the spirit of the invention.

What is claimed is:

1. The method of assembling electron-discharge devices comprising the steps of inserting a first electrode into an apertured support, one end of said first electrode remaining free, threading a guide member through a hollow second electrode and into engagement with the free end of said first electrode, telescoping said second electrode along said guide member and about said first electrode and into said apertured support, arranging and holding the free ends of the assembled electrodes in a predetermined pattern, and applying an apertured insulating wafer to the ends thus held.

2. The method of assembling electron-discharge devices comprising the steps of inserting an electrode endwise into an apertured support, moving the support to carry the electrode laterally into spaced endwise alignment with a rod-like locator, moving a hollow second electrode between and in endwise alignment with said locator and the first electrode, projecting the locator against the free end of the first electrode, and telescoping the second electrode over the first and endwise into the apertured support.

3. In an assembling machine, a unit for inserting a second long and slender element closely adjacent a first such element carried by a supporting fixture, said unit comprising a multiple-jaw locating mechanism, means for operating said mechanism into lateral engagement with the free end of the first element, a second locating mechanism comprising a rod and means for operating said rod into endwise engagement with the first element while that element is held by the first locating mechanism, a carrier and means for moving said carrier along said rod and in close proximity to the element previously inserted in the fixture for assembling the second element, and an actuator including operating means for retracting the multiple-jaw locating mechanism in advance of the carrier.

4. An assembling unit for adding a tubular electrode to a subassembly comprising a support and at least one electrode having a free end remote from the support, said unit comprising a conveyor for transporting tubular electrodes laterally along a path crossing the free end of the previously inserted electrode or electrodes, a cradle reciprocable along said previously inserted electrode and into the path of said conveyor for receiving electrodes successively and adding them to the subassemblies in succession, and a rod-like locator having a conical end portion to center the outermost one of the previously inserted electrodes, said locator being longitudinally reciprocable through a tubular electrode received on said cradle from said conveyor and into endwise engagement with an electrode forming part of the subassembly, and transporting mechanism for moving said cradle to transport the electrode carried thereby along said rod and said previously inserted electrode and into said support, and actuating means for operating and coordinating said conveyor, said transporting mechanism, and said locator.

5. Apparatus for assembling multiple electrodes in nested fashion comprising an assembling fixture, a conveyor for transporting said fixture to multiple operative stations in succession, an assembling unit at each of several stations, each of said assembling units having fixture orienting means, one of said units being effective to insert an electrode endwise into said fixture for support thereby, and a succeeding unit for telescoping a second electrode about that previously inserted, said succeeding unit comprising a carrier for supporting the latter electrode in endwise opposition to said fixture, a locating mechanism for the previously inserted electrode comprising a rod and an actuating drive for threading the rod through the electrode on said carrier and into endwise engagement with the electrode on the fixture, and an actuating mechanism subsequently effective to move the carrier to transport the electrode supported thereby along the locating rod, about the previously inserted electrode, and endwise into the supporting fixture.

6. In combination with a conveyor, an assembling fixture carried by said conveyor to successive operative positions, pairs of locating jaws, at a number of said operative positions, actuating devices for operating said jaws transversely of the conveyor path to grip said fixture in an operative position, one of said jaw-actuating devices being more forceful than the other, and a mechanical stop for arresting the more forceful actuating mechanism to locate said fixture along a line transverse to said conveyor.

7. Apparatus for assembling multiple electrodes in nested fashion comprising a block having means for retaining an apertured insulating wafer, a plurality of electrode-inserting units, a conveyor for carrying said block past said units in succession, one of said units comprising a carrier operable along a predetermined path for assembling a hollow electrode telescopically over a previously inserted electrode, and a rod having actuating mechanism for threading it through an electrode on said carrier and into endwise engagement with an electrode previously inserted into the insulating wafer for accurately supporting that previously inserted electrode, said locating rod being actuated in advance of the inserting stroke of said carrier, said apparatus including means for operating and coordinating said conveyor, said carrier, and said rod as aforesaid.

8. Apparatus for assembling a thermionic cathode into an apertured insulating wafer carried by a fixture, the cathode including a tube and an internal heater withdrawn into one end of the tube and projecting from the opposite end of the tube, said apparatus comprising a carrier for transferring said cathode endwise into the aperture of the insulating wafer and a rod for thereafter pushing the heater further into the cathode so as to project the heater terminals beyond the tubular cathode whereby the end of the cathode first inserted has no exposed filament portions nor does the free end of the cathode after insertion, and coordinating and operating means for said carrier and said rod.

9. An assembling machine comprising a plurality of assembling units, drives for each of the assembling units, a step-wise conveyor having a unit drive, intercontrols connected between the drive of one of said assembling units and said conveyor unit drive whereby each drive unit initiates the operation of the other as its cycle of operation terminates, and intercontrols connected between the drive units of the several assembling units for suppressing renewed operation of the conveyor controlling assembling unit in the event that any assembling unit fails to complete its normal cycle of operation.

10. An assembling machine comprising a conveyor having plural fixtures for transporting subassemblies from each station to succeeding stations, assembling units at several of said stations, a unit drive for said conveyor, a unit drive for each of said assembling units, a cam switch connected to said assembling unit drives and operable by the conveyor at the conclusion of its step-wise advance to initiate the operation of the several assembly-unit drives, a cam switch in each unit closed at the conclusion of the respective assembly-unit cycles, a series circuit connecting said unit cam switches and effective to suppress operation of all units whenever any unit is not properly restored, and a circuit breaker for each unit drive effective to suppress its operation as otherwise commenced by said conveyor-cam switch, whereby the cam switch of any suppressed unit will remain closed upon conclusion of the cycles of operation of the other assembling units and in condition for a new cycle of operations.

11. An apparatus for assembling electron discharge devices comprising an apertured support for a first electrode, said support retaining said first electrode at one end only, a rod-like support adapted to pass through a hollow second electrode and into engagement with the free end of said first electrode, means for telescoping said second electrode over said first electrode and into said apertured support, clamping and guiding means for arranging and holding the free ends of the assembled electrodes in a predetermined pattern means for applying an apertured insulating wafer to the ends thus held, and operating means effective to operate and coordinate motion of said rod-like support, said telescoping means, said clamping and guiding means and said wafer applying means.

12. The method of adding a tubular electrode to a sub-assembly of a support and at least one electrode having a free end remote from said support comprising transporting tubular electrodes laterally along a path crossing the free end of the previously inserted electrode, receiving electrodes successively from a supply thereof and adding them to the sub-assembly in succession and centering the outermost of one of the previously inserted electrodes by endwise engagement of a locator rod with an electrode forming part of the sub-assembly and thereafter transporting an electrode along said locator rod and the previously inserted electrode and into said support.

13. Apparatus for assembling mounts including means for supporting a plurality of electrode supporting rods with their ends exposed and arranged in a predetermined pattern, a magazine for a supply of apertured insulating wafers, and a transfer mechanism for receiving a single wafer from said supply and applying it broadside to the exposed ends of said electrode support wires, said transfer mechanism including a member on a reciprocable support, said member having means for holding said wafer with apertures oriented for application to the exposed ends of said electrode support wires, and said member being movable on said support between wafer receiving and wafer applying positions.

14. An apparatus for assembling electron discharge devices comprising an apertured support for a first electrode, said support retaining said first electrode at one end only, a carrier for a hollow second electrode, a rod-like support adapted to pass through said hollow second electrode and into engagement with the free end of said first electrode, said carrier for said second electrode being adapted to telescope said second electrode over said first electrode and into said apertured support, a clamp for arranging and holding the free ends of the assembled electrodes in a predetermined pattern, a wafer carrier adapted to move to apply an apertured insulating wafer to the ends thus held, and operating and coordinating means for moving said carrier for said second electrode, said rod-like support, said clamp and said wafer carrier in timed relationship.

15. An electronic tube assembling machine comprising a carrier for transporting an electrode assembly supporting element, means for inserting one end of each of plural individual elongated tube electrodes with one end of each such electrode remaining free and the opposite end fixed to said electrode assembly supporting element in proper relative assembly positions, means operable in timed relation to the aforesaid means for fixing the free ends of said assembled electrode elements in predetermined, precise spacing and arrangement, said last named means including gathering tools establishing such spacing and arrangement and a device for affixing an insulating spacer to the thus arranged ends of the electrode elements, and advancing means for transporting said carrier from said electrode inserting means to said second named means.

16. Apparatus for manufacturing electron discharge devices including a cathode having a flexible tab on a relatively rigid metal tube which includes means for supporting an insulating wafer with an aperture in a predetermined position, means for projecting the cathode with the tab foremost toward the aperture, a split funnel operable into registry with the aperture of the wafer for guiding the tab into that aperture, and means for operating said funnel so as to separate and remove the funnel parts from the path of the cathode toward and into the wafer after the tab has entered the aperture.

17. An apparatus for assembling an electrode to a mount sub-assembly comprising a carrier for said mount subassembly, means for holding a stack of substantially flat blanks, a number of forming dies, means for feeding blanks from said stack to said forming dies, means for operating said forming dies to form said blank into a hollow electrode generally symmetrical about an axis, a second carrier for supporting said formed electrode and moving it along its axis towards the mount sub-assembly, means for moving said second carrier toward said mount sub-assembly to apply said formed electrode to said mount subassembly, said second carrier including means engaging said blank at all times during its transit from said forming dies to said sub-assembly to preserve a predetermined orientation, and means for operating and coordinating the operation of said feeding means, said forming dies and said second carrier.

18. An electronic tube assembling machine comprising means for receiving and relatively rigidly supporting two tube electrodes initially in axially spaced apart but coaxial relation, means for actuating said first mentioned means to provide relative axial movement but substantially no transverse movement between said electrodes while supported by said first mentioned means to position said electrodes in coaxial nested relation and means operable in timed relation to the aforesaid means for fixing the free ends of said assembled electrode elements in predetermined, precise spacing and arrangement, said last named means including gathering tools establishing such spacing and arrangement and a means for affixing an insulating spacer to the thus arranged ends of the electrode elements.

19. An electronic tube assembling machine comprising means for receiving and relatively rigidly supporting two tube electrodes initially in axially spaced apart but coaxial relation, means to provide substantially only relative axial movement between said electrodes to position said electrodes in coaxial nested relation and means operable in timed relation to the aforesaid means for fixing the free ends of said assembled electrode elements in predetermined, precise spacing and arrangement, said last named means including gathering tools establishing such spacing and arrangement and a means for affixing an insulating spacer to the thus arranged ends of the electrode elements.

20. In the manufacture of an electron discharge device, the steps including supporting an apertured insulating wafer, assembling one electrode with said wafer by advancing said one electrode endwise through a predetermined thrust to insert one end thereof through said wafer, embracing opposing portions of said one electrode adjacent its other end to orient said one electrode for assembly with a further hollow electrode, advancing a guide member through said further hollow electrode and into engagement with said other end of said one electrode and releasing opposing portions of said one electrode, telescoping said further hollow electrode along said guide member and about said one electrode, and assembling said further hollow electrode with said wafer by advancing said further hollow electrode endwise through a predetermined thrust to insert one end thereof through said wafer.

21. In the manufacture of an electron discharge device, the steps including supporting an apertured insulating wafer, assembling one electrode with said wafer by advancing said one electrode endwise through a predetermined thrust to insert one end thereof through said wafer, embracing said one electrode adjacent its other end to orient said one electrode for assembly with a further hollow electrode, advancing a guide member through said further hollow electrode and into engagement with said other end of said one electrode and releasing said one electrode, telescoping said further hollow electrode along said guide member and about said one electrode, assembling said further hollow electrode with said wafer by advancing said further hollow electrode endwise through a predetermined thrust to insert one end thereof through said wafer, applying a further apertured insulating wafer over the other ends of said electrodes, and deforming ends of said electrodes against adjacent portions of said insulating wafers.

22. In the manufacture of an electron discharge device, the steps including supporting an apertured insulating wafer assembling on electrode with said wafer by advancing said one electrode endwise through a predetermined thrust to insert one end thereof through said wafer embracing said one electrode adjacent its other end to orient said one electrode for assembly with a further hollow electrode, advancing a guide member through said further hollow electrode and into engagement with said other end of said one electrode and releasing said one electrode, telescoping said further hollow electrode along said guide member and about said one electrode, assembling said further hollow electrode with said wafer by advancing said further hollow electrode endwise through a predetermined thrust to insert one end thereof through said wafer, embracing said telescoped electrodes adjacent the ends remote from said insulating wafer, applying a further apertured insulating wafer over the remote ends of said electrodes, and bending end portions of said electrodes which project through the respective insulating wafers against the adjacent faces of said wafers.

23. The method of assembling an electron discharge device including the steps of mounting an apertured support in a predetermined position, advancing a first electrode axially along a thrust path toward said apertured support to insert the leading end of said first electrode into an aperture of said support, laterally contacting said first electrode to orient the trailing end thereof along said thrust path for assembly with a further hollow electrode, advancing an elongated locator through said further hollow electrode and along said thrust path for engagement with the trailing end of said first electrode and thereafter removing the lateral contact, and advancing said further hollow electrode axially toward said apertured support to nest said further hollow electrode about said first electrode and to insert the leading end of said first electrode into a further aperture of said support.

24. The method of assembling electron discharge device including the steps of mounting an apertured support, advancing a first electrode axially along a thrust path toward said apertured support to insert the leading end of said first electrode into an aperture of said support, embracing said first electrode to orient the trailing end thereof along said thrust path for assembly with a further hollow electrode, advancing an elongated locator through said further hollow electrode and along said thrust path into engagement with the trailing end of said first electrode, advancing said further hollow electrode axially toward said apertured support to nest said further hollow electrode about said first electrode and to insert the leading end of said first electrode into a further aperture of said support, embracing said nested electrodes adjacent their trailing ends to orient same with respect to a further apertured support, and advancing said further apertured support over the trailing ends of said electrodes.

25. The method of assembling electron discharge device including the steps of mounting an apertured support advancing a first electrode axially along a thrust path toward said apertured support to insert the leading end of said first electrode into an aperture of said support, laterally contacting said first electrode to orient the trailing end thereof along said thrust path for assembly with a further hollow electrode, advancing an elongated locator through said further hollow electrode and along said thrust path into engagement with the trailing end of said first electrode and thereafter removing the lateral contact, advancing said further hollow electrode axially toward said apertured support to nest said further hollow electrode about said first electrode and to insert the leading end of said first electrode into a further aperture of said support, laterally contacting said electrodes to orient the trailing ends thereof for assembly with a further apertured support, applying said further apertured support over the oriented trailing ends of said electrodes, pressing the assembly of said electrodes and said supports firmly together, and deforming portions of said electrodes projecting through said supports to secure the assembly together.

26. In the manufacture of an electron discharge device including a cathode having a relatively rigid cathode sleeve, a flexible tab projecting from one end of said sleeve, and a fragile filament disposed within said sleeve and shielded thereby except for a portion projecting from the other end of said sleeve, the steps including supporting an insulating wafer having one or more apertures in a predetermined position, advancing said cathode along a thrust path toward one of said apertures with said tab foremost, funneling said tab by cooperating jaws into said one aperture, retracting said cooperating jaws from said thrust path after at least the leading end of said tab is funneled into said one aperture, and advancing said filament relative to said sleeve whereby a portion of said filament projects from said one end of said sleeve through said insulating wafer, said tab and the last named projecting portion being available at the side of said insulating wafer remote from said cathode for connection to terminals of said electron discharge device.

27. In the manufacture of an electron discharge device including a cathode having a relatively rigid cathode sleeve, a flexible tab projecting from one end of said sleeve, and a fragile filament disposed within said sleeve and shielded thereby except for a portion projecting from the other end of said sleeve, the steps including supporting an insulating wafer having one or more apertures in a predetermined position, advancing said cathode along a thrust path toward one of said apertures with said tab foremost to insert said tab in said insulating wafer, and advancing said filament relative to said sleeve whereby a portion of said filament projects from said one end of said sleeve through said insulating wafer, said tab and the last named projecting portion being available at the side of said insulating wafer remote from said cathode for connection to terminals for said electron discharge device.

28. In a machine for assembling mounts in the manufacture of electron discharge devices, a plurality of electrode assembly stations each including operating mechanisms, a conveyor, spaced mount-supporting fixtures carried by said conveyor, drive means for said conveyor to advance said fixtures along a predetermined path into successive stations, each of said fixtures having a seat adapted to mount an apertured wafer in a plane extending angularly of said predetermined path, the operating mechanisms at one of said stations including a carrier movable long a thrust path substantially at right angles to said plane for inserting the end of an electrode through said wafer, and a supply conveyor extending at right angles to said thrust path for delivering successive electrodes to said carrier.

29. In a machine for assembling mounts in the manufacture of electron discharge devices, a plurality of electrode-assembly stations each including operating mechanisms, a horizontally-extending conveyor, mount-supporting fixtures spaced along said conveyor and supported thereby, means for intermittently indexing said conveyor to advance said fixtures along a predetermined path into successive stations, each of said fixtures having a seat disposed in a vertical plane extending angularly of said predetermined path, the operating mechanism at one of said stations including a carrier movable along a thrust path substantially at right angles to said vertical plane and coaxially of said seat, and a horizontally disposed supply conveyor extending at right angles to said thrust path for delivering successive elements to said carrier.

30. In apparatus for assembling mounts including a movable support, a mica inserting station comprising a feed plate having a plurality of seats each adapted to receive a mica, means at each of said seats and engageable with the received mica for orienting the same preliminary to transfer, means for intermittently indexing said feed plate to bring successive micas into a transfer location, transfer mechanisms having a vacuum chuck at one end, said vacuum chuck being movable under control of said transfer mechanisms from a pick-up position underlying successive micas at said transfer location to an unloading position broadside of said movable support, means for applying vacuum to said vacuum chuck when in said pick-up position, and means for interrupting the vacuum when said vacuum chuck is in said unloading position.

31. In apparatus for assembling mounts including a movable support, a mica inserting station comprising a feed plate having a plurality of seats each adapted to receive a mica, means at each of said seats and engageable with the received mica for orienting the same preliminary to transfer, means for intermittently indexing said feed plate to bring successive micas into a transfer location, transfer mechanisms having a vacuum chuck at one end, said vacuum chuck being movable under control of said transfer mechanisms from a pickup position underlying successive micas at said transfer location to an unloading position broadside of said movable support, actuating means operatively connected to said transfer mechanism for operating said transfer mechanisms in alternation with the indexing means for said feed plate, means for applying vacuum to said vacuum chuck when in said pickup position, and means for interrupting the vacuum when said vacuum chuck is in unloading position.

32. In a machine for the assembly of an electron discharge device, a station including cathode inserting mechanisms, a movable support at said station for an apertured wafer, means cooperating with said support for orienting said support relative to said cathode inserting mechanisms, said cathode inserting mechanisms including a cathode carrier movable along a predetermined thrust path extending toward said support, feed means extending transversely of said thrust path for delivering a cathode to said carrier at the beginning of an insertion cycle, a multiple-jaw guide disposed adjacent said support, means operable at the beginning of said insertion cycle for closing said multiple-jaw guide along said thrust path to provide a funnel for the foremost end of said cathode, actuating means operatively connected to said carrier for advancing said cathode along said thrust path, and means operatively connected to said multiple-jaw guide and timed in relation to operation of said actuating means for timed in relation to operation of said actuating means for retracting the said multiple-jaw guide from said thrust path after insertion of the foremost end of said cathode in said apertured wafer.

33. In a machine for the assembly of an electron discharge device, a station including cathode inserting mechanisms and a support at said station for an apertured wafer, said cathode inserting mechanisms including a cathode carrier movable along a predetermined thrust path extending toward said support, feed means extending transversely of said thrust path for delivering a cathode to said carrier at the beginning of an insertion cycle, a multiple-jaw guide disposed adjacent said suport, means operable at the beginning of said insertion cycle for closing said multiple-jaw guide along said thrust path to provide a funnel for the foremost end of said cathode, actuating means operatively connected to said carrier for advancing said cathode along said thrust path, and means operatively connected to said multiple-jaw guide and timed in relation to operation of said actuating means for retracting said multiple-jaw guide from said thrust path after insertion of the foremost end of said cathode in said apertured wafer.

34. In a machine for the manufacture of an electron discharge device including a cathode having a relatively rigid metal tube and a flexible tab projecting from one end of said tube, means for supporting an insulating wafer having one or more apertures in a predetermined position, means for advancing said cathode along a thrust path toward one of said apertures with said tab foremost, cooperating jaws arranged along said thrust path for funneling said tab into said one aperture during a first portion of said advance, and means operative to retract said cooperating jaws from said thrust path after funneling at least the leading end of said tab into said one aperture whereby the advancing means is free to complete the insertion of said tab into said insulating wafer.

35. In a machine for the manufacture of an electron discharge device including a cathode having a relatively rigid cathod sleeve, a flexible tab projecting from one end of said sleeve, and a fragile filament disposed within said sleeve and shielded thereby except for a portion projecting from the other end of said sleeve, means for supporting an insulating wafer having one or more apertures in a predetermined position, means for advancing said cathode along a thrust path toward one of said apertures with said tab foremost, cooperating jaws operative along said thrust path for funneling said tab into said one aperture, means for retracting said cooperating jaws from along said thrust path after the leading end of said tab is funneled into said one aperture, and means for advancing said filament relative to said sleeve whereby a portion of said filament projects from said one end of said sleeve through said insulating wafer, said tab and the last named projection portion being available at the side of said insulating wafer remote from said cathode for connection to terminals of said electron discharge device.

36. In a machine for the manufacture of an electron discharge device including a cathode having a relatively rigid cathode sleeve, a flexible tab projecting from one end of said sleeve, and a fragile filament disposed within said sleeve and shielded thereby except for a portion projecting from the other end of said sleeve, means for supporting an insulating wafer having one or more apertures in a predetermined position, means for advancing said cathode along a thrust path toward one of said apertures with said tab foremost, and means for advancing said filament relative to said sleeve whereby a portion of said filament projects from said one end of said sleeve through said insulating wafer, said tab and the projecting portion of said filament being available at the side of said insulating wafer remote from said cathode for connection to terminals of said electron discharge device.

37. In apparatus for assembling electron discharge devices, a station including electrode assembly mechanisms, a movable support at said station adapted to hold a partially assembled mount including an apertured wafer and a first electrode projecting from said wafer, means cooperating with said support for orienting said support relative to said electrode assembly mechanisms, guide means having multiple-jaws operable along a predetermined thrust path toward said support for orienting the trailing end of said first electrode along said thrust path, a carrier for a further hollow electrode, actuating means operatively connected to said carrier for advancing said carrier along said thrust path, an elongated locator, actuating means operatively connected to said locator for advancing said locator through said further hollow electrode and into axial engagement with the trailing end of said first electrode, and means operative in timed relation to the actuating means for both said carrier and said locator for retracting the jaws of said guide means from said thrust path to a clearance position relative to the advancing carrier after axial engagement of said locator with said first electrode, the stroke of the advancing means for said carrier being selected to extend the foremost end of said further electrode through said apertured wafer.

38. In apparatus for assembling electron discharge devices, a station including electrode assembly mechanisms, a support at said station adapted to hold a partially assembled mount including an apertured wafer, and a first electrode projecting from said wafer, guide means having multiple-jaws operable along a predetermined thrust path toward said support for orienting the trailing end of said first electrode along said thrust path, a carrier for a further hollow electrode, actuating means operatively connected to said carrier for advancing said carrier along said thrust path, and elongated locator, actuating means operatively connected to said locator for advancing said locator through said further hollow electrode and into axial engagement with the trailing end of said first electrode, and means operative in timed relation to the actuating means for both said carrier and said locator for retracting the jaws of said guide means from said thrust path to a clearance position relative to the advancing carrier after axial engagement of said locator with said first electrode.

39. In a machine for the assembly of an electron discharge device, a station including electrode assembly mechanisms, a support at said station adapted to hold a partially assembled mount including an apertured wafer and electrodes projecting from said wafer, a guide including multiple-jaws movable in a plane parallel to said wafer and spaced therefrom, said guide being operative in an extended position to laterally engage the trailing ends of said electrodes for orienting said electrodes along a predetermined thrust path in relation to said support, a carrier for a further hollow electrode, said carrier having a rearward shoulder contacting the trailing end of said further electrode, actuating means for advancing said carrier through a forward thrust path to nest said further hollow electrode about the electrodes of the partially assembled mount, a locator disposed along said thrust path, actuating means operatively connected to said locator for advancing said locator through a forward thrust to extend said locator through said further hollow electrode and into contact with the electrodes of the partially assembled mount, and actuating means operatively connected to said jaws of said guide for retracting said jaws from said thrust path, the respective actuating means being coordinated and timed such that said locator contacts the electrode while said guide is in said extended position, and thereafter said guide is retracted preliminary to the forward thrust of said carrier.

40. In a machine for the assembly of an electron discharge device, a station including electrode assembly mechanisms, a movable support at said station adapted to hold a partially assembled mount including an apertured wafer and nested electrodes projecting from said wafer, means cooperating with said support for orienting said support relative to said electrode assembly mechanisms, a guide including multiple-jaws movable in a plane parallel to said wafer and spaced therefrom, said guide being operative in an extended position to laterally engage the trailing ends of said nested electrodes for orienting said nested electrodes along a predetermined thrust path in relation to said support, a carrier for a further hollow electrode, said carrier having a rearward shoulder contacting the trailing end of said further electrode, actuating means for advancing said carrier through a forward thrust to nest said further hollow electrode about the nested electrodes of the partially assembled mount, a locator disposed along said thrust path, actuating means operatively connected to said locator for advancing said locator through a forward thrust to extend said locator through said further hollow electrode and into contact with the nested electrodes of the partially assembled mount, and actuating means operatively connected to said jaws of said guide for retracting said jaws from said thrust path, the respective actuating means being coordinated and timed such that said locator contacts the nested electrodes while said guide is in said extended position, and thereafter said guide is retracted preliminary to the forward thrust of said carrier.

41. Apparatus for manufacturing mounts for electron discharge devices comprising a support, gripping means on said support engaging an electrode subassembly to support the same substantially along a predetermined thrust path, a guiding device spaced from said support along said thrust path and including mutiple coacting jaws, means mounting said jaws for movement transversely of said thrust path from a retracted position relative to said subassembly to an extended position, said jaws being constructed to accurately orient said subassembly along said thrust path when in said extended position, actuating means operatively connected to the mounting means for said jaws for advancing and retracting said jaws, a carrier operative through an insertion stroke along said thrust path for transporting a wafer having an apertured pattern registering with said predetermined pattern flatwise toward and over said ends of said subassembly, and actuating means operatively connected to said carrier for driving the same through said insertion stroke, the actuating means for said carrier being coordinated to the actuating means for said jaws of said locating device whereby said jaws are in said extended position during transport of said wafer over said ends.

42. Apparatus for manufacturing mounts for electron discharge devices comprising a support, gripping means on said support engaging an electrode subassembly to support the same substantially along a predetermined thrust path, a locating device spaced from said support along said thrust path and including multiple coacting jaws, means mounting said coacting jaws for movement from a retracted position relative to said subassembly to an extended position along said thrust path, actuating means operatively connected to the mounting means for said jaws for advancing and retracting said jaws, a carrier operative through an insertion stroke along said thrust path for transporting a wafer having an apertured pattern registering with said predetermined pattern flatwise toward and over said ends of said subassembly, and actuating means operatively connected to said carrier for driving the same through said insertion stroke in timed relation to operation of said jaws.

43. In apparatus for assembling mounts in the manufacture of vacuum tubes, a fixture having an electrode assembly projecting forwardly from one face thereof, said electrode assembly including a bottom mica seated within said fixture, a top mica spaced from said bottom mica, and several electrodes extending between said micas and having ends projecting through said micas, a backup tool extensible through said fixture from the rear side of said bottom mica, a crimping tool movable toward the projecting electrode assembly for deforming ends of said electrode projecting through said top mica, and operating mechanisms for said backing tool and said crimping tool coordinated such that said electrodes are supported against stress by said backing tool during operation of said crimping tool.

44. Apparatus for manufacture mounts for an electron discharge device having an electrode assembly comprising a support adapted to mount an electrode subassembly with one or more electrodes thereof projecting therefrom along a path and having free ends, a locating device having multiple coacting jaws and arranged along said path at a location spaced from said support and adapted to orient said free ends in a predetermined pattern, means for operating said locating device and for moving said coacting jaws substantially transverse of said path, a carrier, means mounting said carrier for movement toward and away from said support, said carrier having means for mounting and constraining an apertured mica in a position to register with the oriented free ends of said electrode subassembly, and means operating said carrier for transporting said mica flatwise toward said support and for applying said mica over said oriented free ends of said electrode subassembly.

45. Apparatus according to claim 44 including a tool arranged to be engageable with selected ones of the oriented free ends, and means movable mounting said tool on said carrier for deforming said selected ones after application of said mica.

46 Apparatus for manufacturing mounts for an electron discharge device having an electrode assembly comprising a support adapted to mount an electrode subassembly with one or more electrodes thereof projecting therefrom along a path and having free ends, a magazine spaced from said support and adapted to receive a stack of apertured wafers, a transfer mechanism for stripping a single wafer edgewise from said stack, means mounting said transfer mechanism for movement between said magazine and said support, said transfer mechanism including means for mounting and constraining said wafer in a position to register with the oriented ends of said electrode subassembly, and means operating said transfer mechanism for transporting said wafer broadside toward said support and for applying said wafer over the free ends of said electrode subassembly.

47. Apparatus for assembling an elongated electrode having at least one projecting end portion to a pierced wafer comprising a support for said wafer, a carrier for said electrode, means operatively connected to said carrier for moving said carrier toward said support for advancing said electrode endwise toward said support, the movement of said carrier in relation to said support being established to advance said end portion of said electrode through said wafer, a tool arranged on the side of said wafer remote from said carrier, and means operable in timed relation to said carrier for moving said tool relative to said support for deforming said end portion of said electrode while held by said carrier.

48. Apparatus comprising a first conveyor, a series of supporting blocks carried by said first conveyor, means operating to advance said blocks stepwise into a series of stations including a wafer-loading station having a second conveyor with respective seats for said wafers, means operative to index said second conveyor stepwise to advance successive wafers into a transfer position, a transfer arm operable in succession through the seats of the respective wafers in said transfer position to transport wafers successively from said second conveyor to the individual blocks on said first conveyor, and means operating said transfer arm in alternation with said second conveyor.

49. Apparatus according to claim 48 including a vacuum chuck on said transfer arm for firmly retaining said wafer during transfer.

50. Apparatus according to claim 48 wherein said second conveyor includes a horizontal feed plate having a circular array of shouldered apertures, and a plurality of vertically reciprocable buttons adjacent said apertures having inclined top portions and horizontal top portions, and means for reciprocating said buttons into the respective apertures to level said top portions with said shoulders and operable in timed relation to operation of said feed plate.

51. In an assembling machine, a conveyor, a series of supporting blocks on said conveyor for electrode subassemblies, a series of assembling units arranged in succession along the path of said conveyor, means operatively connected to said conveyor for advancing said supporting blocks into operative positions relative to successive assembling units, each of said assembling units including transfer means for applying a part to the subassembly on each of said supporting blocks, a detector adjacent one of said assembling units for sensing the presence in successive supporting blocks emerging from said one unit of the one part to be assembled thereby, and control means responsive to operation of said detector for successively suppressing the operation of each succeeding unit with respect to supporting blocks lacking said one part.

52. Apparatus for making electrode assemblies including a fixture adapted to support an insulating wafer having thereon at least one electrode which projects on opposite sides of said wafer, a pressure head at one side of said fixture, means operatively connected to said head for moving said head endwise into contact with the adjacent projecting portion of said electrode, a tool on the opposite side of said fixture and movable relative thereto, means operatively connected to said tool for moving said tool into engagement with the other projecting portion of said electrode for deforming said other projection portion, said head being constructed and arranged to apply pressure to said electrode to assure firm engagement of said electrode against said insulating wafer and to relieve said fixture of stress resulting from operation of said tool.

53. In an assembling machine for electron tube mounts of the type having an electrode with a small and flexible projecting portion on a larger and more rugged portion, an apertured support adapted to receive said electrode, a funnel mechanism including movable jaws disposed adjacent said apertured support, a carrier adapted to receive said electrode with said projecting portion foremost and movable toward said apertured support, means operative to move said carrier to advance said electrode toward said support, and means for actuating said movable jaws of said funnel mechanism in timed relation to the operation of said carrier whereby said movable jaws are opened and said funnel mechanism is withdrawn from its position adjacent said apertured support as said carrier advanced said larger and more rugged portion of said electrode into assembly with said apertured support.

54. Apparatus for manufacturing mounts for an electron discharge device having an electrode assembly comprising a support adapted to mount an electrode subassembly with one or more electrodes thereof projecting therefrom along a path and having free ends, a magazine spaced from said support and adapted to receive a stack of apertured wafers, a transfer mechanism for stripping a single wafer edgewise from said stack, means mounting said transfer mechanism for movement between said magazine and said support, said transfer mechanism including means for mounting and constraining said wafer in a position to register with the free ends of said electrode subassembly, means operating said transfer mechanism for transporting said wafer broadside toward said support and for applying said wafer over said free ends of said electrode subassembly, a locating device having multiple coacting jaws and arranged along said path at a location spaced from said support and adapted to orient said free ends in a predetermined path, and means for operating said locating device in timed relation to said transfer mechanism for orienting said free ends of said electrode subassembly in advance of the application of said wafer over said free ends of said electrode subassembly.

55. In apparatus for assembling mounts in the manufacture of electron discharge devices, a plurality of electrode assembly stations arranged along a predetermined path, a support adapted to receive a mount for transport in succession to said stations, a conveyor operatively connected to said support for intermittently moving said support along said path, means mounting the respective supports on said conveyor for limited adjustment relative to said conveyor, a frame at each of said stations including opposed portions between which said support is disposed when transported into successive stations, respective gripping means on said opposed portions of said frame at each of said stations, means on opposite sides of said support cooperating with said gripping means to adjust said support in relation to the mechanisms at each of said stations, pneumatic actuating means operative to urge the respective gripping means into cooperating relation with the means on said support, said pneumatic actuating means including a first bellows connected to one of said gripping means and a second bellows of a larger diameter connected to the other of said gripping means, and a stop for limiting extension of said second bellows.

56. In an assembling machine, a conveyor, a series of supporting blocks on said conveyor, a mica-applying unit along the path of said conveyor, a series of assembling units arranged in succession along the path of said conveyor following said mica-applying unit, means operatively connected to said conveyor for advancing said supporting blocks into an operative position relative to successive units, each of said units including transfer means for applying a part to the subassembly on each of said supporting blocks, a detector following said mica-applying unit for sensing the presence in successive supporting blocks emerging from said mica-applying unit of the mica to be assembled thereby, and control means responsive to operation of said detector for successively suppressing operation of said series of assembling units with respect to supporting blocks lacking said mica.

57. Apparatus for manufacturing electron discharge devices of the type including an electrode having an end portion for supporting said electrode comprising means for supporting an insulating wafer with an aperture in a predetermined position, means for projecting said electrode with said end portion foremost toward said aperture, a split funnel operable into registry with said aperture of said wafer for guiding said end portion into said aperture, and means for operating said funnel so as to split the funnel parts and to remove said funnel from the path of advance of said electrode toward said wafer after the said end portion enters said aperture.

58. In a machine for assembling mounts in the manufacture of electron discharge devices, a plurality of electrode assembly stations each including operating mechanisms, a conveyor, spaced mount-supporting fixtures carried by said conveyor, drive means for said conveyor to advance said fixtures along a predetermined path into successive stations, each of said fixtures having means to mount a support in a plane extending at an angle of substantially 45 degrees to said predetermined path, the operating mechanism at one of said stations including feed means operative along a feed path substantially at right angles to said plane for applying an electrode to said support, and supply means extending substantially at right angles to said feed path for delivering successive electrodes to said feed means.

59. In a machine for assembling mounts in the manufacture of electron discharge devices, a plurality of electrode assembly stations each including operating mechanisms, a conveyor, spaced mount-supporting fixtures carried by said conveyor, drive means for said conveyor to advance said fixtures along a predetermined path into successive stations, each of said fixtures having means to mount a support in a plane extending at an angle to said predetermined path, the operating mechanisms at one of said stations including feed means operative along a feed path substantially at right angles to said plane for applying an electrode to said support, and supply means extending substantially at right angles to said feed path for delivering successive electrodes to said feed means.

60. In multiple-station apparatus for assembling electron discharge devices, a fixture adapted to carry on electrode subassembly having at least one electrode supported only at one end to successive stations of said apparatus including at least one station for assembling a further electrode to said subassembly, assembly mechanisms at said one station, and means at said one station operative to locate said fixture in relation to said assembly mechanisms, said assembly mechanisms including adjusting means for orienting the unsupported end of said one electrode of said electrode subassembly along a prescribed axial path, a carrier for said further electrode, and means operative to move said carrier along said prescribed axial path to a point immediately adjacent said fixture and past said adjusting means for transferring said further electrode toward said fixture and into assembly about said one electrode of said electrode subassembly.

61. An electronic tube assembling machine comprising a carrier for transporting an electrode assembly supporting element, means for applying an elongated tube electrode to said supporting element with one end of said electrode having one end remaining free and the opposite end fixed to said supporting element, and means operable in timed relation to the applying means for fixing said one end of said electrode in a precise position, said last named means including gathering tools establishing said position and a device for affixing an insulating spacer to said positioned end of said electrode.

62. Apparatus for making electrode assemblies including a fixture adapted to support an insulating wafer having thereon a number of electrodes which project from one side of said wafer, certain electrodes having lugs projecting through said insulating wafer and being accessible at the other side thereof, a pressure head at said one side of said fixture, actuating means operatively connected to said head for moving said head endwise into contact with the adjacent projecting ends of said electrodes, said head having a leading face recessed in the pattern of the projecting ends of said electrodes, a bending tool on the opposite side of said fixture and movable relative thereto, actuating means operatively connected to said tool for moving said tool into engagement with said lugs on said certain electrodes for bending said lugs against said insulating wafer.

63. Apparatus for making electrode assemblies including a fixture adapted to support an insulating wafer having thereon a number of electrodes which project from one side of said wafer, certain electrodes having lugs projecting through said insulating wafer and being accessible at the other side thereof, a pressure head at said one side of said fixture, actuating means operatively connected to said head for moving said head endwise into contact with the adjacent projecting ends of said electrodes, said head having a leading face recessed in the pateern of the projecting ends of said electrodes, a bending tool on the opposite side of said fixture and movable relative thereto, actuating means operatively connected to said tool for moving said tool into engagement with said lugs on said certain electrodes for bending said lugs against said insulating wafer, said head being constructed and arranged to apply pressure to said electrode to assure firm engagement of said electrode against said insulating wafer and to relieve said fixture of stress resulting from operation of said tool, the actuating means for said head being coordinated to the actuating means for said tool whereby said head engages said electrodes in advance of the bending of said lugs by said tool.

64. An electronic tube assembling machine comprising a carrier for transporting an electric assembly supporting element, means for applying one end of each of plural elongated electrodes to said supporting element with the other end of each of said electrodes remaining free, and means operable in timed relation to the applying means for fixing said other of the assembled electrodes in predetermined, precise spacing end arrangement, said last named means including first orienting means establishing an initial position for one of said electrodes, further orienting means for establishing a final position for said one of said electrodes, and a device for affixing an insulating spacer to said other ends of said electrodes.

65. An electronic tube assembling machine comprising a carrier for transporting an electrode assembly supporting element, means for applying one end of each of plural elongated electrodes to said supporting element with the other end of each of said electrodes remaining free, and means operable in timed relation to the applying means for fixing said other of the assembled electrodes in predetermined, precise spacing end arrangement, said last named means including first orienting means establishing an initial position for one of said electrodes and further orienting means for establishing a final position for said one of said electrodes.

66. In an assembling machine, a conveyor, a series of loosely-supported fixtures on said conveyor, a first assembling unit, a series of assembling units arranged in succession along the path of said conveyor following said first assembling unit, means operatively connected to said conveyor for intermittently indexing said conveyor to advance successive fixtures into operative positions relative to successive assembling units, each of said assembling units including means operated after each indexing of said conveyor for orienting successive fixtures in said assembling unit, transfer means for applying a part to the subassembly on each of said fixtures, and actuating means controlling said transfer means, a detector following said first assembling unit for sensing the presence in successive fixtures emerging from said first assembling unit of the one part to be assembled thereby, and control means responsive to operation of said detector for successively suppressing the operation of the actuating means for each succeeding assembling unit with respect to fixtures lacking said one part.

67. Apparatus for automatically loading a part to form an assembly, comprising a jig movable in a predetermined path, two locating mechanisms spaced in said path, means for actuating one of said mechanisms into engagement with said jig for accurately locating said jig in a position to receive said part, means adjacent to said position for loading said part on said jig, and means for actuating the second of said mechanisms into engagement with the loaded part for accurately locating said part, whereby said part is in a position for building thereon of a second part.

68. In an apparatus for automatically mounting parts to form an assembly, a jig and means for mounting an initial part on said jig, said means comprising a first locating member adapted to engage and orient said jig in a predetermined position, a loading device adapted to load said part on said jig in said position, and a second locating member adjacent to said first locating member and adapted to engage said part after the said part has been loaded, for accurately locating said part in a second predetermined position, whereby a second part is adapted to be loaded on said initial part in said second position.

69. Apparatus for assembling parts to form an assembly, comprising a loading member, a jig movable to a position adjacent to said loading member, a first orienting means adjacent to said loading member and movable to engage said jig for accurately orienting said jig with respect to said loading member, a second orienting means adjacent to said first orienting means and including a movable member adapted to engage a part previously loaded on said jig for accurately orienting said part on the jig in a position for receipt by the jig of a further part from said loading member in build-up relation with respect to said previously loaded part, said first and second orienting means and said loading member being mechanically interlocked for operation in the sequence named, and power transfer means connected to said first orienting means for performing said operations in said sequence.

70. Apparatus for automatically mounting parts to form an electrode cage, comprising a loading mechanism adapted to automatically load one of said parts into accurate engagement with previously loaded parts, a jig adjacent said loading mechanism adapted to support said previously loaded parts, said loading mechanism including a loading member movable in a predetermined path to a parts transfer position adjacent said jig, oppositely disposed members movable to engage opposite side portions of said previously loaded parts to dispose said parts in said path, and common means for successively actuating said members and said loading member, whereby said previously loaded parts are disposed in said path before said loading member is in said parts transfer position for loading said one of said parts into said accurate engagement with said previously loaded parts.

71. Apparatus for automatically mounting parts to form an electrode cage, comprising a movable parts-receiving jig, a plurality of spaced parts-loading mechanisms, and means for moving said jig into a parts-receiving position adjacent each of said loading mechanisms, one of said loading mechanisms being adapted to load a final part to be mounted and including means for transporting said final part to said jig in a predetermined path, movable means adjacent said one of said mechanisms adapted to engage parts loaded on said jig prior to said final part and to orient said loaded parts accurately prior to a loading of said final part, and a common power transfer means connected to said means for moving the jig, said movable means, and said means for transporting, for actuating said last-named three means in the order named, for precision build-up of said parts on said jig.

72. Apparatus for automatically assembling parts to form a desired composite structure, comprising a plurality of spaced mounting fixtures movable in a predetermined path, means connected to said fixtures for intermittently moving the fixtures in said path to dispose them successively and momentarily in a predetermined position in said path, means adjacent to said path for locking said fixtures in said position, means adjacent to said position for loading a part on a previously loaded part, locating means at said position adapted to engage and locate said previously loaded part in a predetermined location, and guide means at said position for guiding the first named part toward a seated relation with respect to said previously loaded part for forming said structure, said fixtures, locking means, locating means, guide means and loading means being mechanically connected for actuation in the sequence named by said means for moving.

73. An automatic assembling apparatus comprising a jig, a support movable in a given path and carrying said jig, a first loading means adjacent to said path and carrying a first part to be loaded, a first means connected to said support for orienting said jig in a relatively low order of accuracy with respect to said first loading means, a second means movable to engage said jig for orienting the jig in a relatively high order of accuracy with respect to said loading means, a third means spaced from said first and second means in said path and adapted to engage said first part for orienting the same in a position of greater accuracy than said relatively high order of accuracy on said jig, a second loading means adjacent to said third means and adapted to load a second part on said jig in a path including said position of greater accuracy, said first and second means, said first loading means, said third means and said second loading means being mechanically interconnected for operation in the sequence named.

74. Apparatus for automatically loading parts to form a three electrode cage for an electron discharge device, comprising a plurality of spaced mounting fixtures movable in a horizontal path, means for intermittently moving said fixtures in said path to dispose them successively and momentarily in spaced stationary positions in said path, means adjacent said path for locking said fixtures in said stationary positions, means adjacent one of said stationary positions for loading an electrode on a previously loaded spacer plate, locating means at said one of said stationary positions for locating said spacer plate in a predetermined position, means comprising a combined guide and locator at said one of said stationary positions for locating said electrode in desired position with respect to said located spacer plate, and common actuating means adjacent said locking means, loading means, locating means and combined guide and locator means, for actuating said four means in a predetermined sequence.

75. Apparatus for automatically mounting electron tube parts to form an electrode cage, comprising a jig movable to a predetermined position, a loading mechanism for loading an insulating spacer plate having apertures on said jig and into build-up relation with respect to a previously loaded electrode sub-assembly having free end portions remote from said jig and adapted to be received in said apertures, a locating device between said loading mechanism and said jig when said jig is in said position, said device being movable to engage and locate said free end portions in a predetermined orientation, said loading mechanism being adapted to carry said spacer plate in said path with said apertures in said predetermined orientation and aligned with said end portions, and power means including a plurality of interconnected power transfer mechanisms connected to said jig, locating device and loading mechanism for sequential movement thereof in the order named for accurate loading of said spacer plate for build-up of said cage.

76. In an apparatus for automatically assembling an electrode cage from parts thereof, comprising a loading means disposed in a predetermined position, a movable jig having one of said parts loaded thereon, means for moving said jig roughly into said position, a first locating device adjacent to said loading means and connected to said means for moving for engaging said jig whenr oughly in said position and moving said jig more accurately into said position, and a second locating device adjacent to said loading means and connected to said first locating device and adapted to engage said one of said parts after said jig is moved more accurately into said position for disposing said one of said parts in accurate part-receiving relation to said loading means for accurate build-up on said one of said parts of another part loaded by said loading means, said loading means being connected to said means for moving for engaging said jig when roughly in jig and into a predetermined relation to said one of said parts, after said jig and said one of said parts have been moved into accurate positions in relation to said loading means by said first and second locating devices.

77. Apparatus for assembling parts to form an assembly, comprising a loading means, a jig movable to a position adjacent to said loading means, said loading means including a carrier and an impeller for impelling a part carried by said carrier to said jig, a first orienting means adjacent to said impeller for accurately orienting said jig in part receiving relation to said impeller, a second orienting means adjacent to said first orienting means and adapted to engage a part previously loaded on said jig for accurately orienting said part in a position on said jig for accurate build-up thereon of a part served by said loading means, said first and second orienting means and said impeller being mechanically connected for operation in the sequence named, said carrier being mechanically connected to said impeller for engagement by said impeller of a part carried by said carrier, and power transfer means connected to said first orienting device for initiating said sequence of operation.

78. In an apparatus for assembling an electrode cage, a jig movable to a loading position, a first means at said position adapted to load in spaced relation with respect to said jig a grid having a side rod, a second means at said position adapted to engage opposite sides of said jig for accurately locating said jig in a predetermined position, whereby said side rod is adapted to be disposed in register with an aperture in a spacer plate previously loaded on said jig, a third means adjacent to said locating means and adapted to engage and push said side rod towards said jig while preserving said register, whereby said side rod is adapted to be moved into said aperture, and a fourth means connected to said first, second and third means for actuating the same in the sequence named.

79. Apparatus for automatically mounting electron tube parts to form an electrode cage, comprising a jig movable to a predetermined position, a cathode loading mechanism adjacent to said position and adapted to load an electrode on said jig and into parts build-up relation with a second electrode previously located on said jig, a location device disposed between said loading mechanism and said jig when said jig is in said position, said locating device including a member movable to form a chute for receiving said first electrode and means connected to said jig, movable member and loading mechanism for movement thereof in the order named.

80. Apparatus for automatically mounting electron tube parts to form an electrode cage, comprising a jig movable to a predetermined position, an electrode loading mechanism adjacent to said position and adapted to load a tubular electrode on said jig and into parts build-up relation with respect to a previously loaded electrode subassembly comprising a spacer plate having apertures, a wound grid having side rods extending into some of said apertures and a cathode extending through another of said apertures, a device between said loading mechanism and said jig when in said position and having members movable to simultaneously engage the side rods of said grid for orienting said cathode and grid in concentric relation and to form a chute coaxial with said concentric cathode and grid, and power means including a plurality of interconnected power transfer mechanisms connected to said jig, device and loading mechanism for sequential movement thereof in the order named for accurate loading of said first mentioned electrode in build-up relation to said sub-assembly.

81. An apparatus for automatically assembling electron tube parts to form an electrode cage, including a movable flexible conveyor, a plurality of loaders disposed along said conveyor, a plurality of jigs mounted on said conveyor for movement therewith, means for intermittently moving said conveyor to dispose said jigs into approximate loading positions adjacent said loaders, means for more accurately disposing said jigs in said loading positions, said last-named means including relatively movable members on opposite sides of said jigs for moving the jigs with respect to said conveyor into said more accurate loading positions.

82. Apparatus for automatically mounting electron tube parts to form an electron tube sub-assembly, comprising a plurality of mechanisms spaced in one direction for loading said parts, a plurality of spaced and synchronously movable supports adapted to receive said parts, means adjacent said mechanisms for restraining said supports against movement in a direction normal to said one direction, means for moving said supports into parts receiving positions with respect to said mechanisms and adjacent said restraining means, and means engaging said supports and urging them in said normal direction and against said restraining means, for locking said supports in said parts receiving positions.

83. Apparatus for automatically mounting electron tube parts to form an electron tube sub-assembly, comprising a loading mechanism adapted to guide one of said parts in a predetermined path, a movable support adapted to receive said parts successively for build-up thereon of said sub-assembly, means for moving said support into a relatively rough orientation in said path, and means engaging opposite sides of said support for disposing said support in a predetermined critical position in said path, whereby said support is adapted to receive said one of said parts in a position thereon critically related to the position of another of said parts received by said support.

84. Apparatus for automatically mounting electron tube parts in a predetermined orientation, comprising a loading mechanism, a support, a movable jig mounted on said support for receiving one of said parts from said loading mechanism, means for moving said support in a rectilinear path to dispose said jig into part-receiving registry with said loading mechanism, means directly engaging said jig when in said registry for locking said jig in said part-receiving registry, said locking means being adjacent to said jig in said part-receiving registry, and means connected to said locking means and to said loading mechanism for first actuating said locking means to locking position and then actuating said loading mechanism for loading one of said parts on said jig while said jig is in locked position.

85. Apparatus for processing electron tubes, comprising a support for electron tube parts, said support comprising first and second relatively movable members, a plurality of spaced processing mechanisms for automatically and successively loading said parts on said second member, means for intermittently moving said members in a predetermined path including said mechanisms and for placing said second member successively in approximate registry with said mechanisms, means for locking said first member against movement when said second member is in said registry, and means adjacent each of said mechanisms for moving said second member into a more accurate registry successively with said mechanisms while said first member is locked against movement for facilitating the loading of said parts on said second member.

86. Apparatus for automatically mounting electron tube parts in a predetermined orientation, comprising a movable support, a jig movable on said support for receiving said parts, a loading mechanism for loading one of said parts on said jig, means engaging said support for moving said jig toward said loading mechanism, a positioning and locking mechanism for engaging and moving said jig into accurate registry with said loading mechanism and locking said jig in said registry, and means connected to said support, said positioning and locking mechanism and said loading mechanism for actuating said support and mechanisms in a predetermined sequence, whereby said support and loading mechanisms are locked in registry prior to actuation of said loading mechanism.

87. Apparatus for processing parts to form an assembly thereof, comprising a processing mechanism, first and second members movable with respect to said mechanism, said second member being mounted on and movable in a plurality of directions with respect to said first member and adapted to receive said parts to form said assembly, means for moving said members in one of said directions to a position to dispose said second member in approximate registry with said mechanism, means for locking said first member in said position, means for moving said second member in at least one of said plurality of directions and into a more accurate registry with said mechanism while said first member is locked against motion and for locking said second member in said more accurate registry, and means for actuating said mechanism while said second member is locked in said more accurate registry.

88. Apparatus for processing electron tube parts, comprising a first member movable in a predetermined path, a second member mounted on said first member and movable with respect to said first member in a plurality of normal paths including said predetermined path, and adapted to receive said parts, a plurality of processing mechanisms spaced in said path, means for intermittently moving said members in said path, whereby said members are intermittently stopped in positions successively to dispose said second member in approximate registry with mechanisms, means for locking said first member against movement when said second member is in said approximate registry with one of said mechanisms, and means adjacent said second member in said approximate registry for moving said second member with respect to said first member in at least one of said paths into a more accurate registry with said one of said mechanisms and for locking said second member in said more accurate registry for accurately loading said parts on said second member.

89. Apparatus for automatically mounting electron tube parts, comprising a support for receiving said parts, a loading mechanism for loading one of said parts on said support, said loading mechanism including a pick-up member, means for moving said member in a predetermined path from a pick-up to a loading position, and a guide having an edge adjacent said path for guiding the movements of said member to dispose said member in a predetermined loading position, a positioning and locking mechanism having a tapered finger for moving said support into accurate registry with said loading position, and means for automatically releasing one of said parts picked up by said member for loading said support.

90. Method of mounting one electron tube part on another electron tube part to form an electrode cage, said method comprising moving said another electron tube part rectilinearly and roughly into a predetermined path, locking said another part against further rectilinear movement, angularly moving said another part into a more accurate position in said path, locking said another part against further angular movement, and moving said one part in said path and toward and into engagement with said another part for build-up of said cage.

91. Method of assembling electron tube parts to form an electron tube sub-assembly, comprising collectively moving a group of said parts rectilinearly in a predetermined path and approximately into predetermined positions, then individually and rectilinearly moving said parts in said group in a plurality of paths including said predetermined path for disposing said last named parts more accurately in said predetermined positions, and then moving another group of parts accurately in paths terminating at said predetermined positions for loading said another group of parts on said first named group.

92. Method of locating a first part accurately in a loading position for build-up thereon of a second part to form a sub-assembly, said method comprising moving said first part rectilinearly in one direction and approximately into said loading position, then moving said first part in another direction normal to said one direction and into a plane including said loading position, then moving said first part in said plane and in a direction normal to said another direction and towards said loading position, and stopping said first part when accurately in said loading position.

93. Method of locating a first part accurately for build-up thereon of another part to form a sub-assembly, said method comprising moving said first part rectilinearly in a first path and into a position approximately in a second path extending angularly with respect to said first path, then moving said first part angularly in a plane parallel to said second path and to a position from which a projection perpendicular with respect to said plane includes said second path, and then moving said part along said projection and more accurately into said path, whereby said another part when moved in said second path towards said first part is adapted to engage accurately said first part for precision build-up of said sub-assembly.

94. In apparatus for automatically assembling mounts having plural parts in the manufacture of electron discharge devices, a plurality of stations arranged along a predetermined path and each having part assembly mechanisms adapted to guide one of said plural parts in a predetermined path, a movable support adapted to receive a mount for transport in succession to said stations for build-up thereon of plural parts of an electron discharge device, means operatively connected to said support for intermittently moving said support along said path into a relatively rough orientation in said path with respect to successive stations, gripping means at each of said stations and engaging opposite sides of said support, means on said support cooperating with said gripping means for orienting said support in relation to the part assembly mechanisms at each of said stations, and actuating means operative to urge said gripping means into cooperating relation with the means on said support for disposing said support in a predetermined critical position in said path, whereby said support is adapted to receive said one of said parts in a position thereon critically related to the position of another of said parts received by said support.

95. In apparatus for automatically assembling mounts according to claim 94, each of said stations including a frame having opposed portions between which said support is disposed when transported into said successive stations.

96. In apparatus for assembling mounts in the manufacture of electron discharge devices, a plurality of stations arranged along a predetermined path and each having electrode assembly mechanisms adapted to guide an electrode in a predetermined path, a movable support adapted to receive said electrodes in succession at said stations for build-up of a mount, a conveyor operatively connected to said support for intermittently moving said support along said path into a relatively rough orientation relative to successive stations, means loosely suspending said support on said conveyor, means at each of said stations successively engaging opposite sides of said support for finally orienting said support in relation to the electrode assembly mechanisms at said stations and into a predetermined critical position in said path whereby said support is adapted to receive one of said electrodes in a position thereon critically related to the position of another of said electrodes received by said support, and actuating means for operating said last-named means in timed relation to operation of said conveyor.

References Cited

UNITED STATES PATENTS

| | | | |
|---|---|---|---|
| 1,238,575 | 8/1917 | Schluter | 29—25.13 |
| 2,262,901 | 11/1941 | Murphy | 29—25.13 |
| 1,817,746 | 8/1931 | Gooskens et al. | 29—25.19 |
| 2,425,127 | 8/1947 | Schafer | 29—25.19 |
| 1,612,537 | 12/1926 | Schroeder | 29—25.19 X |
| 1,907,532 | 5/1933 | Flaws. | |
| 1,920,630 | 8/1933 | Conn | 29—25.16 X |
| 2,069,086 | 1/1937 | Donovan et al. | 29—25.16 X |
| 2,084,734 | 6/1937 | Krahl. | |
| 2,464,830 | 3/1949 | Shellem et al. | 29—1.23 X |
| 2,498,455 | 2/1950 | Scheneider et al. | 29—25.19 X |
| 1,880,112 | 9/1932 | Shmyroff et al | 198—218 |
| 1,849,148 | 3/1932 | Mojonnier | 214—8.5 X |
| 2,120,877 | 6/1938 | Uber | 176—3 |
| 2,121,901 | 6/1938 | Butty | 153—49 |
| 2,400,122 | 5/1946 | Kew et al. | 29—25.19 |
| 2,445,713 | 7/1948 | Glassner | 214—8.5 |
| 2,546,314 | 3/1951 | Merwin et al. | 214—8.5 |
| 1,508,770 | 9/1924 | Blood | 318—102 |
| 1,901,087 | 3/1933 | Dalheimer | 29—25.2 |
| 2,004,464 | 6/1935 | Clarkson | 29—208 |
| 2,314,606 | 3/1943 | Ashcroft | 86—1 |
| 2,359,575 | 10/1944 | Norman et al. | 29—211 |
| 2,390,170 | 12/1945 | Poole | 29—208 |
| 2,403,286 | 7/1946 | Johnson | 86—46 |
| 2,477,859 | 8/1949 | Burge et al. | 29—208 |
| 2,505,427 | 4/1950 | Peterson | 226—3 |
| 2,506,175 | 5/1950 | Reynolds et al. | 86—46 |
| 2,536,677 | 1/1951 | Brunner et al. | 29—25.19 |
| 2,543,931 | 3/1951 | Peterson | 226—14 |
| 2,644,998 | 7/1953 | Klinkert et al. | 29—25.19 |
| 2,721,374 | 10/1955 | Pilas. | |

FOREIGN PATENTS 936,311  2/1948  France.

JOHN F. CAMPBELL, *Primary Examiner.*

ARTHUR M. HORTON, SAMUEL BOYD, FRANK H. BRONAUGH, T. EMMET BEALLE, RICHARD H. EANES, W. W. DYER, JR., *Examiners.*

WILLMORE A. WILTZ, C. F. BENSON,
*Assistant Examiners.*